US012378819B2

(12) United States Patent
Kirby

(10) Patent No.: US 12,378,819 B2
(45) Date of Patent: Aug. 5, 2025

(54) MOTORIZED WINDOW TREATMENT

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 29 days.

(21) Appl. No.: 17/876,705

(22) Filed: Jul. 29, 2022

(65) Prior Publication Data

US 2023/0036910 A1 Feb. 2, 2023

Related U.S. Application Data

(60) Provisional application No. 63/314,043, filed on Feb. 25, 2022, provisional application No. 63/227,788, filed on Jul. 30, 2021.

(51) Int. Cl.

| | |
|---|---|
| ***E06B 9/72*** | (2006.01) |
| ***E06B 9/322*** | (2006.01) |
| ***E06B 9/325*** | (2006.01) |
| ***E06B 9/44*** | (2006.01) |
| *E06B 9/68* | (2006.01) |

(52) U.S. Cl.

CPC ................ *E06B 9/72* (2013.01); *E06B 9/322* (2013.01); *E06B 9/325* (2013.01); *E06B 9/44* (2013.01); *E06B 2009/3222* (2013.01); *E06B 2009/6818* (2013.01)

(58) Field of Classification Search

CPC ..... E06B 9/72; E06B 9/68; E06B 9/44; E06B 9/323; E06B 9/322; E06B 9/325; E06B 2009/3222; A47H 1/13; A47H 1/14

See application file for complete search history.

(56) References Cited

U.S. PATENT DOCUMENTS

| | | | | |
|---|---|---|---|---|
| 2,203,372 A * | 6/1940 | Trammell | ............... E06B 9/323 160/902 |
| 2,301,863 A * | 11/1942 | Forse | ........................ E06B 9/50 160/122 |
| 4,531,562 A * | 7/1985 | Swanson | .................. E06B 9/24 160/DIG. 7 |
| 7,389,806 B2 | 6/2008 | Kates | |
| 8,299,734 B2 | 10/2012 | Mullet et al. | |

(Continued)

FOREIGN PATENT DOCUMENTS

EP 2631411 B1 9/2014

*Primary Examiner* — Johnnie A. Shablack

(74) *Attorney, Agent, or Firm* — Flaster Greenberg, P.C.

(57) ABSTRACT

A motorized window treatment system may include a roller tube, a flexible material, a motor drive unit, and mounting brackets. The mounting brackets may include a stationary portion configured to be attached to a structure surrounding a window. The mounting brackets may include a movable portion configured to receive an end portion of a housing of a motor drive unit. The movable portion may be configured to operate the motorized window treatment between the operating position and the extended position in a circular-shaped path. A portion of the motor drive unit may be accessible when the motorized window treatment is in the extended position. The mounting brackets may include a stopping mechanism that is configured to prevent the motorized window treatment from extending beyond the extended position.

30 Claims, 28 Drawing Sheets

(56) References Cited

U.S. PATENT DOCUMENTS

| | | | | |
|---|---|---|---|---|
| 8,368,328 | B2 | 2/2013 | Mullet et al. | |
| 8,371,358 | B1 | 2/2013 | Mullet et al. | |
| 8,540,005 | B2 | 9/2013 | Baugh et al. | |
| 8,659,246 | B2 | 2/2014 | Mullet et al. | |
| 8,791,658 | B2 | 7/2014 | Mullet et al. | |
| 8,851,141 | B2 | 10/2014 | Blair et al. | |
| 8,919,419 | B2 | 12/2014 | Mullet et al. | |
| 8,950,461 | B2 | 2/2015 | Ogden et al. | |
| 9,045,939 | B2 | 6/2015 | Blair et al. | |
| 9,115,537 | B2 | 8/2015 | Blair | |
| 9,488,000 | B2 | 11/2016 | Kirby et al. | |
| 9,810,020 | B2 | 11/2017 | Adams et al. | |
| 10,094,169 | B2 | 10/2018 | Kirby | |
| 10,655,386 | B2 * | 5/2020 | Adams | E06B 9/70 |
| 11,002,071 | B2 * | 5/2021 | Campagna | E06B 9/72 |
| 11,015,387 | B2 * | 5/2021 | Blair | E06B 9/50 |
| 11,421,473 | B2 * | 8/2022 | Campagna | E06B 9/72 |
| 11,680,445 | B2 * | 6/2023 | Blair | B23P 6/00 160/84.02 |
| 11,788,348 | B2 * | 10/2023 | Blair | E06B 9/42 160/10 |
| 2007/0284053 | A1 | 12/2007 | Mullet et al. | |
| 2008/0236763 | A1 | 10/2008 | Kates | |
| 2010/0269988 | A1 | 10/2010 | Mullet et al. | |
| 2010/0294438 | A1 | 11/2010 | Kirby et al. | |
| 2011/0203748 | A1 | 8/2011 | Mullet et al. | |
| 2011/0203754 | A1 | 8/2011 | Mullet et al. | |
| 2012/0090797 | A1 | 4/2012 | Mullet et al. | |
| 2012/0225340 | A1 | 9/2012 | Mullet et al. | |
| 2013/0098561 | A1 | 4/2013 | Mullet et al. | |
| 2013/0233496 | A1 | 9/2013 | Ogden et al. | |
| 2014/0305601 | A1 | 10/2014 | Mullet et al. | |
| 2014/0305602 | A1 * | 10/2014 | Kirby | E06B 9/40 160/310 |
| 2015/0240560 | A1 | 8/2015 | Blair et al. | |
| 2015/0247362 | A1 | 9/2015 | Kirby | |
| 2018/0202225 | A1 | 7/2018 | Lagarde | |
| 2018/0266176 | A1 | 9/2018 | Hall et al. | |
| 2018/0310745 | A1 | 11/2018 | Giri et al. | |
| 2021/0367542 | A1 * | 11/2021 | Adams | H02J 7/0063 |
| 2024/0044204 | A1 * | 2/2024 | Shivell | E06B 9/40 |

* cited by examiner

MOTORIZED WINDOW TREATMENT

CROSS-REFERENCE TO RELATED APPLICATIONS

This application claims priority to U.S. provisional patent application No. 63/227,788, filed Jul. 30, 2021, and U.S. provisional patent application No. 63/314,043, filed Feb. 25, 2022, which are incorporated herein by reference in their entirety.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical window treatment can be mounted to structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to structure, such as a wall, ceiling, window frame, or other structure.

Such a window treatment may be motorized. A motorized window treatment may include a roller tube, a motor, brackets, and electrical wiring. The components of the motorized window treatment, such as the brackets, the roller tube, electrical wiring, etc. may be concealed by a fascia or installed in a pocket out of view. However, it may be desirable to install a window treatment without a fascia and/or outside of a pocket. In such a motorized window treatment, one or more components may be exposed such that they are visible. It may be desirable to configure the motorized window treatment such that the exposed components are otherwise hidden, for example, without the use of a fascia. It may also be desirable to configure the exposed components to be functional and aesthetically pleasing.

SUMMARY

As described herein, a motorized window treatment may include a roller tube, a flexible material, a motor drive unit (e.g., drive assembly), and mounting brackets. The roller tube may have a longitudinal axis extending in a longitudinal direction. The flexible material may be attached to the roller tube. The flexible material may be operable between a raised position and a lowered position via rotation of the roller tube. The motor drive unit may be located within the roller tube. The motor drive unit may be configured to rotate the roller tube to adjust the flexible material between the raised position and the lowered position. The motor drive unit may include an end portion that is accessible via an end of the roller tube. The motor drive unit may include a first opening on the end portion. The mounting brackets may be configured to mount the motorized window treatment to a structure.

The motorized window treatment may include mounting brackets that are configured to rotatably support opposed ends of the roller tube. The mounting brackets may be configured to mount the motorized window treatment to a structure surrounding a window. The mounting brackets may include a stationary portion configured to be attached to the structure surrounding the window. The mounting brackets may include a movable portion configured to receive an end portion of a housing of the motor drive unit. The movable portion may be configured to operate the motorized window treatment between an operating position and an extended position. For example, the movable portion may be configured to slide along a circular-shaped path with respect to the stationary portion to operate the motorized window treatment between the operating position and the extended position. A portion of the motor drive unit may be accessible when the motorized window treatment is in the extended position. The movable portion may be aligned with the stationary portion when the motorized window treatment is in the operating position such that the portion of the motor drive unit is covered by the stationary portion. The mounting brackets may include a stopping mechanism configured to prevent the motorized window treatment from extending beyond the extended position.

The stopping mechanism may include a flexible strap that is configured to connect the movable portion to the stationary portion. The flexible strap may define a first strap end and a second strap end. The first strap end may be configured to be captively received within the movable portion of the mounting brackets. The second strap end may be configured to be secured to the stationary portion of the mounting brackets. The flexible strap may be configured to prevent the motorized window treatment from pivoting beyond the extended position.

The stopping mechanism may include a stopping arm extending from a lower wall of the movable portion. When the motorized window treatment is in the operating position, the stopping arm may engage a tab extending from the stationary portion. The stopping arm may be configured to disengage from the tab when a force greater than a predefined threshold force is applied to the roller tube in a direction away from the window. The stopping arm may be configured to abut a catch when the motorized window treatment is in the extended position, for example, to prevent the motorized window treatment from extending beyond the extended position.

As described herein, a window treatment measuring tool may include a first portion, a second portion, and a fastener. The first portion may include a first sliding portion and a first spacer. The second portion may include a second sliding portion and a second spacer. The second sliding portion may be configured to slidingly receive and interlock with the first sliding portion. The fastener may be configured to releasably secure the first sliding portion to the second sliding portion. The first sliding portion may be configured to be slidingly adjusted with respect to the second sliding portion to adjust a length of the window treatment measuring tool. The window treatment measuring tool may be configured to transfer a window measurement to a standard-width roller tube assembly.

As described herein, a window treatment cutting guide may include a lower portion, an upper portion, and a notch. The lower portion may be configured to support a roller tube assembly during a cutting procedure. The upper portion may be offset from the lower portion. The upper portion may define a front surface that is configured to abut a first end of a roller tube assembly. The notch may be defined in the upper portion and may extend from the front surface to an inner surface. The notch may be configured to receive a measuring tool for transferring a window measurement. The window treatment cutting guide may be configured to be secured in location with respect to a saw blade such that a distance between the inner surface and the saw blade corresponds to the window measurement.

As described herein, a window treatment cutting tool may include a cylindrical support, a collar, and a cutting arm assembly. The cylindrical support may be configured to receive a roller tube assembly. The cylindrical support may define a longitudinal axis that extends in a longitudinal direction. The collar may be slidingly received by the cylindrical support in the longitudinal direction. The collar may be configured to be secured to the cylindrical support based on a desired length for the roller tube assembly. The cutting arm assembly may be rotatably attached to the cylindrical support. The cutting arm assembly may include an arm and a blade attached to a distal end of the arm. The arm may be configured to be biased toward the cylindrical support such that the blade contacts a flexible material of the roller tube assembly. The cutting arm assembly may be configured to be rotated about the longitudinal axis such that the blade cuts successive layers of the flexible material.

As described herein, a motorized window treatment may be installed at a mounting location (e.g., such as a window casing). A measuring tool may be placed within the window casing. The measuring tool may comprise sliding portions and spacers at opposed ends of the measuring tool. The sliding portions may be adjusted such that outer faces of the spacers abut respective sidewalls of the window casing. The sliding portions may be secured in position with respect to one another using a fastener such that an overall length of the measuring tool corresponds to an inside width of the window casing. The inside width of the window casing may be transferred to a roller tube assembly of the motorized window treatment by placing an inside face of one of the spacers against an end of the roller tube assembly. The roller tube assembly may be cut using a blade. One or more mounting brackets may be installed within the window casing. A window treatment assembly may be assembled by installing a motor drive unit in a first end of a roller tube of the roller tube assembly and installing an idler end portion in the second end of the roller tube of the roller tube assembly. The roller tube assembly may be secured to the installed mounting brackets.

DETAILED DESCRIPTION

Figure 1:
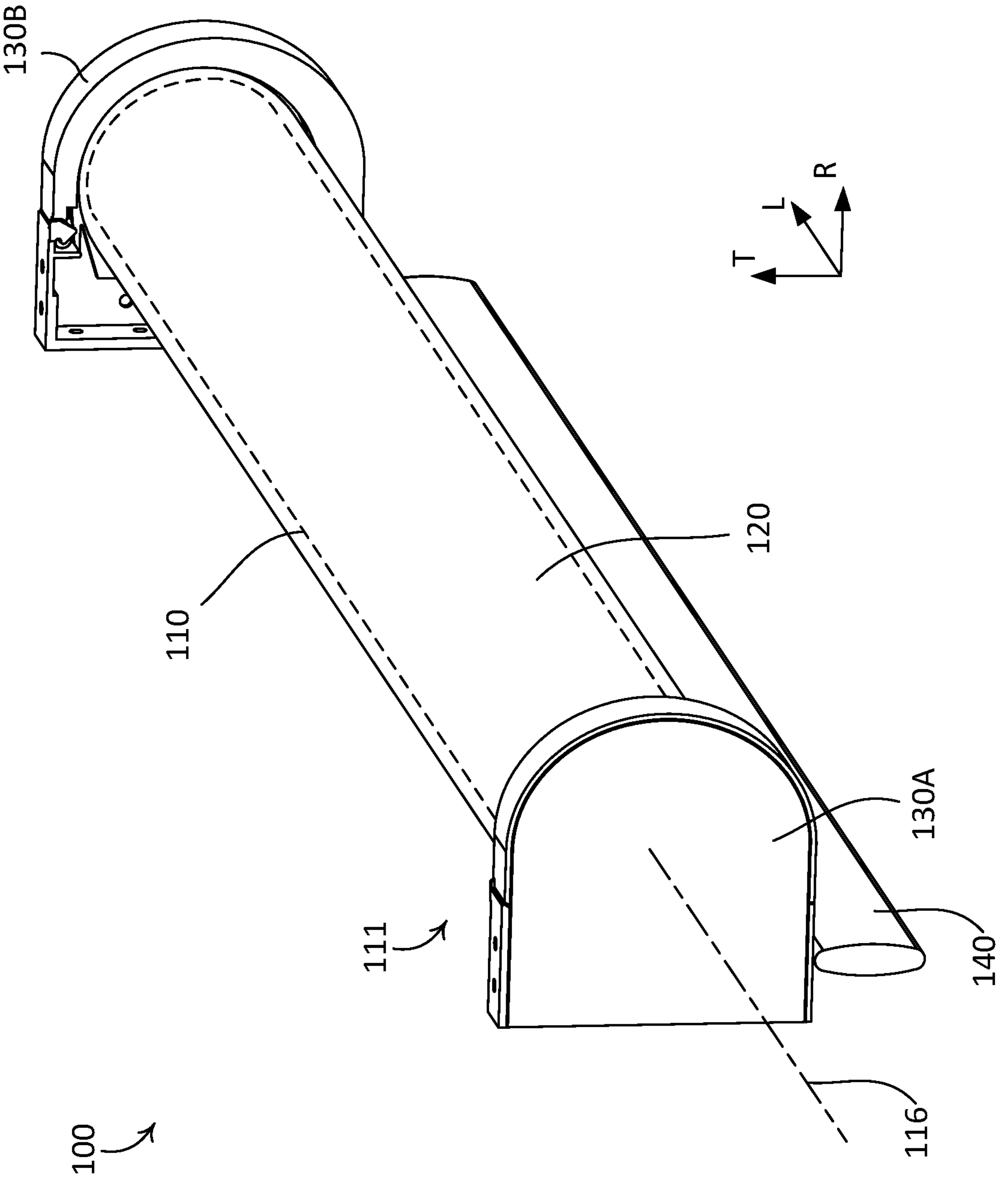
FIG. 1 is a perspective view of an example motorized window treatment with a roller tube in an operating position.
Figure 4:
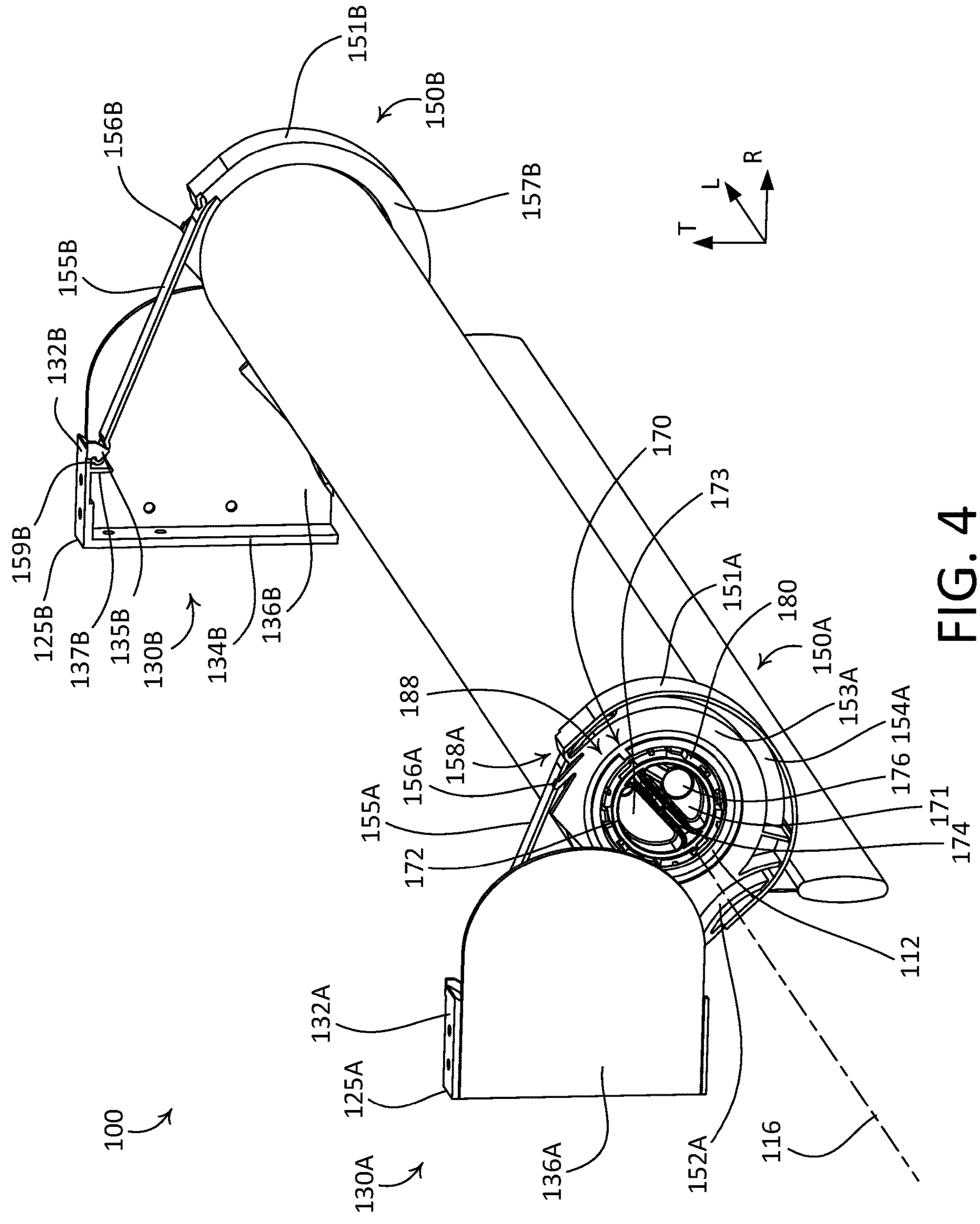
FIG. 4 is a perspective view of the example motorized window treatment shown in FIG. 1 with the roller tube in an extended position.
Figure 5:
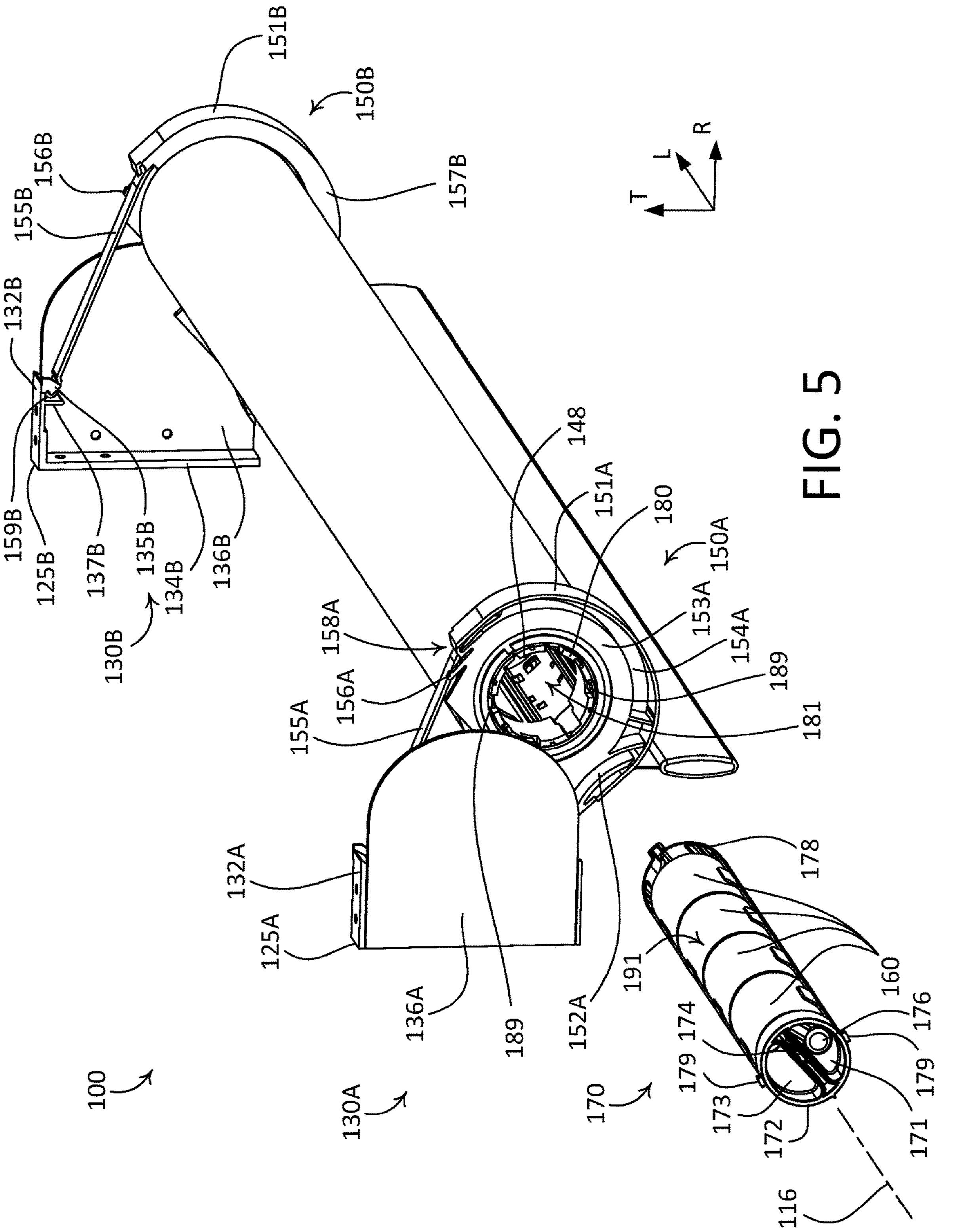
FIG. 5 is a partially exploded view of the example motorized window treatment shown in FIG. 1 with a battery holder removed from a housing of a motor drive unit of the motorized window treatment.
Figure 6:
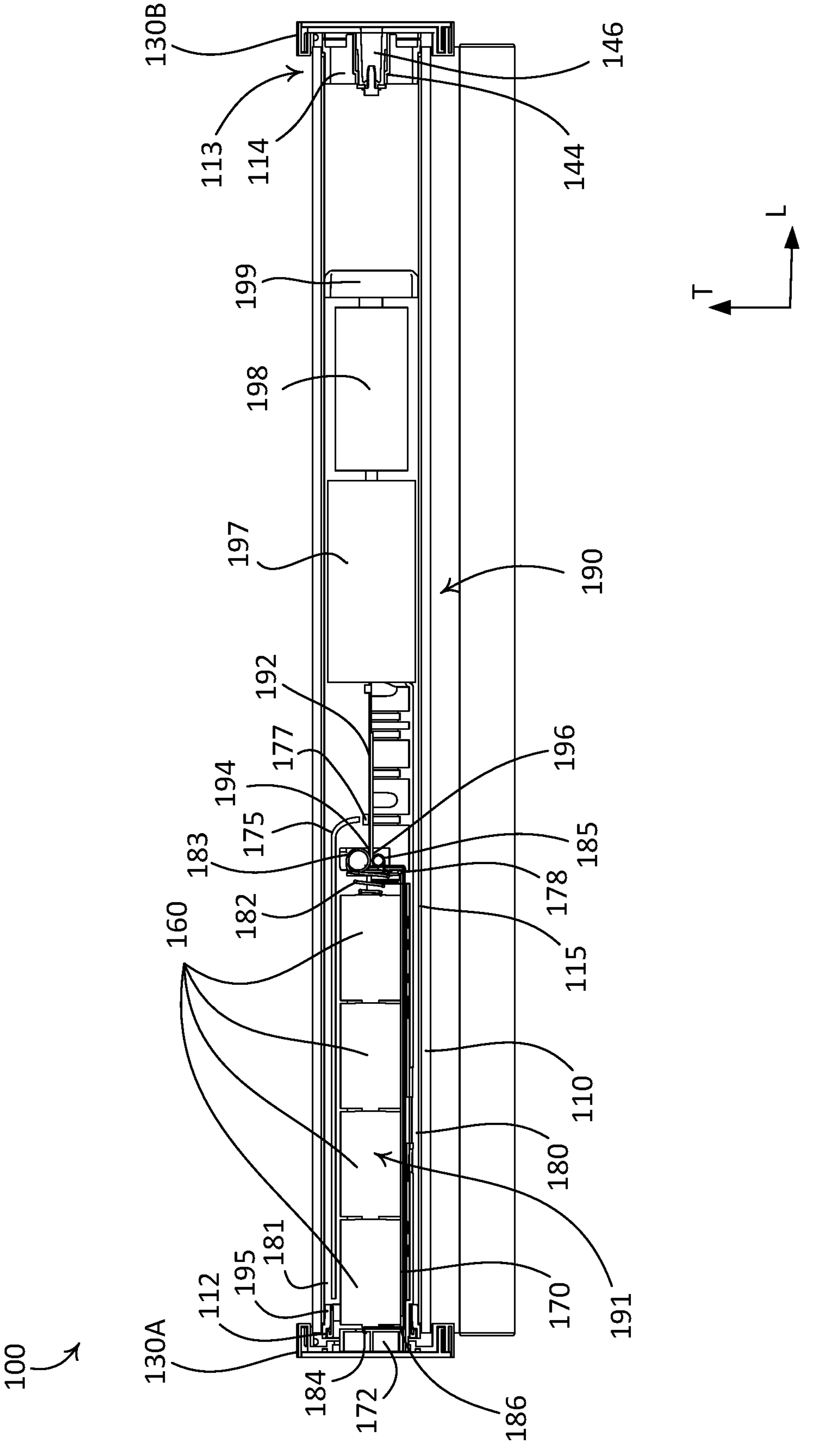
FIG. 6 is a front cross-section view of the example motorized window treatment shown in FIG. 1 with the roller tube in the operating position.

FIGS. 1-10 depict an example motorized window treatment 100 (e.g., a battery-powered motorized window treatment system) that includes a roller tube 110 and a flexible material 120 (e.g., a covering material) windingly attached to the roller tube 110. The motorized window treatment 100 may be a window treatment assembly that includes a window treatment assembly 111 and one or more mounting brackets 130A, 130B. The window treatment assembly 111 may include a roller tube assembly having a roller tube 110 and a flexible material 120, a motor drive unit 190, and an idler end portion 114 (e.g., as shown in FIG. 6). For example, the motorized window treatment 100 may be in an operating position (e.g., a non-extended position) in FIGS. 1-4. The roller tube 110 may comprise a first end 112 and a second end 113. The motor drive unit 190 may be located at the first end 112 of the roller tube 110 (e.g., at a first end of the window treatment assembly 111) and the idler end portion 114 may be located at the second end 113 of the roller tube 110 (e.g., at a second end of the window treatment assembly 111). The motorized window treatment 100 may include first and second mounting brackets 130A, 130B configured to be coupled to or otherwise mounted to a structure surrounding a window. For example, each of the mounting brackets 130A, 130B may be configured to be mounted to (e.g., attached to) a window frame, a wall, or other structure, such that the motorized window treatment 100 is mounted proximate to an opening (e.g., over the opening or in the opening), such as the window for example. The mounting brackets 130A, 130B may be configured to be mounted to a vertical structure (e.g., wall-mounted to a wall as shown in FIG. 1) and/or mounted to a horizontal structure (e.g., ceiling-mounted to a ceiling).

Figure 3:
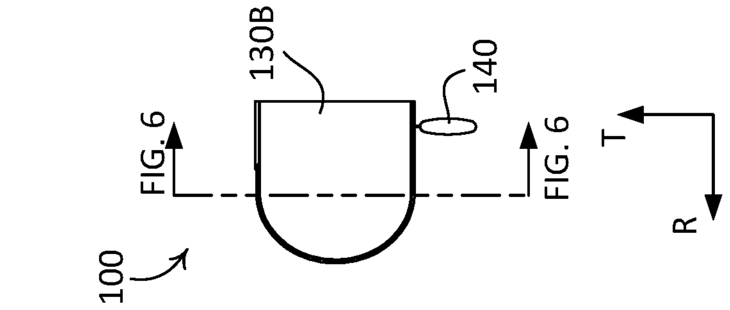
FIG. 3 is a side view of the example motorized window treatment shown in FIG. 1.
Figure 2:
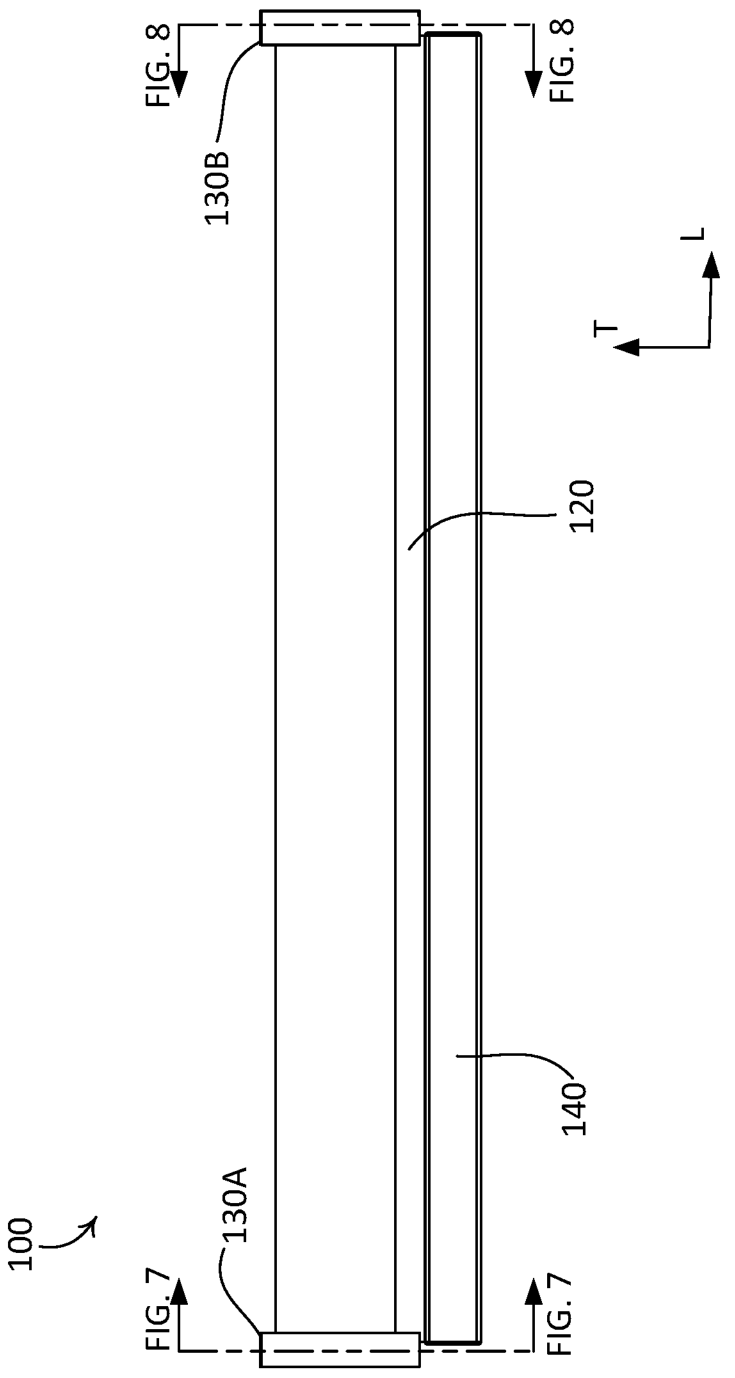
FIG. 2 is a front view of the example motorized window treatment shown in FIG. 1.

The roller tube 110 may operate as a rotational element of the motorized window treatment 100. The roller tube 110 may be elongate along a longitudinal direction L and rotatably mounted (e.g., rotatably supported) by the mounting brackets 130A, 130B. For example, the window treatment assembly 111 may be rotatably supported by the mounting brackets 130A, 130B. The roller tube 110 may define a longitudinal axis 116. The longitudinal axis 116 may extend along the longitudinal direction L. The mounting brackets 130A, 130B may extend from the structure in a radial direction R. The radial direction R may be defined as a direction perpendicular to the structure and the longitudinal axis 116. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised position (e.g., a fully-raised position or a fully-open position as shown in FIG. 3) and a lowered position (e.g., a fully-lowered position or a fully-closed position as shown in FIG. 1) along the transverse direction T.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material.

Figure 8:
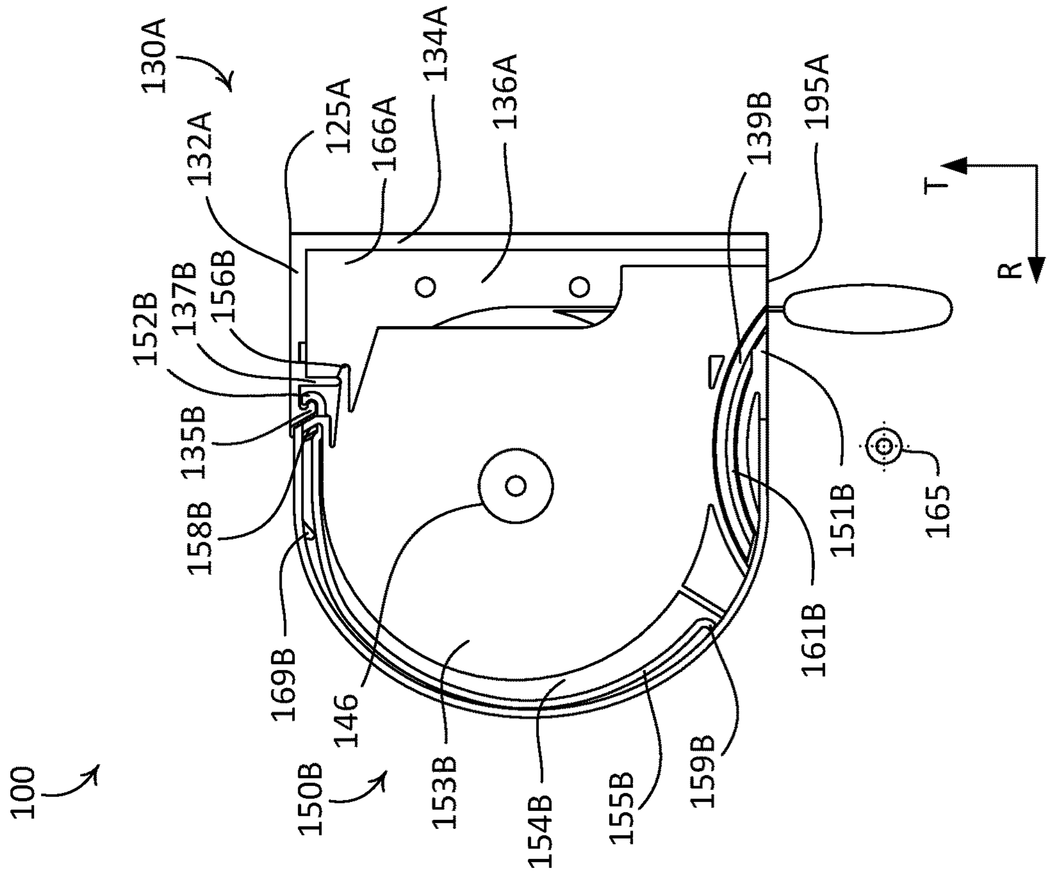
FIG. 8 is right-side cross-section view of the example motorized window treatment shown in FIG. 1 with the roller tube in the operating position.
Figure 7:
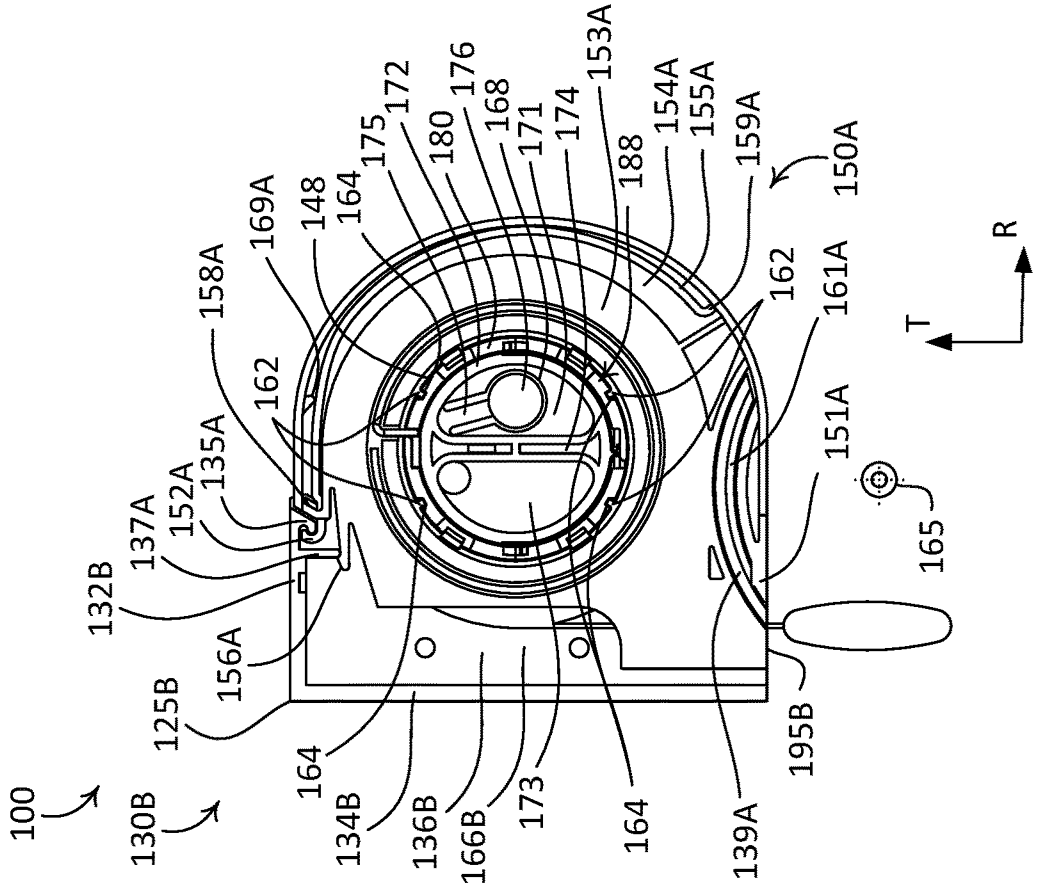
FIG. 7 is a left-side cross-section view of the example motorized window treatment shown in FIG. 1 with the roller tube in the operating position.
Figure 10:
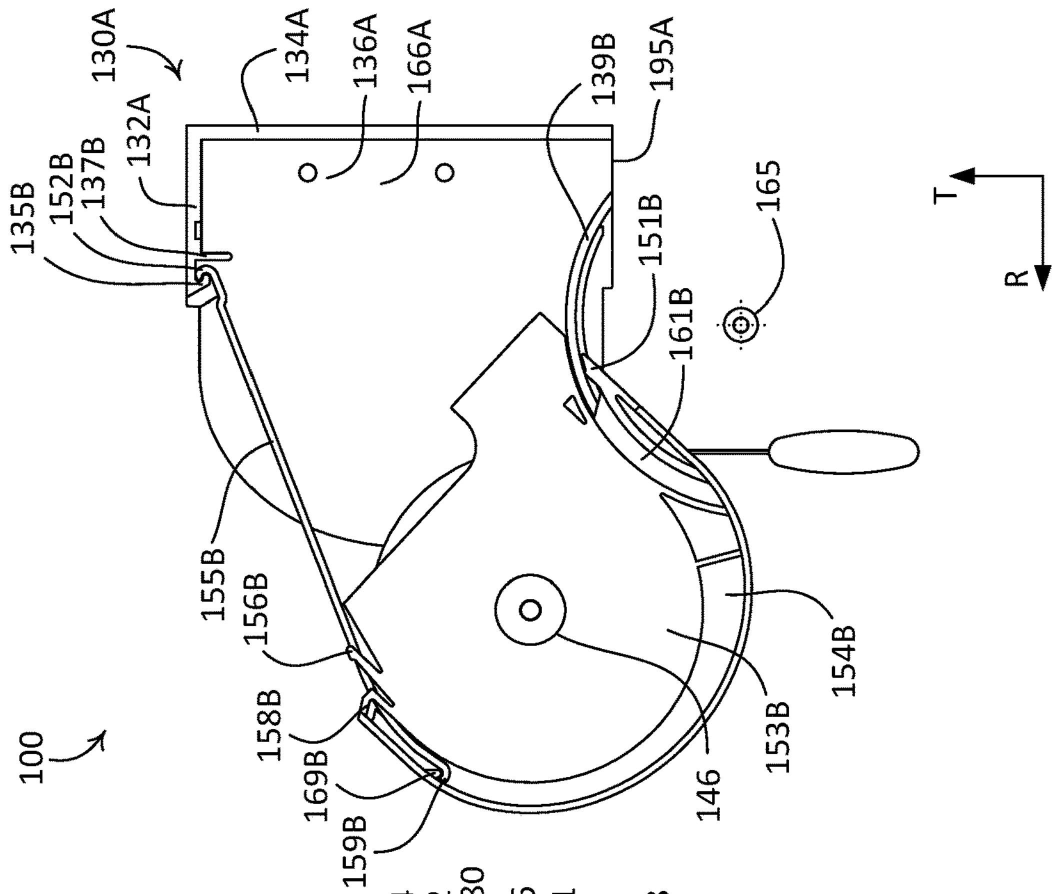
FIG. 10 is another right-side cross-section view of the example motorized window treatment shown in FIG. 1 with the roller tube in the extended position.
Figure 9:
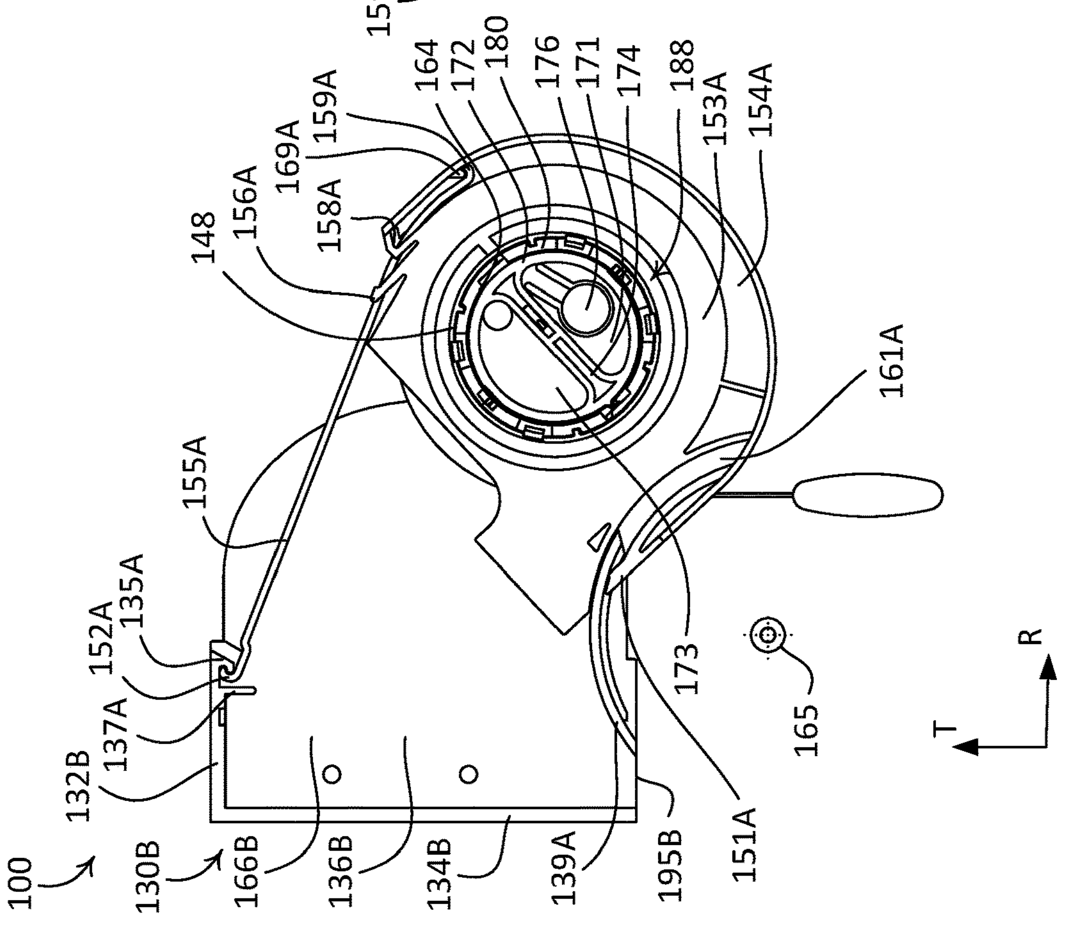
FIG. 9 is another left-side cross-section view of the example motorized window treatment shown in FIG. 1 with the roller tube in the extended position.
Figure 11:
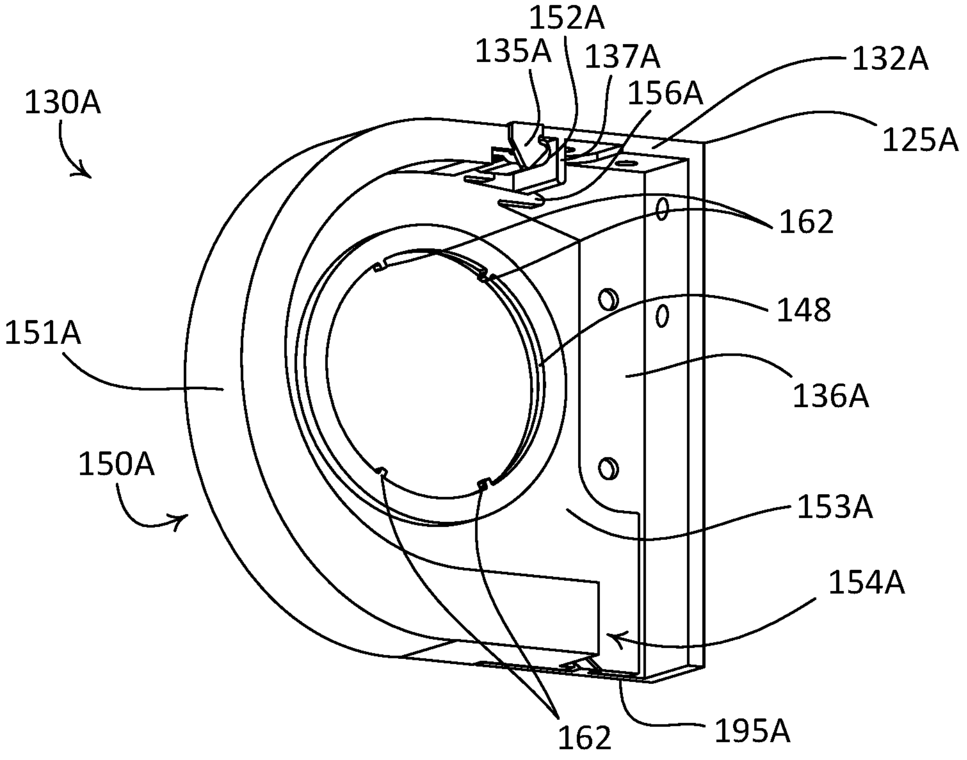
FIG. 11 is a perspective view of an example mounting bracket with a pivoting portion aligned with a stationary portion.
Figure 12:
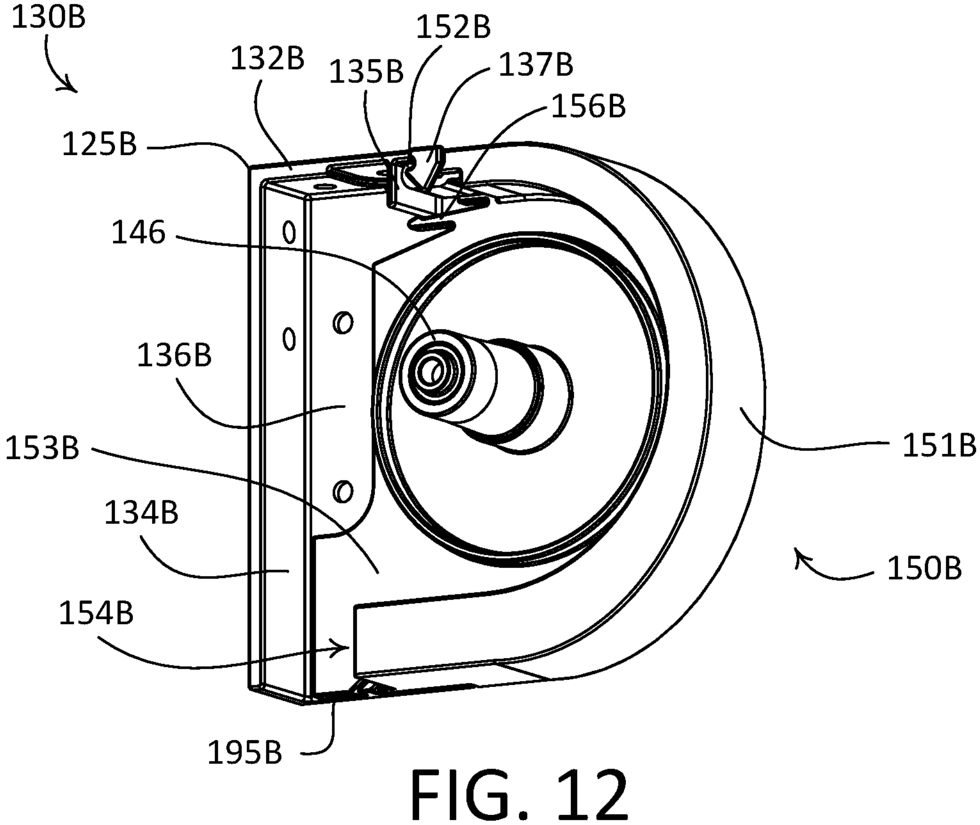
FIG. 12 is a perspective view of another example mounting bracket with the pivoting portion aligned with the stationary portion.

FIGS. 4 and 5 are perspective views of the example motorized window treatment 100 in an extended position. FIG. 4 depicts the example motorized window treatment 100 with a battery holder 170 within a housing 180 of the motor drive unit 190 of the motorized window treatment 100. FIG. 5 depicts the example motorized window treatment 100 with the battery holder 170 removed from the housing 180. FIG. 6 is a front cross-section view of the example motorized window treatment 100. FIG. 7 FIGS. 7 and 8 are side cross-section views of the example motorized window treatment 100 in the operating position. FIG. 7 is a left-side cross-section taken through the mounting bracket 130A looking toward the mounting bracket 130B. FIG. 8 is a right-side cross-section taken through the mounting bracket 130B looking toward the mounting bracket 130A. FIGS. 9 and 10 are side cross-section views of the example motorized window treatment 100 in the extended position. FIG. 9 is a left-side cross-section taken through the mounting bracket 130A looking toward the mounting bracket 130B. FIG. 10 is a right-side cross-section taken through the mounting bracket 130B looking toward the mounting bracket 130A. FIGS. 11 and 12 are perspective views of the respective mounting brackets 130A, 130B when the motorized window treatment 100 is in the operating position.

Figure 13:
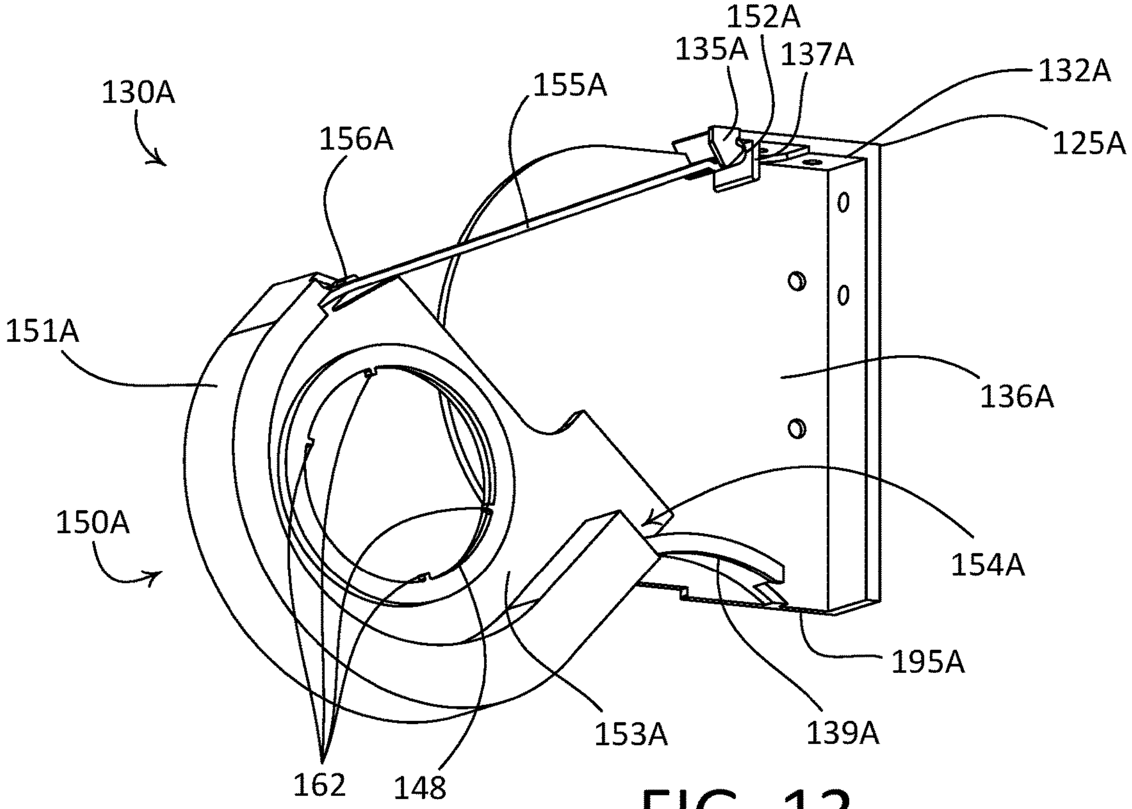
FIG. 13 is a perspective view of the example mounting bracket shown in FIG. 11 with the pivoting portion pivoted away from the stationary portion.
Figure 14:
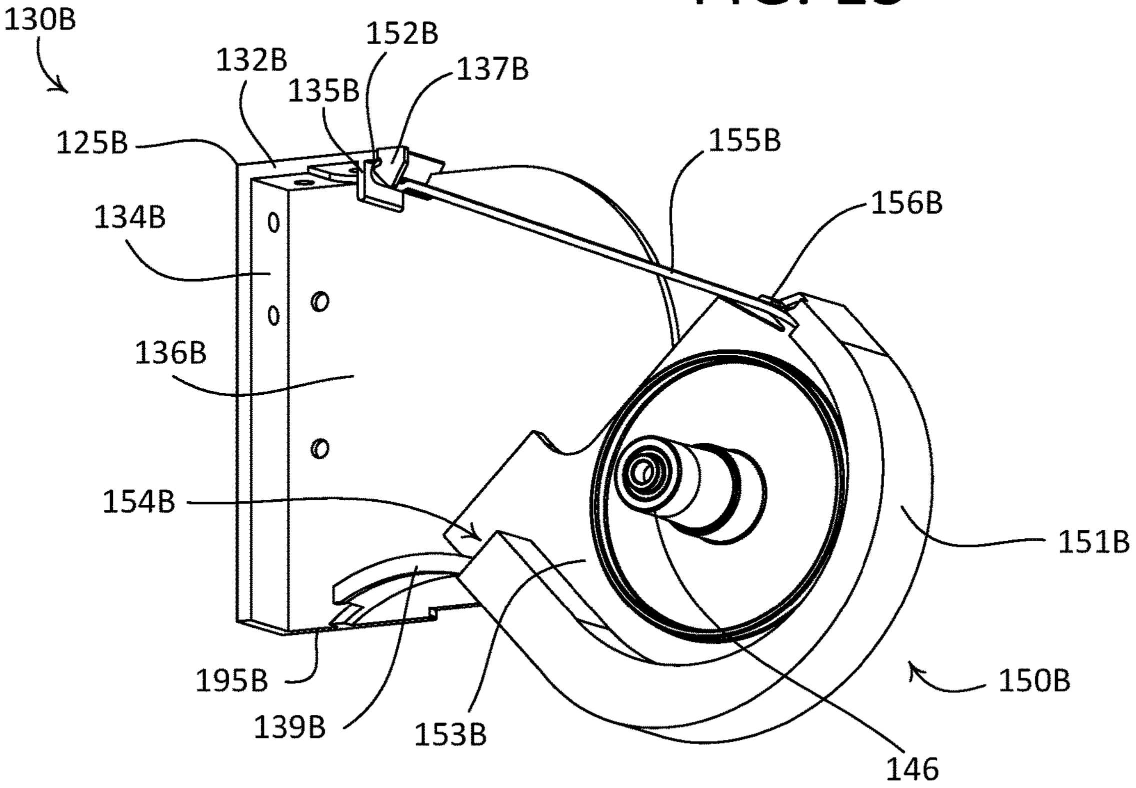
FIG. 14 is a perspective view of the example mounting bracket shown in FIG. 12 with the pivoting portion pivoted away from the stationary portion.

FIGS. 13 and 14 are perspective views of the respective mounting brackets 130A, 130B when the motorized window treatment 100 is in the extended position.

The motorized window treatment 100 may include a drive assembly, e.g., such as the motor drive unit 190 (e.g., shown in FIG. 6). The motor drive unit 190 may at least partially be disposed within the roller tube 110 (e.g., in the first end 112 of the roller tube 110). For example, the motor drive unit 190 may include a control circuit that may include a microprocessor and may be mounted to a printed circuit board 192 (e.g., shown in FIG. 6). The motor drive unit 190 may be operably coupled to the roller tube 110 such that when the motor drive unit 190 is operated, the roller tube 110 rotates. The motor drive unit 190 may be configured to rotate the roller tube 110 of the example motorized window treatment 100 such that the flexible material 120 is operable between the raised position and the lowered position. The motor drive unit 190 may further comprise a communication circuit (e.g., such as communication circuit 826 shown in FIG. 24A), such as a wireless communication circuit, that may be mounted to the printed circuit board 192 and may be configured to transmit and receive signals (e.g., wireless signals, such as radio-frequency (RF) signals). The motor drive unit 190 may be configured to rotate the roller tube 110 to control the flexible material 120 between the raised position and the lowered position in response to signals received from a remote control device via the communication circuit. During a configuration procedure (e.g., an association procedure) of the motorized window treatment 100, the motor drive unit 190 may be associated with the remote control device, such that the motor drive unit 190 may be responsive to the wireless signals transmitted by the remote control device.

The motor drive unit 190 may comprise a motor 197 that is coupled to a drive coupler 199 via a gear assembly 198. The motor drive unit 190 (e.g., the motor 197) may be operatively coupled to the roller tube 110, for example, via the drive coupler 199. The motor drive unit 190 may be configured to control the motor 197 to rotate the roller tube 110 between the raised position and the lowered position. The drive coupler 199 may be an output gear that is driven by the motor 197 and transfers rotation of the motor 197 to the roller tube 110. For example, the drive coupler 199 may define a plurality of grooves about its periphery. An inner surface of the roller tube 110 may be splined (e.g., may define a plurality of splines). The grooves of the drive coupler 199 may be configured to engage respective splines of the roller tube 110 such that rotation of the motor 197 is transferred to the roller tube 110, for example, via the drive coupler 199. The motor drive unit 190 may also comprise a bearing assembly 195, which may be rotatably coupled to the roller tube 110 to allow the motor drive unit to support (e.g., rotatably support) the roller tube 110. The motorized window treatment 100 may also comprise the idler end portion 114, which may be disposed within the second end 113 of the roller tube 110 (e.g., as shown in FIG. 6) and may be configured to support (e.g., rotatably support) the roller tube 110. The motor drive unit 190 may be connected to the first mounting bracket 130A and the idler end portion 114 may be connected to the second mounting bracket 130B, such that the mounting brackets 130A, 130B are able to support (e.g., rotatably support) the roller tube 110.

The motorized window treatment 100 may be configured to enable access to one or more ends of the roller tube 110 and/or the motor drive unit 190 while remaining secured to the mounting brackets 130A, 130B. For example, the motorized window treatment 100 may be adjusted (e.g., pivoted or slid) between an operating position (e.g., as shown in FIG. 1) to an extended position (e.g., as shown in FIGS. 4 and 5) while the window treatment assembly 111 is secured to the mounting brackets 130A, 130B. The operating position may be defined as a position in which the roller tube 110 is supported by and aligned with both mounting brackets 130A, 130B. The extended position may be defined as a position in which one or more ends of the roller tube 110 and/or the motor drive unit 190 are accessible while still attached to the mounting brackets 130A, 130B.

When in the motorized window treatment 100 is in the extended position, the one or more ends (e.g., end portions) of the motor drive unit 190 and/or roller tube 110 may be accessed, for example, to replace batteries 160, adjust one or more settings, make an electrical connection, repair one or more components, and/or the like. One or more of the mounting brackets 130A, 130B may enable an end portion 188 of the motor drive unit 190 to be accessed when the motorized window treatment 100 is in the extended position. Each of the mounting brackets 130A, 130B may include a respective stationary portion 125A, 125B configured to be mounted to the structure and a respective pivoting portion 150A, 150B configured to pivot or rotate away from the structure. For example, the pivoting portion 150A of the first mounting bracket 130A may be configured to pivot or rotate away from the structure to enable the end portion 188 of the motor drive unit 190 to be accessible. For example, a first portion (e.g., the pivoting portion 150A, 150B) of one or more of the mounting brackets 130A, 130B may pivot or rotate away from a second portion (e.g., the stationary portion 125A, 125B). For example, the pivoting portions 150A, 150B of the mounting brackets 130A, 130B may be adjusted with respect to the stationary portions 125A, 125B, for example, to expose the end portion 188 of the motor drive unit 190 and/or the idler end portion 195 disposed in the roller tube 110.

The motorized window treatment 100 may be configured to pivot between the operating position and the extended position. For example, the motorized window treatment 100 may pivot about a fulcrum 165 that is located below the motorized window treatment 100 (e.g., the mounting brackets 130A, 130B) in the transverse direction T. Both of the mounting brackets 130A, 130B may be pivoted when the motorized window treatment is in the extended position. For example, the pivoting portions 150A, 150B of both of the mounting brackets 130A, 130B may be configured to slide away from the stationary portions 125A, 125B. In this configuration, both ends of the roller tube 110 may be further from the window and/or the structure when the motorized window treatment 100 is in the extended position than when the motorized window treatment 100 is in the operating position. Stated differently, the motorized window treatment 100 may slide between the operating position and the extended position. When the motorized window treatment 100 is in the extended position, the end portion 188 of the motor drive unit 190 may be exposed (e.g., accessible). The end portion 188 of the motor drive unit 190 may be located proximate to the first end 112 of the roller tube 110. The motor drive unit 190 may be received within a cavity 115 of the roller tube 110. The housing 180 may be configured to house one or more batteries 160 for powering the motor drive unit 190. Additionally or alternatively, the housing 180 may be configured to house the motor 197. It should be appreciated that the batteries 160 and the motor 197 may be in separate housings, for example, such that the housing 180 may house the batteries 160 and another housing (not shown) may house the motor 197.

The battery holder 170 may be received in the motorized window treatment 100 (e.g., in the motor drive unit 190). The battery holder 170 may be configured to retain the batteries 160. For example, the battery holder 170 may define a battery compartment 191 that is configured to receive the batteries 160. The battery holder 170 (e.g., the battery compartment 191) may be configured to keep the batteries 160 fixed in place securely while the batteries 160 are providing power to the motor drive unit 190. The battery holder 170 may be configured to clamp the batteries 160 together (e.g., as shown in FIG. 5) such that the batteries 160 can be removed from the battery-powered motorized window treatment 100 at the same time (e.g., together). The battery holder 170 may include a first collar 172 and a second collar 178 at opposed ends of the battery holder 170. The first collar 172 and the second collar 178 may be configured to keep the batteries 160 fixed in place (e.g., prevent longitudinal movement of the batteries 160). The first collar 172 may define a first cavity 171 and a second cavity 173 that are separated by an arm 174 that extends across the inner diameter of the first collar 172. The battery holder 170 may be configured to create a spring tension to hold the batteries 160 together. The battery holder 170 may include an internal spring 182 that is configured to maintain contact between the batteries 160 and an electrical contact 184 (e.g., a positive contact) within the battery holder 170. The internal spring 182 may extend within the battery compartment 191. The internal spring 182 may be configured to be compressed in the longitudinal direction L, for example, toward the second collar 178 when the batteries 160 are received within the battery compartment 191. The electrical contact 184 may be located on the first collar 172 within the battery compartment 191.

The battery holder 170 may be configured to be electrically connected to the printed circuit board 192 of the motor drive unit 190, for example, when the battery holder 170 is installed within the motor drive unit 190. The battery holder 170 may include external springs 183, 185 that are external to the battery compartment 191. The external springs 183, 185 may be located proximate to the second collar 178. The external springs 183, 185 may be configured to be located on opposed sides of the printed circuit board 192 when the battery holder 170 is installed within a cavity 181 of the housing 180 of the motor drive unit 190. The external spring 183 may be electrically connected to the internal spring 182. For example, the internal spring 182 may define a negative contact within the battery compartment 191. Stated differently, the internal spring 182 may be configured to abut a negative side of one of the batteries 160 within the battery compartment 191. The external spring 185 may be electrically connected to the electrical contact 184. For example, the electrical contact 184 may run external to the battery compartment 191 between the first collar 172 and the second collar 178. The external spring 183 may be configured to abut a first electrical pad 194 located on a first side (e.g., an upper surface) of the printed circuit board 192 when the battery holder 170 is secured within the housing 180. The external spring 185 may be configured to abut a second electrical pad 196 located on a second side (e.g., a lower surface) of the printed circuit board 192 when the battery holder 170 is secured within the housing 180. The external springs 183, 185 may be configured to be biased in the transverse direction T such that they remain in contact with the first electrical pad 194 and the second electrical pad 196 on the printed circuit board 192. The external springs 183, 185 may be configured to be biased in opposed transverse directions.

The battery holder 170 may be configured to be received within the cavity 181 of the housing 180. The second collar 178 may be positioned proximate to a far end of the cavity 181 and the battery holder 170 may be inserted into the housing 180 of the motor drive unit 190 (e.g., the cavity 181). The arm 174, the first cavity 171, and the second cavity 173 may be configured to enable the battery holder 170 to be rotated within the housing 180. For example, a force (e.g., a rotational force) may be applied to the arm 174 to rotate the battery holder 170 within the housing 180.

The battery holder 170 may be configured to be removed (e.g., completely removed as shown in FIG. 5) from the housing 180 of the motor drive unit 190 (e.g., the cavity 181). When the battery holder 170 is removed from the housing 180, the batteries 160 may be removed from the battery holder 170. Replacement batteries may be installed in the battery holder 170 and the battery holder 170 may be installed within the cavity 181 of the housing 180.

The battery holder 170 may be configured to be secured within the housing 180 of the motor drive unit 190 (e.g., the cavity 181) of the motor drive unit 190. When the battery holder 170 is installed within the housing 180 (e.g., the cavity 181), the battery holder 170 (e.g., the first collar 172) may be rotated to secure the battery holder 170 within the cavity 181 (e.g., to the housing 180). For example, the battery holder 170 (e.g., the first collar 172) may define one or more tabs (e.g., such as tabs 179 shown in FIG. 5) that are configured to secure the battery holder 170 to/within the housing 180. The tabs 179 may be located about a perimeter of the first collar 172. The housing 180 may define slots 189 that are configured to receive (e.g., captively receive) the tabs 179. Each of the slots 189 may extend partially about the perimeter of the housing 180 such that the tabs 179 can translate (e.g., angularly) therein as the battery holder 170 is rotated. As shown in FIG. 5, the battery holder 170 (e.g., the first collar 172) may include two tabs 179 that are located approximately 180 degrees from one another and the housing 180 may define two slots 189 that are aligned with the tabs 179. The number of slots 189 in the housing 180 may be equal to the number of tabs 179 on the battery holder 170. Although the battery holder 170 is shown having two tabs 179 and the housing 180 is shown with two slots 189, it should be appreciated that the battery holder 170 may include any number of tabs 179 (e.g., one, two, more than two) and the housing 180 may define any number of slots 189 (e.g., one, two, more than two).

The battery holder 170 may include a button 176. The button 176 may comprise an arm 175 that is cantilevered from the outer perimeter of the first collar 172. For example, the button 176 (e.g., the arm 175) may be defined by a slit 168 within the first cavity 171 that surrounds the button 176. The slit 168 may enable the button 176 to be biasable in the longitudinal direction L. For example, the button 176 may be configured to move in the longitudinal direction L in response to a force applied to the button 176. The button 176 may be accessible when the motorized window treatment 100 is in the extended position. For example, the button 176 may be accessible when the motorized window treatment 100 is in the extended position and the battery holder 170 is installed within the housing 180. The button 176 may be covered by the stationary portion 125A of the first mounting bracket 130A when the motorized window treatment 100 is in the operating position.

The button 176 may be configured to enable a mode change and/or enter an association mode for the motor drive unit 190. For example, the button 176 may be configured to disconnect the batteries 160 from the positive electrical contact 184. For example, the button 176 may be resiliently biasable toward the batteries 160 to push the batteries 160 away from the positive electrical contact 184 and disconnect the batteries 160 from the positive electrical contact 184. Disconnecting the batteries 160 from the positive electrical contact 184 and then reconnecting the batteries 160 to the positive electrical contact 184 may cause the motor drive unit 190 to change a mode of the motor drive unit 190. For example, the control circuit (e.g., such as control circuit 820 shown in FIG. 15) may be configured to reset (e.g., in response to becoming unpowered and then powered again) and enter a configuration mode (e.g., an association mode) in response to a transitory disconnection of the batteries 160 (e.g., for a predetermined duration). For example, during the configuration procedure of the motorized window treatment 100, the motor drive unit 190 may be associated with a remote control device, such that the control circuit of the motor drive unit 190 may be responsive to the wireless signals transmitted by the remote control device. In addition, the motor drive unit 190 may be configured with one or more operational settings (e.g., preset positions between the raised position and the lowered position) during the configuration procedure.

The housing 180 of the motor drive unit 190 may define one or more channels 189 (e.g., two channels 189) at the end portion 188 of the housing 180. The channel(s) 189 may extend angularly partly around the end portion 188. The channel(s) 189 may be configured to receive the tabs 179. The channel(s) 189 may be configured such that the battery holder 170 can be rotated while the tabs 179 are within the channel(s) 189. For example, the battery holder 170 may be rotated between an unlocked position and a locked position in a circumferential direction (e.g., an angular direction). When in the unlocked position, the tabs 179 may be aligned with openings of the channel(s) 189 such that the battery holder 170 can be removed from the housing 180 (e.g., the cavity 181).

The mounting brackets 130A, 130B may be configured to operate the motorized window treatment 100 between the operating position and the extended position. For example, pivoting portions 150A, 150B may be configured to operate the motorized window treatment 100 between the operating position and the extended position. The pivoting portions 150A, 150B may be referred to as sliding portions, rotating portions, and/or movable portions. A portion (e.g., the first collar 172 of the battery holder 170) of the motor drive unit 190 may be accessible when the motorized window treatment 100 is in the extended position. The pivoting portion 150A, 150B may be aligned with the stationary portion 125A, 125B when the motorized window treatment 100 is in the operating position such that the end portion of the motor drive unit 190 is covered by the stationary portion 125A.

The mounting brackets 130A, 130B may be configured to prevent the motorized window treatment 100 from extending beyond the extended position. The mounting brackets 130A, 130B may comprise a stopping mechanism. The stopping mechanism may include a flexible strap 155A, 155B that defines a first strap end 152A, 152B and a second strap end 159A, 159B. Each flexible strap 155A, 155B may be made of a flexible material, for example, such as metal, plastic, or a composite material. Each first strap end 152A, 152B may be configured to be captively received within the pivoting portion 150A, 150B of the respective mounting bracket 130A, 130B. For example, each pivoting portion 150A, 150B may define a channel 154A, 154B. Each channel 154A, 154B may be defined in an inner surface 153A, 153B of the respective pivoting portion 150A, 150B. Each channel 154A, 154B may extend partially around the perimeter (e.g., circumference) of the respective pivoting portion 150A, 150B. Each channel 154A, 154B may be configured to secure one of the flexible straps 155A, 155B (e.g., the first strap end 152A, 152B) within the respective pivoting portion 150A, 150B. Each flexible strap 155A, 155B may be configured to bend within the respective channel 154A, 154B. Each second strap end 159A, 159B may be configured to be secured to the stationary portion 125A, 125B of the respective mounting bracket 130A, 130B. The flexible straps 155A, 155B may be configured to prevent the motorized window treatment 100 from pivoting beyond the extended position. For example, the flexible straps 155A, 155B may be configured to hold the motorized window treatment 100 in the extended position (e.g., as shown in FIG. 4).

Each of the mounting brackets 130A, 130B (e.g., the stationary portion 125A, 125B) may define a slide 139A, 139B. Each slide 139A, 139B may extend from an inner surface 166A, 166B of the respective plate 136A, 136B. The slides 139A, 139B may protrude from the inner surfaces 166A, 166B in the longitudinal direction L. For example, the slide 139A may protrude in a first longitudinal direction and the slide 139B may protrude in a second longitudinal direction that is opposite the first longitudinal direction. The slides 139A, 139B may each be curved. The pivoting portions 150A, 150B may each define a channel 161A, 161B that is configured to receive the respective slide 139A, 139B.

The slide 139A, 139B may guide the pivoting portion 150A, 150B as it pivots away from the stationary portion 125A, 125B. For example, each slide 139A, 139B may define a pivot path of the pivoting portion 150A, 150B of the respective mounting brackets 130A, 130B. The pivot path may be a circular-shaped path (e.g., such as circular paths 810A, 810B shown in FIGS. 15-18). Each slide 139A, 139B may define a curvature that defines the pivot path. The pivot paths may be circular paths defined by the fulcrum 165 that is located below bottom edges 195A, 195B of each of the stationary portion 125A, 125B. The fulcrum 165 may be an axis that extends in the longitudinal direction L. The pivoting portions 150A, 150B may each pivot about the fulcrum 165 when the motorized window treatment 100 is operated between the operating position and the extended position. The pivoting portions 150A, 150B may each define a finger 151A, 151B that extends proximate to the respective channel 161A, 161B. Each finger 151A, 151B may be configured to guide the respective slide 139A, 139B into the respective channel 161A, 161B. The fingers 151A, 151B may each be configured to abut the respective slide 139A, 139B as the motorized window treatment 100 is operated between the operating position and the extended position.

The mounting brackets 130A, 130B may be configured to be mounted to a horizontal surface (e.g., such as a ceiling or upper portion of a window/door casing) or a vertical surface (e.g., such as a wall or side portion of a window/door casing) in the same orientation. For example, the pivot path with the fulcrum 165 below the bottom edges 195A, 195B may enable the mounting brackets 130A, 130B to operate between the operating position and the extended position when mounted to a horizontal surface or a vertical surface. Additionally or alternatively, locating the fulcrum 165 below the bottom edges 195A, 195B of the mounting brackets 130A, 130B may eliminate the need for an extension piece to operate between the operating position and the extended position.

The mounting bracket 130A may be configured to receive the end portion 188 of the housing 180 of the motor drive unit 190. For example, the pivoting portion 150A of the mounting bracket 130A may define an opening 148 that is configured to receive the end portion 188 of the housing 180. The pivoting portion 150A may include teeth 162 that extend into the opening 148. The teeth 162 may be configured to engage complementary features on the end portion 188 of the housing 180. For example, the end portion 188 of the housing 180 may define grooves 164 that are configured to receive the teeth 162. The number of grooves 164 on the end portion 188 may be equal to the number of teeth 162 on the pivoting portion 150A. Each of the grooves 164 on the end portion 188 may be aligned (e.g., circumferentially) with a respective one of the teeth 162 on the pivoting portion 150A. Although the figures show the pivoting portion 150A with four teeth 162 and the end portion 188 with four grooves 164, it should be appreciated that the pivoting portion 150A could have any number of teeth 162 (e.g., 2, 3, 4, 5, 6, etc.) and the end portion 188 could have any number of grooves 164 (e.g., 2, 3, 4, 5, 6, etc.).

The mounting bracket 130B may be configured to support the idler end portion 114 of the motorized window treatment 100. The idler end portion 114 may be received in the cavity 115 of the roller tube 110. For example, the pivoting portion 150B of the mounting bracket 130B may define an idler pin 146. The idler pin 146 may be configured to be received within an opening 144 (FIG. 6) in the idler end portion 114 of the motorized window treatment 100, for example, to support (e.g., rotatably support) the idler end portion 114 in the second end 113 of the roller tube 110. The idler end portion 114 of the motorized window treatment 100 may be configured to rotate about the idler pin 146 of the mounting bracket 130B.

The mounting brackets 130A, 130B may be configured to secure the motorized window treatment 100 in the extended position (e.g., as shown in FIGS. 9, 10, 13, and 14). The flexible straps 155A, 155B may be configured to secure the motorized window treatment 100 in the extended position. For example, the flexible straps 155A, 155B may be configured to secure the respective pivoting portion 150A, 150B to the respective stationary portion 125A, 125B. Each of the flexible straps 155A, 155B may be configured to be attached to the respective stationary portion 125A, 125B. For example, the flexible straps 155A, 155B (e.g., the first strap ends 152A, 152B) may each engage (e.g., interlock) with a catch 139A, 139B on the respective stationary portion 125A, 125B. Each catch 139A, 139B may extend from the respective first arm 132A, 132B. Each of the flexible straps 155A, 155B may be configured to engage (e.g., interlock) with a tab 169A, 169B within the respective channel 154A, 154B of the respective pivoting portion 150A, 150B, for example, when the motorized window treatment 100 is in the extended position. For example, the second strap ends 159A, 159B may abut the respective tabs 169A, 169B when the motorized window treatment 100 is in the extended position. The tabs 169A, 169B and the second strap ends 159A, 159B may be configured to prevent the motorized window treatment 100 from pivoting further than the extended position. The second strap ends 159A, 159B may each translate within the respective channel 154A, 154B as the motorized window treatment 100 is operated between the operating position and the extended position, for example, until the second strap ends 159A, 159B each abut the respective tab 169A, 169B. The first strap ends 152A, 152B may remain engaged with the respective catches 139A, 139B as the motorized window treatment 100 is operated between the operating position and the extended position. The flexible straps 155A, 155B (e.g., the first strap ends 152A, 152B and the second strap ends 159A, 159B) may be configured to support a predetermined torque applied to the roller tube 110.

The mounting brackets 130A, 130B may be configured to secure the motorized window treatment 100 in the operating position. The pivoting portions 150A, 150B may each include a latch 156A, 156B that is configured to secure the pivoting portion 150A, 150B to the respective stationary portion. The latches 156A, 156B may each extend proximate to the opening 158A, 158B of the respective channel 154A, 154B. Each latch 156A, 156B may be configured to engage a tab 137A, 137B extending from the first arm 132A, 132B of the stationary portion 125A, 125B of the respective mounting bracket 130A, 130B. The tabs 137A 137B may each extend in the transverse direction T (e.g., substantially parallel to the second arms 134A, 134B, respectively). The latches 156A, 156B may each be configured to disengage from the respective tab 137A, 137B when a force greater than a pre-defined threshold force is applied to the roller tube 110 in a direction away from the window. For example, the engagement between each latch 156A, 156B and the respective tab 137A, 137B may be configured to resist a force less than the pre-defined threshold force.

The motor drive unit 190 may include a light pipe 187 within the housing 180. The light pipe 187 may be configured to transmit light generated by a light source 177 mounted on the printed circuit board 192 to the end portion 188 of the motor drive unit 190. For example, the light source 177 may comprise a light-emitting diode (LED) (e.g., light source 328 shown in FIG. 24A). Additionally and/or alternatively, the battery holder 170 may comprise a channel (not shown) formed in an outer surface of the battery holder 170 (e.g., outer surface 222 shown in FIG. 23) and extending between the first collar 172 and the second collar 178. When the battery holder 170 is installed in the cavity 181 of the housing 180, the outer surface of the battery holder 170 may be configured to abut an inner surface of the housing 180, such that the channel and the inner surface of the housing 180 may form a tunnel extending from the first collar 172 to the second collar 174. The inner surface of the housing 180 and the surface of the channel may be reflective surfaces configured to reflect the light generated by the light source 177 to the end portion 188 of the housing 180. For example, the tunnel may be configured to direct the light generated by the light source 177 around the batteries 160. The inner surface of the housing 180 and the surface of the channel may be reflective surfaces, e.g., smooth white surfaces. For example, the housing 180 and the battery holder 170 may be made from a white material (e.g., white plastic) and may have a smooth finish.

Figure 15:
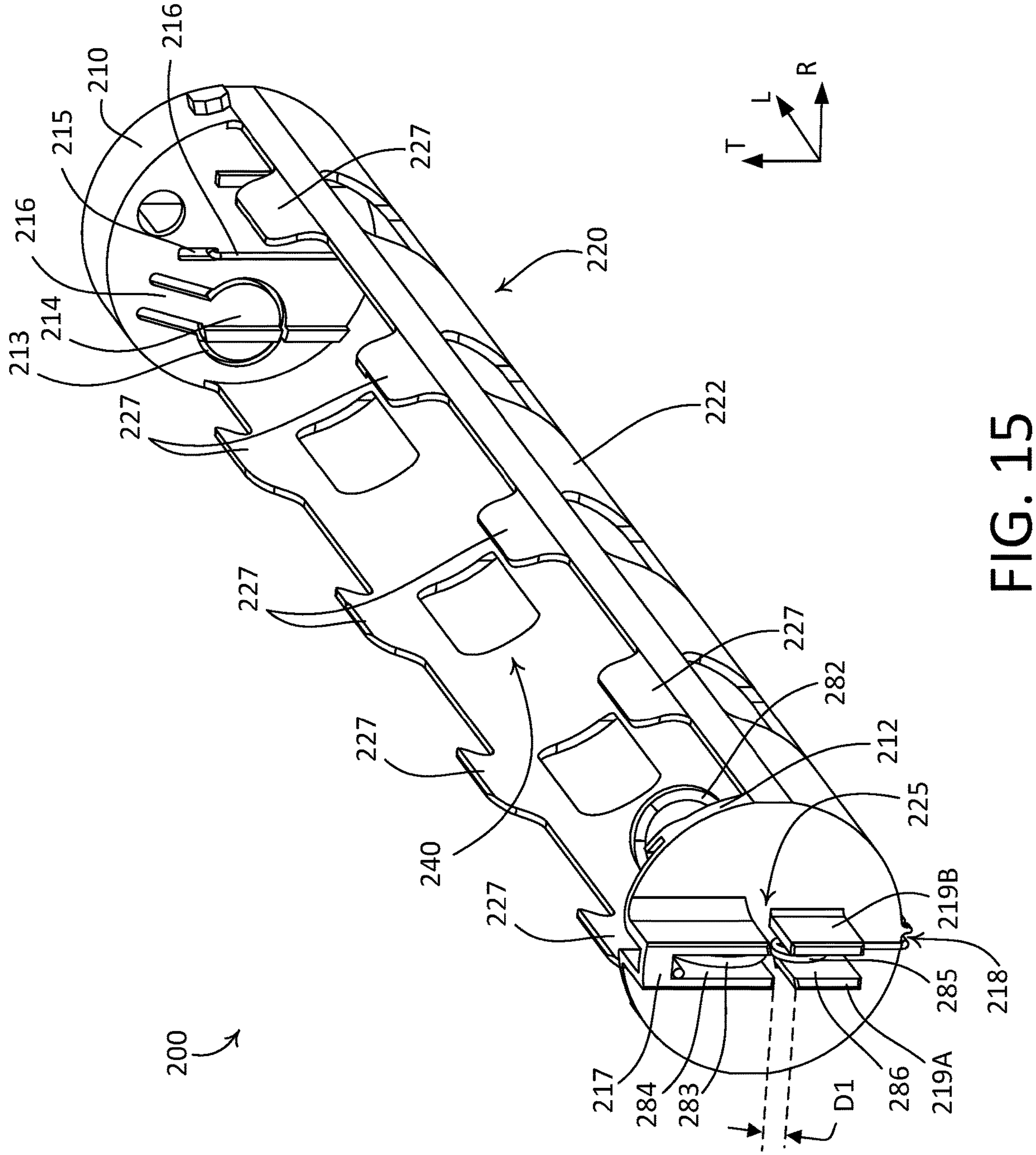
FIG. 15 is a perspective view of an example battery holder for use with the example motorized window treatment shown in FIG. 1.

FIG. 15 depicts an example battery holder 200 (e.g., such as the battery holder 170 shown in FIGS. 4-7 and 9) for use with a motorized window treatment (e.g., such as the motorized window treatment 100 shown in FIGS. 1-10). The battery holder 200 may be configured to retain a plurality of batteries (e.g., such as the batteries 160 shown in FIGS. 5 and 6). For example, the battery holder 200 may define a battery compartment 240 that is configured to receive the batteries. The battery compartment 240 may be a trough defined by a semi-cylindrical tube 220. The semi-cylindrical tube 220 may define an outer surface 222. The battery holder 200 (e.g., the battery compartment 240) may be configured to keep the batteries fixed in place securely while the batteries are providing power to a motor drive unit (e.g., such as the motor drive unit 190 shown in FIG. 6) of the motorized window treatment.

The battery holder 200 may be configured to clamp the batteries together such that the batteries can be removed from the battery-powered motorized window treatment at the same time (e.g., together). The battery holder 200 may include a first collar 210 and a second collar 212 at opposed ends of the battery holder 200. The first collar 210 and the second collar 212 may be configured to keep the batteries fixed in place (e.g., prevent longitudinal movement). The battery holder 200 may be configured to create a spring tension to hold the batteries together. The battery holder 200 may include an internal spring 282 that is configured to maintain contact between the batteries and an electrical contact 216 (e.g., a positive contact) within the battery holder 200 (e.g., the battery compartment 240). The internal spring 282 may extend within the battery compartment 240. The internal spring 282 may be configured to be compressed in the longitudinal direction L, for example, toward the second collar 212 when the batteries are received within the battery compartment 240. The electrical contact 216 may be located proximate to the first collar 210 within the battery compartment 240. For example, the electrical contact 216 may be an exposed conductor (e.g., an uninsulated wire) that extends through an aperture 215 in the first collar 210.

The battery holder 200 may be configured to be electrically connected to a printed circuit board (e.g., such as the printed circuit board 192 shown in FIG. 6) of the motor drive unit, for example, when the battery holder 200 is installed within the motor drive unit. The battery holder 200 may include external springs 283, 285 that are external to the battery compartment 240. The external springs 283, 285 may be located proximate to the second collar 212. The external springs 283, 285 may be configured to be located on opposed sides of the printed circuit board when the battery holder 200 is installed within a cavity of the motor drive unit. One of the external springs (e.g., the external spring 283) may be electrically connected to the internal spring 282. For example, the internal spring 282 may be a negative contact within the battery compartment 240. Stated differently, the internal spring 282 may be configured to abut a negative side of one of the batteries within the battery compartment 240. The other one of the external springs (e.g., the external spring 185) may be electrically connected to the electrical contact 216. For example, the external spring 185 may be electrically connected to the electrical contact 216 through an electrical connector, e.g., a portion of wire 218, that runs external to the battery compartment 240 (e.g., proximate to the outer surface 222 of the semi-cylindrical tube 220) between the first collar 210 and the second collar 212.

The external spring 283 may be configured to abut a first electrical pad (e.g., such as the electrical pad 194 shown in FIG. 6) on a first side of the printed circuit board when the battery holder 200 is secured within a housing of the motor drive unit. The external spring 285 may be configured to abut a second electrical pad (e.g., such as the electrical pad 196 shown in FIG. 6) on a second side of the printed circuit board when the battery holder 200 is secured within the housing of the motor drive unit. The external springs 283, 285 may be configured to be biased in the transverse direction T such that they remain in contact with the first and second electrical pads. The battery holder 200 may define a frame 217 that is configured to enclose the external spring 283. For example, the frame 217 may define a channel 284 that is configured to receive the external spring 283. The frame 217 may be configured to protect the external spring 283 from being damaged. The battery holder 200 may define walls 219A, 219B that are configured to extend on either side of the external spring 285. The walls 219A, 219B may define a channel 286 that is configured to receive the external spring 285. The walls 219A, 219B may be configured to protect the external spring 285 from being damaged. The frame 217 and the walls 219A, 219B may be configured to prevent electrical shock when handling the battery holder 200.

The frame 217 and the walls 219A, 219B may be separated by a distance D1 that is configured to enable the external springs 283, 285 to remain in contact with the first and second electrical pads when the battery holder 200 is rotated to secure the battery holder 200 within the housing of the motor drive unit. For example, the distance D1 may provide the tolerance required to secure the battery holder 200 while maintaining contact between the external springs 283, 285 and respective electrical pads on the printed circuit board. The battery holder 200 may define a notch 225 between the external spring 283 and the external spring 285. The notch 225 may be defined by the frame 217 and the walls 219A, 219B. The notch 225 may define a width of distance D1. The notch 225 may be configured to receive the printed circuit board of the motor drive unit when the battery holder 200 is fully inserted into the motor drive unit housing and when the battery holder 200 is secured within the motor drive unit housing. The notch 225 may be configured to receive (e.g., maintain receipt) of the printed circuit board of the motor drive unit when the battery holder 200 is rotated to secure the battery holder 200 within the motor drive unit housing.

The battery holder 200 may be configured to be secured within the housing of the motor drive unit. When the battery holder 200 is installed within the housing of the motor drive unit, a rotational force may be applied to the battery holder 200 (e.g., first collar 212) such that the battery holder 200 is rotated to secure the battery holder 200 within the housing of the motor drive unit. For example, the battery holder 200 (e.g., the first collar 212) may define one or more tabs (e.g., such as tabs 179 shown in FIG. 5) that are configured to secure the battery holder 200 to the housing of the motor drive unit. The tabs may be located about a perimeter of the first collar 212.

The battery holder 200 may include a button 214. The button 214 may comprise an arm that is cantilevered from a location proximate to the outer perimeter of the first collar 212. For example, the button 214 (e.g., the arm) may be defined by a slit 213 through the first collar 212. The slit 213 may partially surround the button 214 such that the button is cantilevered from the first collar 212. The slit 213 may enable the button 214 to be resiliently biasable in the longitudinal direction L. For example, the button 214 may be configured to move in the longitudinal direction L in response to a force applied to the button 214. The button 214 may be accessible when the motorized window treatment 100 is in the extended position.

The battery holder 200 may comprise tabs 227 extending from opposed sides (e.g., along the radial direction R) of the semi-cylindrical tube 220. The tabs 227 may extend beyond 180 degrees (e.g., the semi-circular cross-section of the battery holder 200). A pair of the tabs 227 that are aligned in the longitudinal direction L may be configured to abut and apply a force to a respective battery of the batteries to retain the respective battery within the battery compartment 240 in the transverse direction T. Each pair of the tabs 227 may be separated (e.g., in the radial direction R) by less than a diameter of the batteries both when no battery is installed proximate to the respective pair of tabs 227 and when a battery is installed proximate to the respective pair of tabs 227. The tabs 227 may be configured to be biased outward (e.g., flex outward from their resting position) to enable the batteries to be installed within the battery holder 200 (e.g., the battery compartment 240).

The battery holder 200 may include a reflector that is configured to reflect the light generated by a light source (e.g., light source 328 shown in FIG. 24A) on the printed circuit board to an end portion of the housing of the motor drive unit. For example, the reflector may be configured to direct the light generated by the light source around the batteries and/or battery compartment 240. In examples, the outer surface 222 may comprise the reflector. For example, the outer surface 222 of the battery holder 200 may be reflective.

Figure 17:
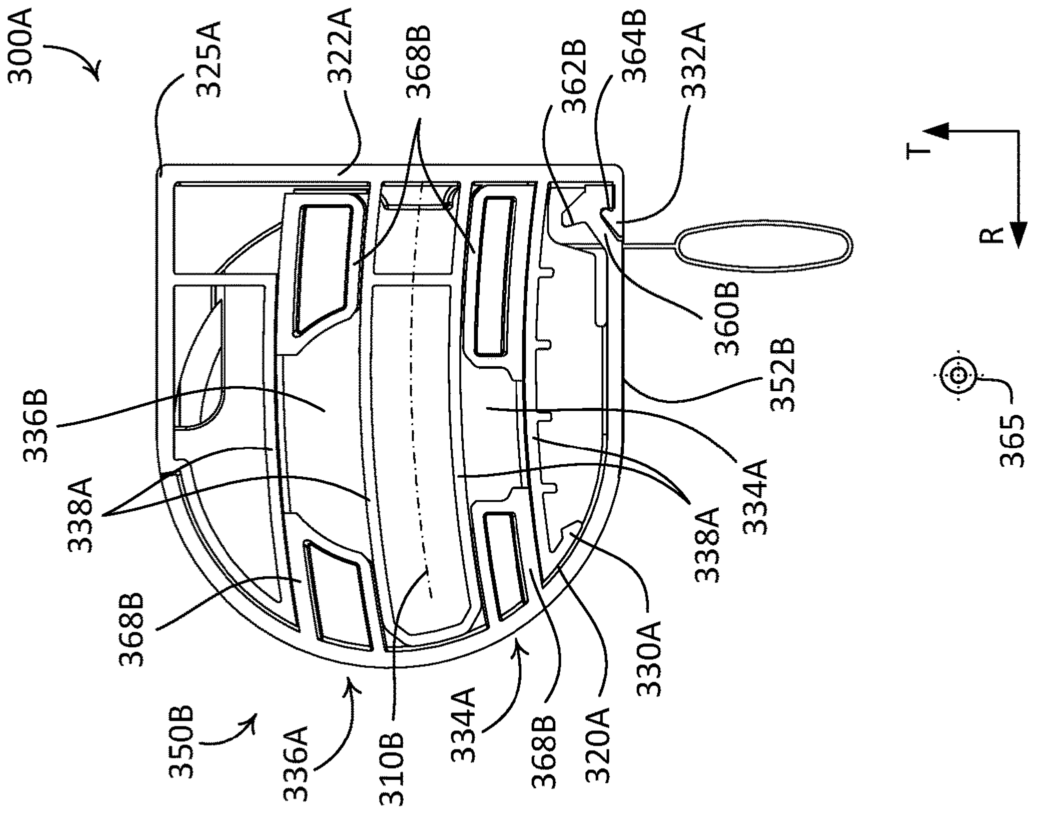
FIG. 17 is right-side cross-section view of the example motorized window treatment shown in FIG. 16 with the roller tube in the operating position.
Figure 16:
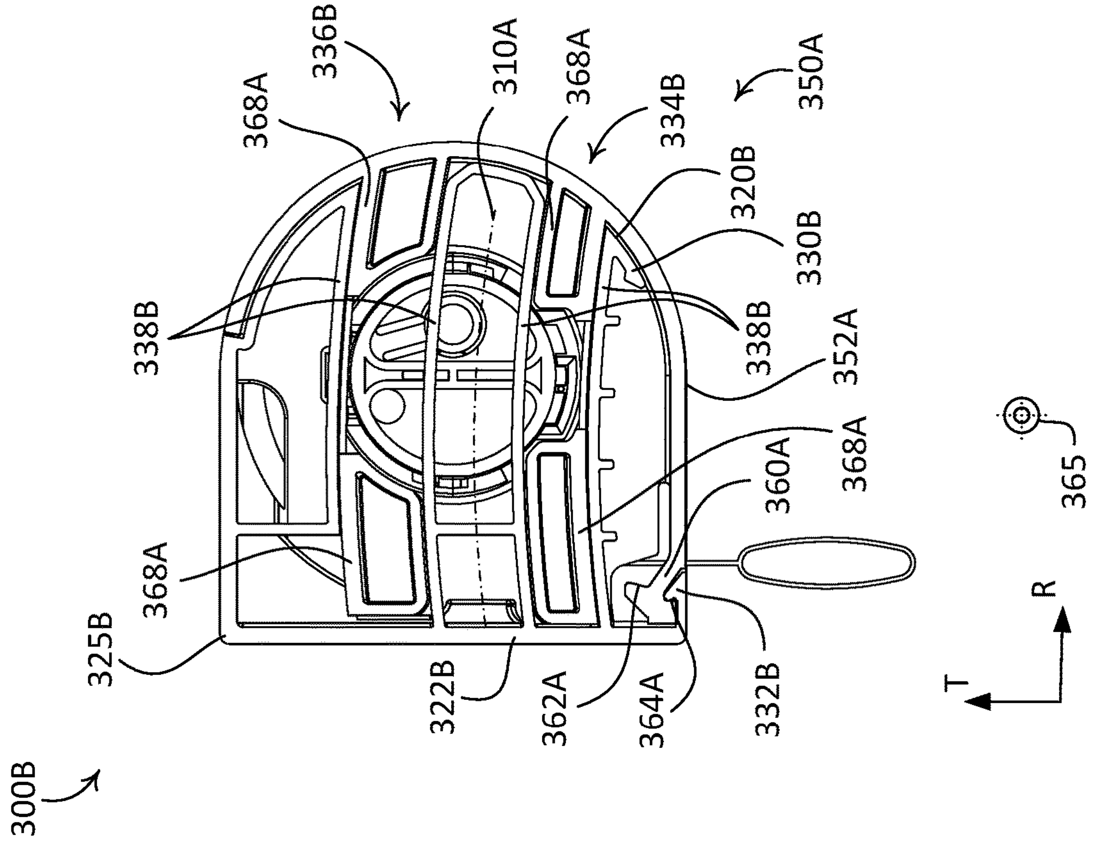
FIG. 16 is a left-side cross-section view of another example motorized window treatment with the roller tube in the operating position.
Figure 19:
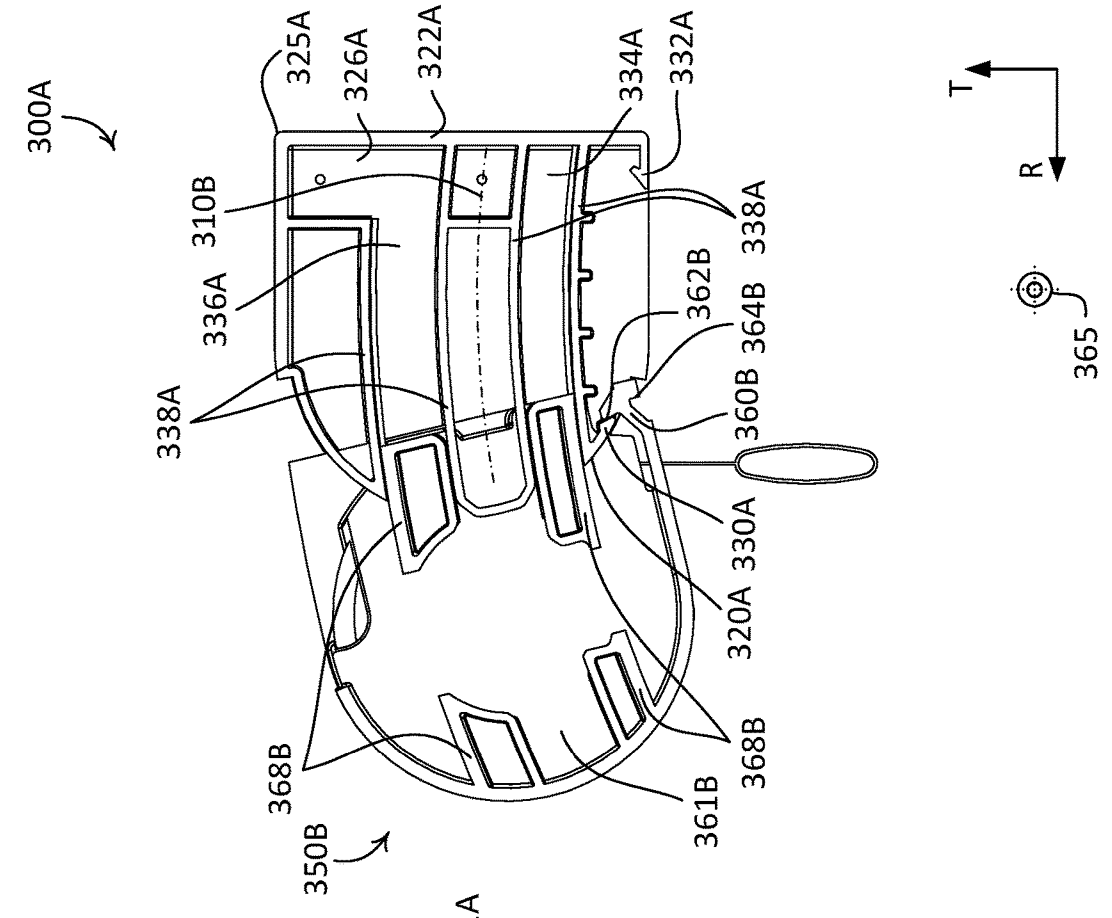
FIG. 19 is another right-side cross-section view of the example motorized window treatment shown in FIG. 16 with the roller tube in the extended position.
Figure 18:
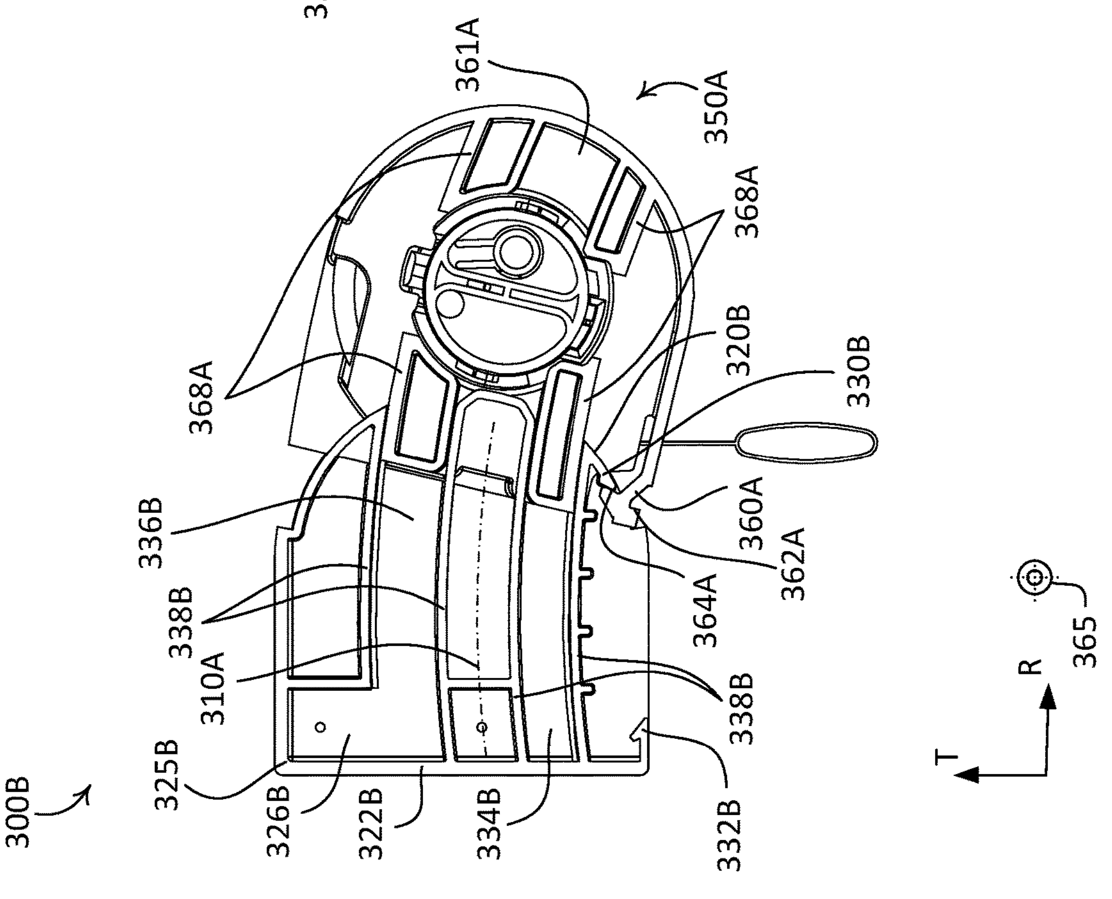
FIG. 18 is another left-side cross-section view of the example motorized window treatment shown in FIG. 16 with the roller tube in the extended position.
Figure 20:
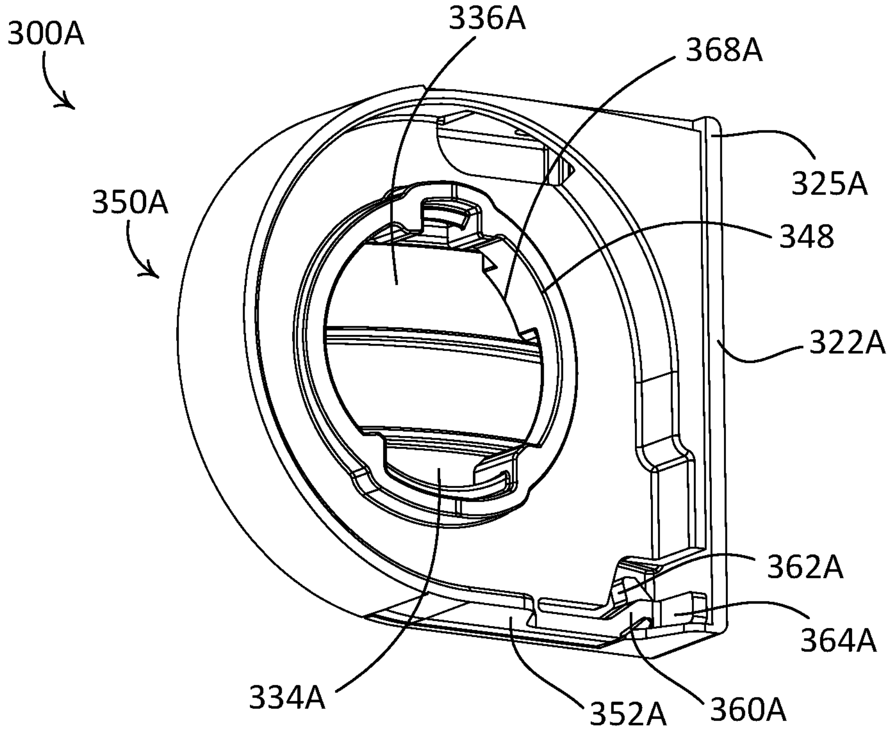
FIG. 20 is a perspective view of another example mounting bracket with a movable portion aligned with a stationary portion.
Figure 21:
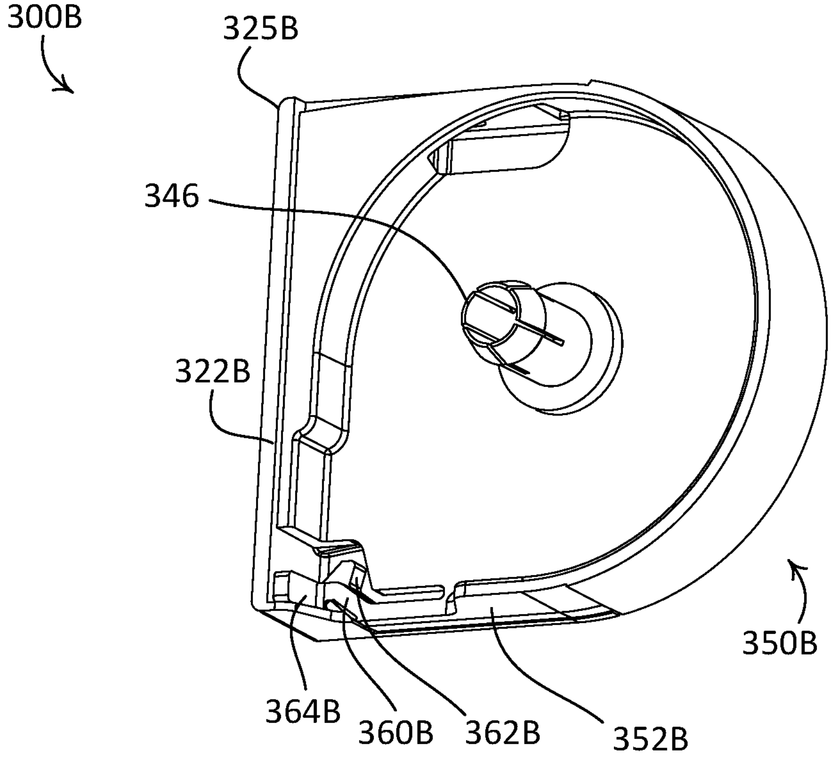
FIG. 21 is a perspective view of another example mounting bracket with the movable portion aligned with the stationary portion.
Figure 22:
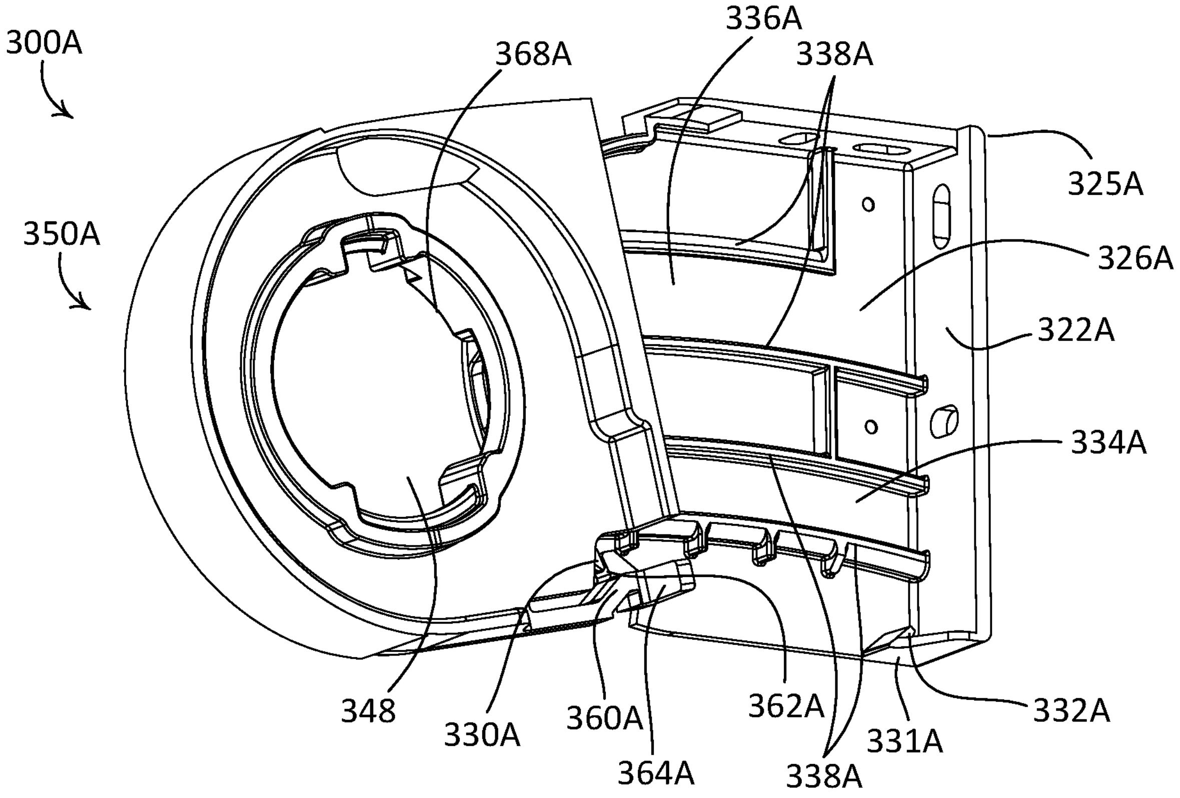
FIG. 22 is a perspective view of the example mounting bracket shown in FIG. 20 with the movable portion pivoted away from the stationary portion.
Figure 23:
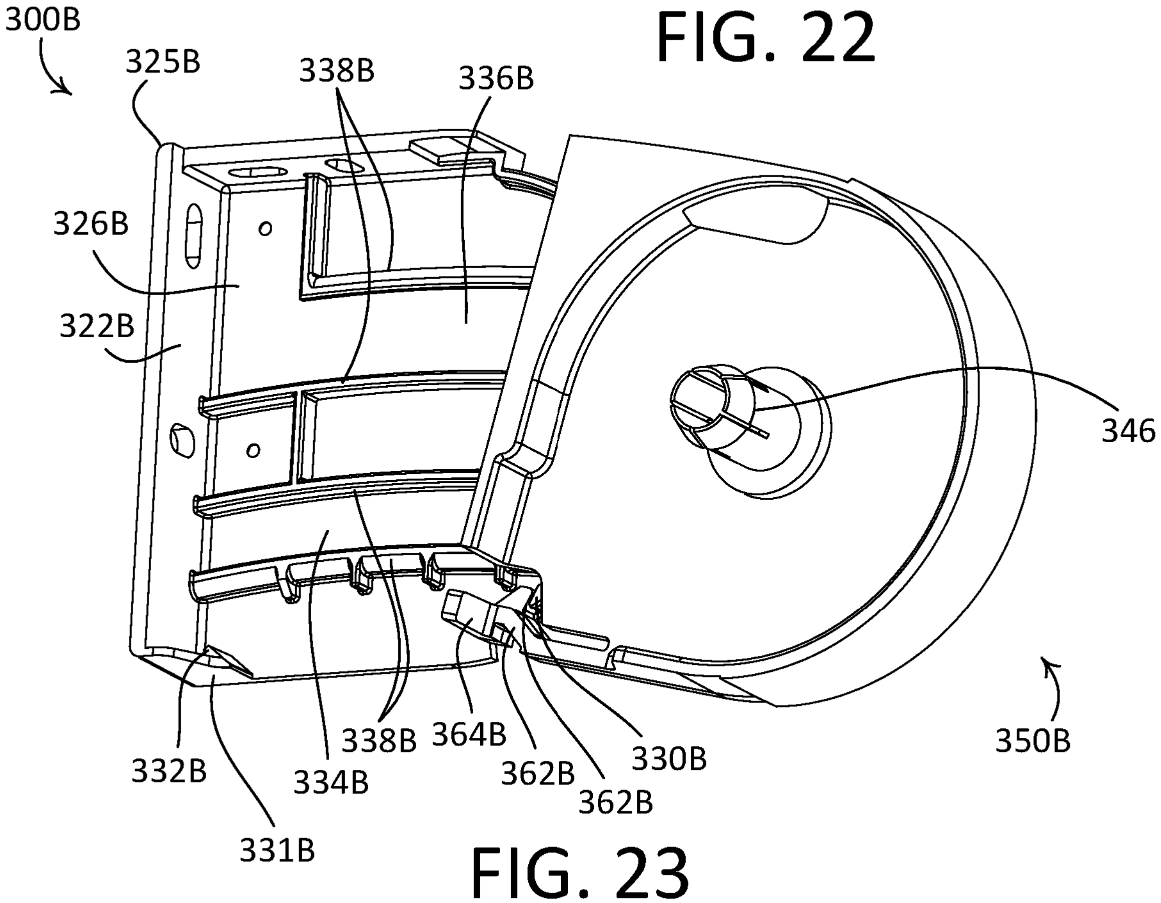
FIG. 23 is a perspective view of the example mounting bracket shown in FIG. 21 with the movable portion pivoted away from the stationary portion.

FIGS. 16-23 depict another set of example mounting brackets 300A, 300B for use in a motorized window treatment (e.g., such as the motorized window treatment 100 shown in FIGS. 1-6). FIGS. 16 and 16 are side cross-section views of the example motorized window treatment in the operating position. FIG. 16 is a left-side cross-section taken through the mounting bracket 300A looking toward the mounting bracket 300B. FIG. 17 is a right-side cross-section taken through the mounting bracket 300B looking toward the mounting bracket 300A. FIGS. 18 and 19 are side cross-section views of the example motorized window treatment in the extended position. FIG. 18 is a left-side cross-section taken through the mounting bracket 300A looking toward the mounting bracket 300B. FIG. 19 is a right-side cross-section taken through the mounting bracket 300B looking toward the mounting bracket 300A. FIGS. 20 and 21 are perspective views of the mounting brackets 300A, 300B when the motorized window treatment is in the operating position. FIGS. 22 and 23 are perspective views of the mounting brackets 300A, 300B when the motorized window treatment is in the extended position.

The mounting brackets 300A, 300B may be configured to enable access to one or more ends of a roller tube (e.g., such as the roller tube 110 shown in FIGS. 1 and 6) and/or the motor drive unit while remaining secured to the mounting brackets 130A, 130B. For example, the motorized window treatment may be adjusted (e.g., rotated, pivoted, and/or slid) between an operating position (e.g., as shown in FIG. 1) to an extended position (e.g., as shown in FIGS. 4 and 5) while a window treatment assembly (e.g., such as the window treatment assembly 111 shown in FIG. 1) is secured to the mounting brackets 300A, 300B. The operating position may be defined as a position in which the roller tube of the window treatment assembly is supported by and aligned with both mounting brackets 300A, 300B. The extended position may be defined as a position in which one or more ends of the roller tube and/or the motor drive unit are accessible while still attached to the mounting brackets 300A, 300B.

When in the motorized window treatment is in the extended position, the one or more ends (e.g., end portions) of the motor drive unit and/or roller tube may be accessed, for example, to replace batteries, adjust one or more settings, make an electrical connection, repair one or more components, and/or the like. One or more of the mounting brackets 300A, 300B may enable an end portion of the motor drive unit, such as the end portion 188 of the motor drive unit 190, to be accessed when the motorized window treatment 100 is in the extended position. Each of the mounting brackets 300A, 300B may include a respective stationary portion 325A, 325B configured to be mounted to the structure and a respective movable portion 350A, 350B configured to move (e.g., slide, pivot, or rotate) away from the structure. The movable portions 350A, 350B may be referred to as pivoting portions, sliding portions, and/or rotating portions. For example, the movable portion 350A of the first mounting bracket 300A may be configured to move (e.g., slide, pivot, or rotate) away from the structure to enable the end portion of the motor drive unit to be accessible. For example, a first portion (e.g., the movable portion 350A, 350B) of one or more of the mounting brackets 300A, 300B may pivot or rotate away from a second portion (e.g., the stationary portion 325A, 325B). For example, the movable portions 350A, 350B of the mounting brackets 300A, 300B may be adjusted with respect to the stationary portions 325A, 325B, for example, to expose the end portion of the motor drive unit and/or the idler end portion disposed in the roller tube.

The motorized window treatment may be configured to move (e.g., slide, pivot, or rotate) between the operating position and the extended position along a circular path 310A, 310B. For example, the motorized window treatment may move about a fulcrum 365 that is located below the motorized window treatment (e.g., the mounting brackets 300A, 300B) in the transverse direction T. For example, the fulcrum 365 may be located below the lower wall 331A, 331B of the stationary portion 325A, 325B of the mounting brackets 300A, 300B (e.g., outside of an area defined by the bracket). Stated differently, the fulcrum 365 may be located outside of a footprint (e.g., projection) of the mounting brackets in a plane defined by the transverse direction T and the radial direction R. The fulcrum 365 may be the center of a circle defined by the circular path 310A, 310B. Both of the mounting brackets 300A, 300B may be moved when the motorized window treatment is in the extended position. For example, the movable portions 350A, 350B of both of the mounting brackets 300A, 300B may be configured to slide away from the stationary portions 325A, 325B, for example, along the circular path 310A, 310B. In this configuration, both ends of the roller tube may be further from the window and/or the structure when the motorized window treatment is in the extended position than when the motorized window treatment is in the operating position. Stated differently, the motorized window treatment may slide between the operating position and the extended position, for example, along the circular path 310A, 310B.

The mounting brackets 300A, 300B may be configured to operate the motorized window treatment between the operating position and the extended position. For example, the movable portions 350A, 350B may be configured to operate the motorized window treatment 100 between the operating position and the extended position. A portion (e.g., such as the first collar 172 of the battery holder 170 shown in FIG. 6) of the motor drive unit may be accessible when the motorized window treatment is in the extended position. The movable portion 350A, 350B may be aligned with the stationary portion 325A, 325B when the motorized window treatment is in the operating position such that the end portion of the motor drive unit is covered by the stationary portion 325A.

The mounting brackets 300A, 300B may be configured to secure the motorized window treatment in the extended position and/or the operating position. The mounting brackets 300A, 300B may each include a stopping mechanism (e.g., such as the stopping arm 360A, 360B) that is configured to prevent the motorized window treatment from extending beyond the extended position. Each stopping arm 360A, 360B may be made of a stiff material, for example, such as metal, plastic, or a composite material. The stopping arms 360A, 360B may extend from a lower wall 352A, 352B of the moving portions 350A, 350B. The stopping arms

360A, 355B may be configured to engage a tab 330A, 330B extending from the stationary portions 325A, 325B, for example, when the motorized window treatment is in the extended position. The tab 330A, 330B may extend from a front edge 320A, 320B of the stationary portions 325A, 325B. The front edge 320A, 320B may be curved. The tab 330A, 330B may be configured to prevent the motorized window treatment from extending beyond the extended position. The stopping arms 360A, 360B may define an upper surface 362A, 362B that is configured to abut the tab 330A, 330B when the motorized window treatment is in the extended position.

The stopping arms 360A, 360B may be configured to secure the motorized window treatment in the operating position. The stopping arms may be configured to engage a catch 332A, 332B extending from the stationary portion 325A, 325B. For example, the catch 332A, 332B may extend from a lower wall 331A, 331B of the stationary portion 325A, 325B. The catch 332A, 332B may be configured to engage the stopping arms 355A, 355B when the motorized window treatment is in the operating position. The stopping arms 360A, 360B may define a lower surface 364A, 364B that is configured to abut the catch 332A, 332B when the motorized window treatment is in the extended position. The catch 332A, 332B may be configured to resist a pre-defined threshold force applied to the roller tube in a direction away from the window (e.g., the radial direction R). For example, the stopping arms 360A, 360B may be configured to disengage from the catches 332A, 332B when a force greater than the pre-defined threshold force is applied to the roller tube in the direction away from the window.

Each of the mounting brackets 300A, 300B (e.g., the stationary portion 325A, 325B) may define one or more channels (e.g., such as channels 334A, 336A on mounting bracket 300A and channels 334B, 336B on mounting bracket 300B). Each of the channels 334A, 336A may be defined by a respective pair of ribs 338A. Each of the channels 334B, 336B may be defined by a respective pair of ribs 338B. The ribs 338A, 338B may extend from a side plate 326A, 326B of the mounting brackets 300A, 300B. The channels 334A, 336A, 334B, 336B may be curved. A curvature of the channels 334A, 336A, 334B, 336B may define the circular-shaped path 310A, 310B. The curvature of the channels 334A, 336A, 334B, 336B may be configured to enable the end portion of the motor drive unit and/or roller tube may be accessed, for example, to replace batteries, adjust one or more settings, make an electrical connection, repair one or more components, and/or the like.

Each of the mounting brackets 300A, 300B (e.g., the stationary portion 325A, 325B) may define one or more slide guides 368A, 368B. The slide guides 368A, 368B may protrude (e.g., in the longitudinal direction L) from an outer surface 361A, 361B of the movable portion 350A, 350B. The slide guides 368A, 368B may be configured to be received within respective channels 334A, 334B, 336A, 336B. The slide guides 368A, 368B and the channels 334A, 334B, 336A, 336B may be configured to support the window treatment assembly (e.g., in the transverse direction T). The slide guides 368A, 368B and the channels 334A, 334B, 336A, 336B may be configured to enable the movable portion 350A, 350B to slide with respect to the stationary portion 325A, 325B. The channels 334A, 334B, 336A, 336B (e.g., and the slide guides 368A, 368B) may define the circular path 310A, 310B. For example, the channels 334A, 334B, 336A, 336B (e.g., and the slide guides 368A, 368B) may define a curvature that matches the circular path 310A, 310B. One or more of the slide guides 368A, 368B may remain within the channels 334A, 334B, 336A, 336B when the motorized window treatment is in the extended position. One or more of the slide guides 368A, 368B may leave the channels 334A, 334B, 336A, 336B when the motorized window treatment is in the extended position. One or more of the slide guides 368A, 368B may abut (e.g., and slide along) one or more of the channels 334A, 334B, 336A, 336B as the motorized window treatment is operated between the operating position and the extended position.

The mounting bracket 300A may be configured to receive and support the end portion of the housing. For example, the movable portion 350A of the mounting bracket 300A may define an opening 348 that is configured to receive the end portion of the housing. The mounting bracket 300B may be configured to support the idler end portion of the motorized window treatment. The idler end portion may be received in a cavity of the roller tube. For example, the movable portion 350B of the mounting bracket 300B may define an idler pin 346. The idler pin 346 may be configured to be received within an opening (e.g., such as the opening 144 shown in FIG. 6) in the idler end portion of the motorized window treatment, for example, to support the idler end portion in the second end of the roller tube. The idler end portion of the motorized window treatment may be configured to rotate about the idler pin 346 of the mounting bracket 300B.

Figure 24A:
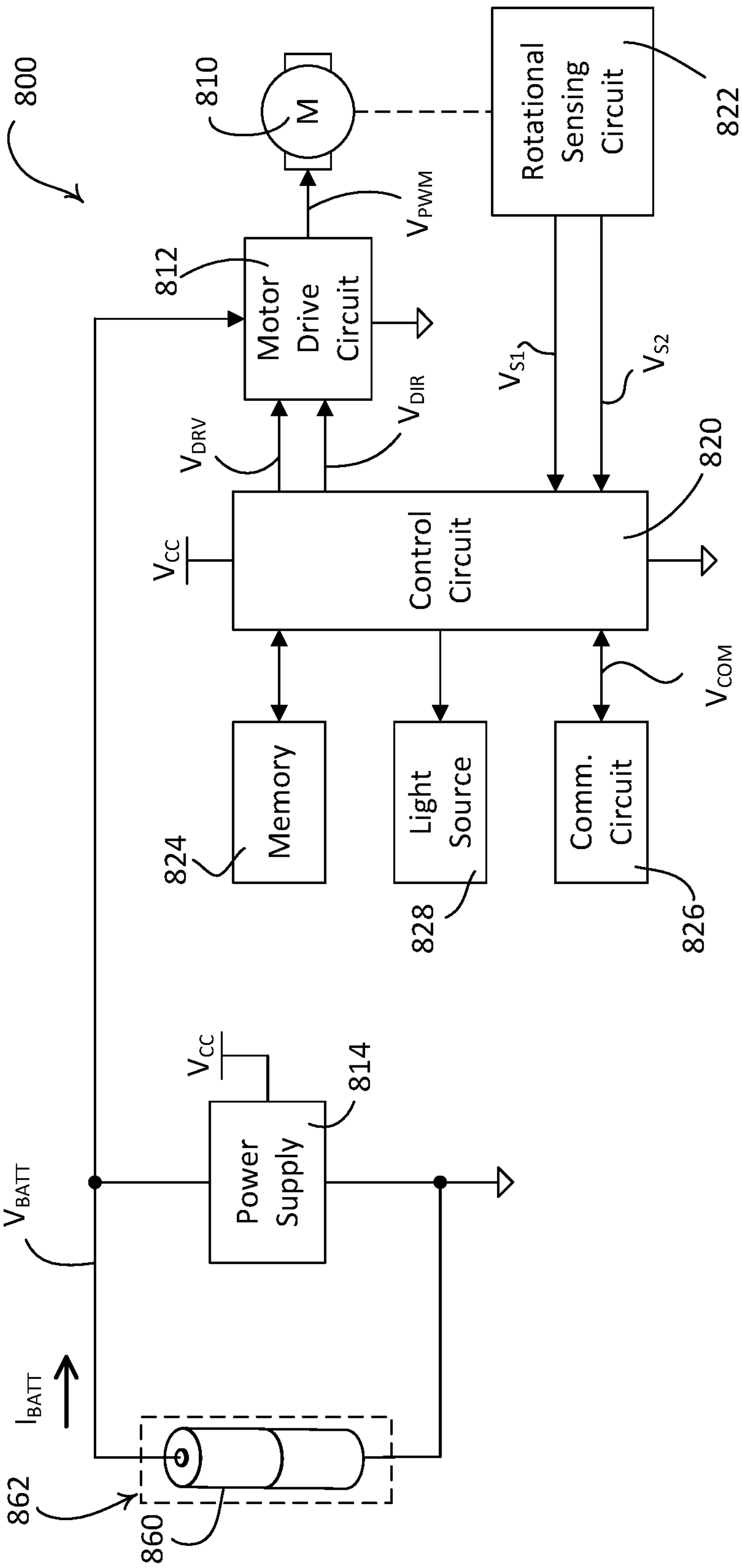
FIG. 24A is a simplified block diagram of a motor drive unit of a motorized window treatment.

FIG. 24A is a simplified block diagram of a motor drive unit 800 of a motorized window treatment (e.g., the motor drive unit 190 of the motorized window treatment 100). The motor drive unit 800 may include a motor 810 (e.g., a direct-current motor) that may be coupled to a roller tube of the motorized window treatment (e.g., the roller tube 110) for rotating the roller tube. Rotation of the roller tube may be configured to raise and lower a covering material (e.g., the flexible material 120). The motor drive unit 800 may comprise a compartment 862 (e.g., which may be an example of the battery holder 170 of the motorized window treatment 100 shown in FIGS. 4-10 and/or the battery holder 200 shown in FIG. 15) that is configured to receive a DC power source. The DC power source may be, for example, one or more batteries 860. In this example, the compartment 862 may be configured to receive one or more batteries 860 (e.g. four “D” batteries), such as the batteries 160 shown in FIGS. 5 and 6. The batteries 860 may provide a battery voltage $V_{BATT}$ to the motor drive unit 800. In addition, alternate DC power sources, such as a solar cell (e.g., a photovoltaic cell), an ultrasonic energy source, and/or a radio-frequency (RF) energy source, may be coupled in parallel with the one or more batteries 860, or in some examples be used as an alternative to the batteries 860. Further, an external DC power supply may be configured to be coupled in parallel with the one or more batteries 860. The alternate DC power source and/or the external DC power supply may be used to perform the same and/or similar functions as the one or more batteries 860.

The motor drive unit 800 may include a motor drive circuit 812 (e.g., an H-bridge drive circuit) that receives the battery voltage $V_{BATT}$ and may generate a pulse-width modulated (PWM) voltage $V_{PWM}$ for driving the motor 810. While not shown in FIG. 24A, the motor drive unit 800 may comprise a power converter circuit (e.g., a boost converter circuit) coupled between the batteries 860 and the motor drive circuit 812 for receiving the battery voltage $V_{BATT}$ and generating a boosted voltage that may be received by the motor drive circuit 812 for driving the motor 812. The motor drive unit 800 may also include a power supply 814 that may receive the battery voltage $V_{BATT}$ and generate a supply voltage $V_{CC}$ for powering the low-voltage circuitry of the motor drive unit.

The motor drive unit 800 may include a control circuit 820 for controlling the operation of the motor 810. The control circuit 820 may include, for example, a microprocessor, a programmable logic device (PLD), a microcontroller, an application specific integrated circuit (ASIC), a field-programmable gate array (FPGA), or any suitable processing device or control circuit. The control circuit 820 may be configured to generate one or more drive signals $V_{DR}$ for controlling the motor drive circuit 812. The one or more drive signals $V_{DR}$ may be configured to control a rotational speed and/or a direction of rotation of the motor 810.

The motor drive unit 800 may include a rotational position sensing circuit 822, such as, for example, a Hall effect sensor (HES) circuit, which may be configured to generate first and second rotational position sensing signals $V_{S1}$, $V_{S2}$. The first and second rotational position sensing signals $V_{S1}$, $V_{S2}$ may indicate the rotational speed and/or the direction of the motor 810 to the control circuit 820. The rotational position sensing circuit 822 may include other suitable position sensors, such as, for example, magnetic, optical, and/or resistive sensors. The control circuit 820 may be configured to determine the rotational position of the motor 810 in response to the first and second rotational position sensing signals $V_{S1}$, $V_{S2}$ generated by the rotational position sensing circuit 822. The control circuit 820 may be configured to determine a present position of the covering material in response to the rotational position of the motor 810. The control circuit 820 may be coupled to a memory 824 (e.g., a non-volatile memory). The present position of the covering material and/or limits for controlling the position of the covering material (e.g., a fully-raised position and/or a fully-lowered position) may be stored in the memory 824. The operation of a motor drive circuit and a rotational position sensing circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 800 may include a communication circuit 826 that may allow the control circuit 820 to transmit and receive signals, e.g., wired signals and/or wireless signals, such as radio-frequency (RF) signals. The control circuit 820 may be configured to control the motor 810 to control the movement of the covering material in response to a shade movement command received in signals received via the communication circuit 826 from a remote control device (e.g., during a normal operation mode). During a configuration procedure (e.g., an association procedure), the motor drive unit 800 may be associated with the remote control device, such that the motor drive unit 300 may be responsive to the messages transmitted by the remote control device (e.g., via wireless signals). The control circuit 820 may be configured to enter a configuration mode (e.g., an association mode) in response to in response a reset of the control circuit 820 (e.g., as caused by a transitory disconnection of the batteries 860 resulting from an actuation of a button). For example, disconnecting the batteries 860 from the motor drive unit 800 and then reconnecting the batteries 860 to the motor drive unit 800 may cause the motor drive unit 800 (e.g., the control circuit 820) to change a mode of the motor drive unit 800 (e.g., between the normal operation mode and the configuration mode). For example, the control circuit 820 may be configured to reset (e.g., in response to becoming unpowered and then powered again) and enter the configuration mode (e.g., the association mode) in response to a transitory disconnection of the batteries 860 (e.g., for a predetermined duration).

In addition, the motor drive unit 800 may be configured with one or more operational settings (e.g., preset positions between the raised position and the lowered position) during the configuration procedure. The motor drive unit 800 may include a light source 828 (e.g., one or more light-emitting diodes (LEDs)) that may be illuminated by the control circuit 820, for example, to provide feedback to the user of the motorized window treatment (e.g., during the configuration mode to indicate that the motor drive unit 800 is in the configuration mode).

Figure 24B:
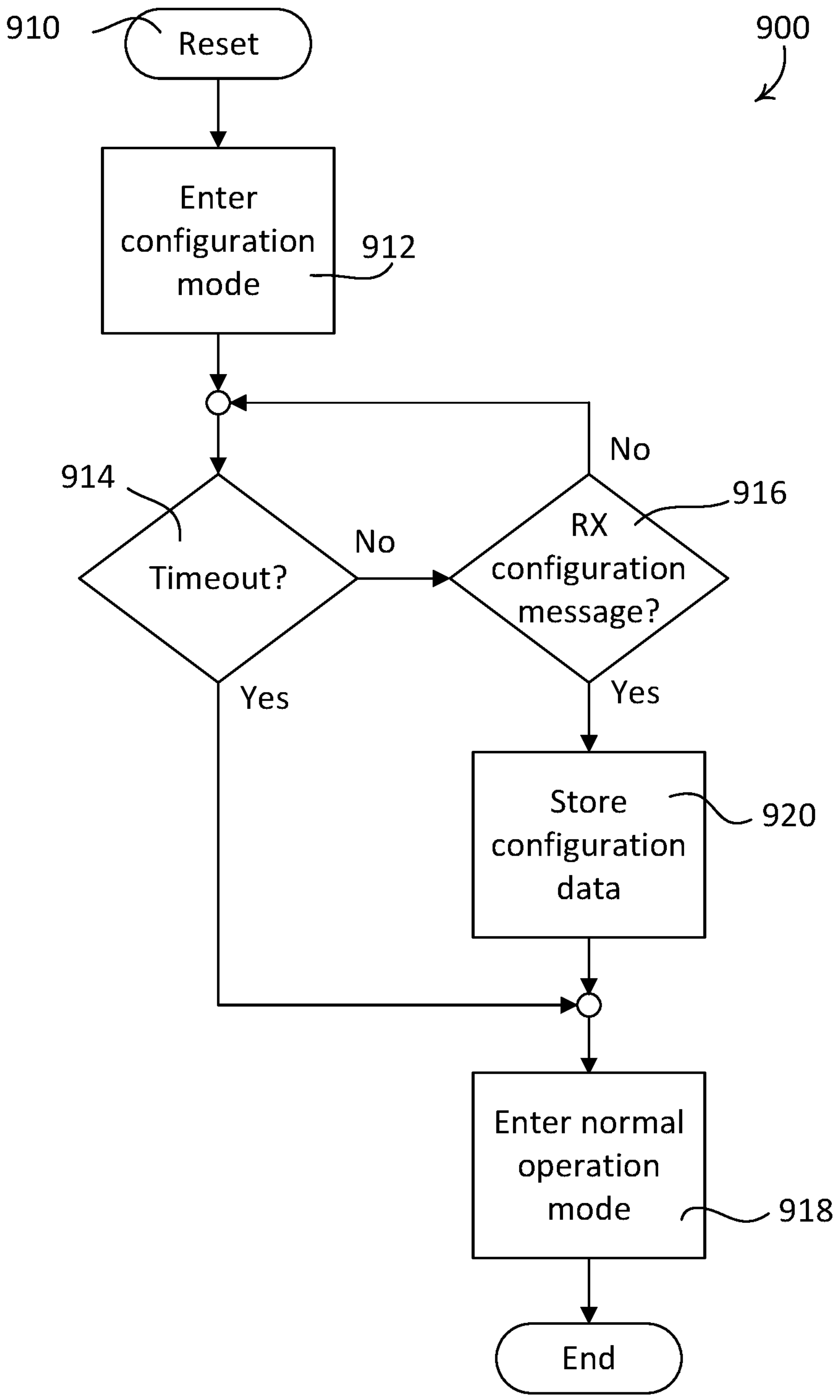
FIG. 24B is a flowchart of an example configuration procedure for a motor drive unit of a motorized window treatment.

FIG. 24B is a flowchart of an example configuration procedure 900 that may be executed to configure a motor drive unit of a motorized window treatment (e.g., the motor drive unit 190 of the motorized window treatment 100 shown in FIGS. 1-6 and/or the motor drive unit 800 shown in FIG. 24A). For example, the configuration procedure 900 may be executed to associate the motor drive unit with a remote control device. The configuration procedure 900 may be executed by a control circuit (e.g., the control circuit 820 of the motor drive unit 800). The control circuit may be configured to execute the configuration procedure 900 at 910, for example, in response to resetting (e.g., as part of a startup routine). For example, the control circuit may be configured to reset in response to a transitory disconnection of power from the motor drive unit (e.g., caused by a transitory disconnection of the batteries 160 and/or batteries 860 from the control circuit 820 as a result of an actuation of the button 176).

After resetting at 910, the control circuit may enter a configuration mode (e.g., an association mode) at 912. For example, when in the configuration mode, the control circuit may be configured to listen for a configuration message from an external configuration device (e.g., transmitted in one or more wireless signals) via a communication circuit (e.g., the communication circuit 826 shown in FIG. 24A). Additionally or alternatively, the control circuit may be configured to transmit (e.g., periodically transmit) a beacon message (e.g., a wireless beacon message), which, when received by the external configuration device, may cause the external configuration device to transmit the configuration message to the motor drive unit. For example, the control circuit may be configured to transmit the beacon message upon resetting.

At 914, the control circuit may determine if a timeout period (e.g., since the beginning of the configuration procedure 900) has expired. For example, the timeout period may be approximately 10 minutes. At 916, the control circuit may determine if a configuration message has been received via the communication circuit. The configuration message may comprise configuration data. The control circuit may then wait until the timeout period has expired at 914 or the configuration message has been received at 916. When the timeout period expires at 914 before the configuration message is received at 916, the control circuit may enter a normal operation mode at 918, before the configuration procedure 900 exits. During the normal operation mode, the control circuit may be configured to control the operation of the motor drive unit in response to commands in messages received via the communication circuit.

When the configuration message is received at 916 before the timeout period expires at 914, the control circuit may store, at 920, configuration data from the configuration message in memory (e.g., the memory 824 shown in FIG. 24A). For example, the configuration data may comprise association data, such as a unique identifier, of a remote control device to which the motor drive unit may be associated. The control circuit may be responsive to messages including the unique identifiers of remote control devices stored in memory. Additionally or alternatively, the configuration data may comprise one or more operational settings of the motor drive unit (e.g., such as one or more preset positions between the raised position and the lowered position). After the control circuit stores the configuration data at 920, the control circuit may enter the normal operation mode at 918, before the configuration procedure 900 exits.

Figure 25:
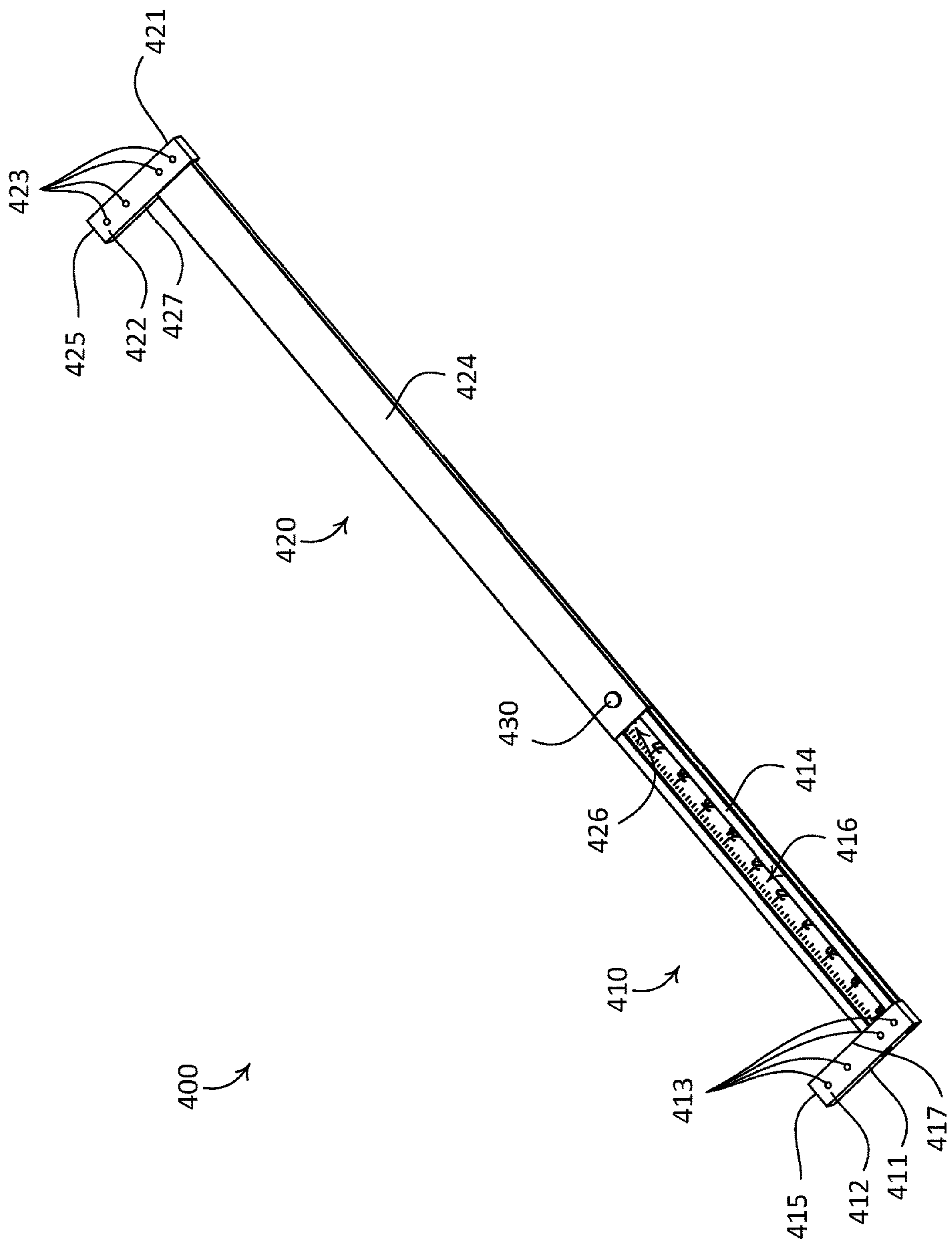
FIG. 25 is a perspective view of an example measuring tool for use with the example motorized window treatment shown in FIG. 1.
Figure 26A:
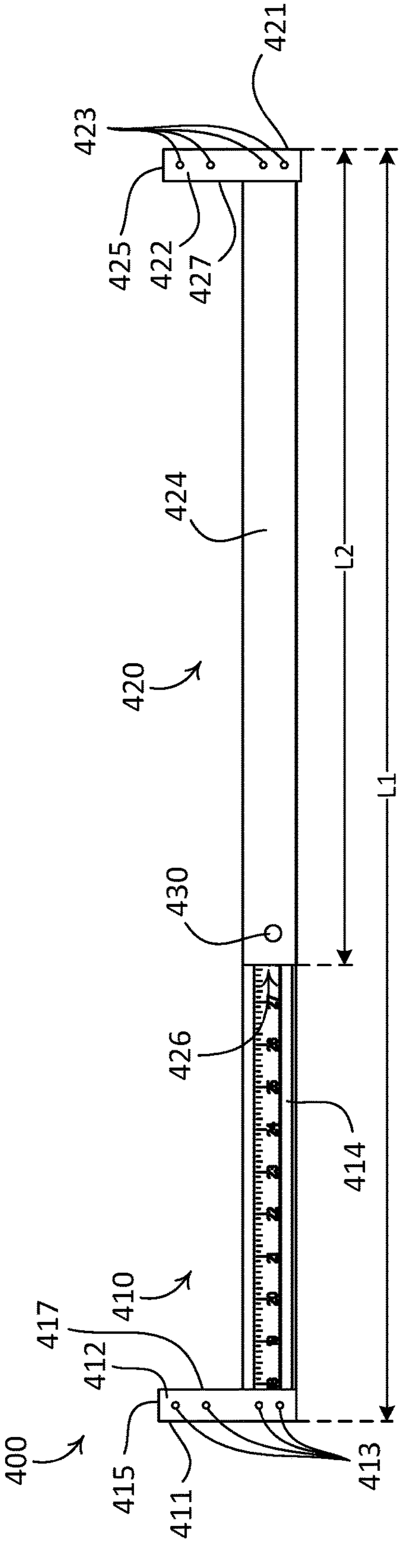
FIGS. 26A and 26B are front views of the example measuring tool shown in FIG. 25 at different length settings.
Figure 26B:
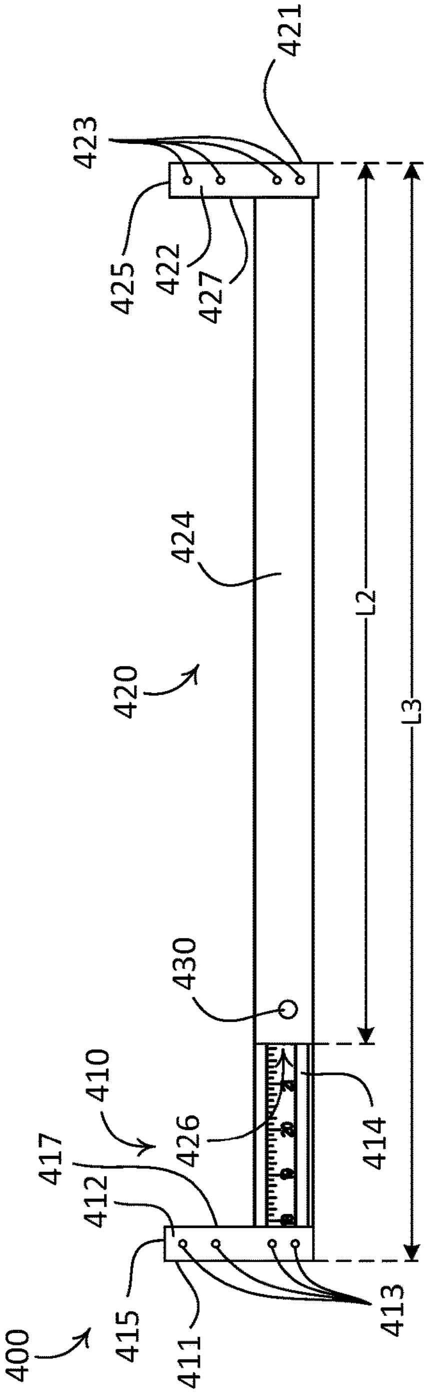

FIGS. 25, 26A, and 26B depict an example measuring tool 400 for use with a motorized window treatment (e.g., such as the motorized window treatment 100 shown in FIGS. 1-10). The measuring tool 400 may be configured to be set at various predetermined lengths that correspond to respective lengths of the motorized window treatment. For example, the measuring tool 400 may be used to measure a window casing in which the motorized window treatment is to be installed. The measuring tool 400 may comprise a first portion 410, a second portion 420, and a fastener 430. The first portion 410 and the second portion 420 may be configured to be adjusted with respect to one another to change an overall length of the measuring tool 400.

The first portion 410 may include a sliding portion 414 and a spacer 412. The spacer 412 may be attached to the sliding portion 414, for example, distal from the second portion 420. The spacer 412 may be configured to represent the location and/or width of brackets for the motorized window treatment (e.g., such as brackets 130A, 130B shown in FIGS. 1-10 and/or brackets 300A, 300B shown in FIGS. 16-23). The spacer 412 may be configured to enable marking of drill holes for the motorized window treatment, for example, for the brackets of the motorized window treatment. For example, the spacer 412 may define holes 413. The holes 413 may be configured to mark fastener locations for the bracket of the motorized window treatment. The spacer 412 may define an outer face 411 and a front face 415. The sliding portion 414 may be configured to be received by the second portion 420. The first portion 410 (e.g., the sliding portion 414) may include markings 416 (e.g., ruler markings) that indicate the length of the measuring tool 400.

The second portion 420 may include a sliding portion 424 and a spacer 422. The spacer 422 may be attached to the sliding portion 424, for example, distal from the first portion 410. The spacer 422 may be configured to represent the location and/or width of brackets for the motorized window treatment (e.g., such as brackets 130A, 130B shown in FIGS. 1-10 and/or brackets 300A, 300B shown in FIGS. 16-23). The spacer 422 may be configured to enable marking of drill holes for the motorized window treatment, for example, for the brackets of the motorized window treatment. For example, the spacer 422 may define holes 423. The holes 423 may be configured to mark fastener locations for the bracket of the motorized window treatment. The spacer 422 may define an outer face 421 and a front face 425. The sliding portion 424 may be configured to receive the first portion 420 (e.g., the sliding portion 414). For example, the sliding portion 414 of the first portion 410 may slidingly engage with the sliding portion 424 of the second portion 420. The sliding portion 414 and the sliding portion 424 may interlock with one another such that they can be slidingly adjusted, for example, to change the overall length of the measuring tool 400. As the sliding portions 414, 424 are slidingly adjusted, the length of the measuring tool 400 may be indicated by the markings 416. For example, a marking at the overlap of the sliding portion 424 and the sliding portion 414 may indicate the length of the measuring tool 400 (e.g., via the markings 416).

The fastener 430 may be configured to releasably secure the first portion 410 and the second portion 420 to one another. For example, the fastener 430 may prevent movement of the first portion 410 with respect to the second portion 420. The fastener 430 may be received by an aperture (not shown) in the sliding portion 424 of the second portion 420. When tightened, the fastener 430 may be configured to abut the sliding portion 414 of the first portion 410. Friction forces between the fastener 430 and the sliding portion 414 may secure the first portion 410 in its position relative to the second portion 420. For example, the fastener 430 is configured to prevent the first and second sliding portions 414, 424 from being slidingly adjusted with respect to one another. When the fastener 430 is loosened, the sliding portion 414 may be slidingly adjusted with respect to the sliding portion 424.

The measuring tool 400 may be adjustable to various lengths, for example, as shown in FIGS. 26A and 26B. The measuring tool 400 may be adjusted between a first length L1 (e.g., as shown in FIG. 26A) and a second length L2 (e.g., as shown in FIG. 26B) by sliding the first portion 410 (e.g., the sliding portion 414) relative to the second portion 420 (e.g., the sliding portion 424). The measuring tool 400 may be adjustable to match different window sizes, for example, such as to fit within casings of windows having different sizes. Although FIGS. 26A and 26B show two example lengths for the measuring tool 400, it should be appreciated that the measuring tool 400 may be adjustable to a plurality of other lengths to accommodate a variety of window sizes. The measuring tool 400 may enable motorized window treatments having a window treatment assembly of one or more standard widths to be provided (e.g., to a consumer, a dealer, an installer, and/or the like) for installation. The measuring tool 400 may enable the installer to transfer an accurate measurement from a window (e.g., window casing) to a standard-width window treatment assembly such that it can be cut to the measured length. For example, the measuring tool 400 may eliminate measurement error(s) that may occur when a tape measure or similar measuring tool is used to measure the window and apply that measurement to the window treatment assembly.

Figure 27:
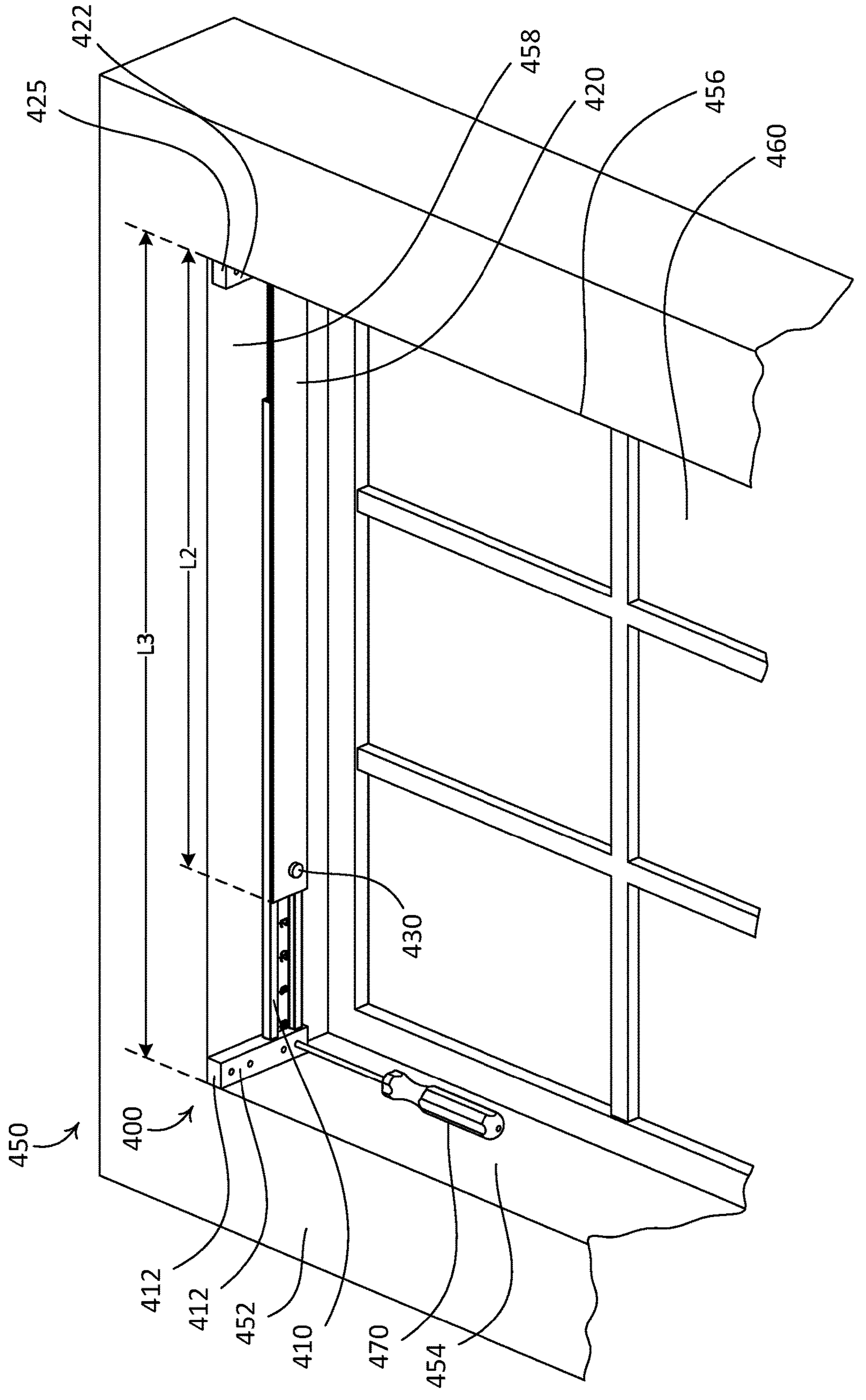
FIG. 27 is a perspective view of the example measuring tool shown in FIG. 25 inside an example window casing.

FIG. 27 depicts the measuring tool 400 inside an example window casing 450. The window casing 450 may surround a window 460. When the measuring tool 400 is inside the window casing 450, the spacers 412, 422 may abut opposed sidewalls 454, 456 of the window casing 450. For example, the outer face 411 of the spacer 412 may be configured to abut the sidewall 454 of the window casing 450 and the outer face 421 of the spacer 422 may be configured to abut the sidewall 456 of the window casing 450.

The length of the measuring tool 400 may be adjusted (e.g., to the length L3) such that the outer faces 411, 421 abut the respective sidewalls 454, 456. The length L3 may be defined by the distance between the sidewalls 454, 456 of the window casing 450. For example, the measuring tool 400 may be less than length L3 when placed within the window casing 450. The sliding portions 410, 420 may be adjusted to the length L3 such that the spacers 412, 422 (e.g., outer faces 411, 412) abut the sidewalls 454, 456 of the window casing 450. The fastener 430 may be tightened when the spacers 412, 422 abut the sidewalls 454, 456 to secure the measuring tool 400 at length L3 and/or secure the measuring tool 400 within the window casing 450. For example, friction forces between the outer faces 411, 412 and the respective sidewalls 454, 456 may secure the measuring tool 400 within the window casing 450. When the outer faces 411, 412 abut the respective sidewalls 454, 456, a tool 470 may be used to mark the location of the holes 413, for example, such that brackets can be properly located and installed for the motorized window treatment. The measuring tool 400 may enable an installer to avoid measurement errors because the measuring tool is set at the proper measurement and can be transferred to a cutting location. That is, use of the measuring tool 400 avoids use of a tape measure (or similar tool) to measure the window casing 450 and then applying that measurement to the window treatment assembly which introduces two instances of possible measurement error.

Although the measuring tool 400 is shown within the window casing 450 in FIG. 27, it should be appreciated that the measuring tool 400 may be alternatively located with respect to a window, door, or some other feature, such that an associated measurement can be used to cut the motorized window treatment to a size corresponding to the associated measurement.

Figure 28B:
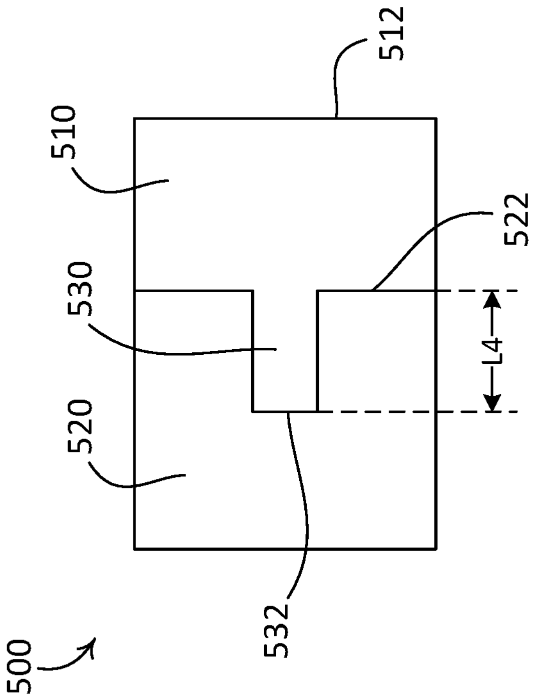
FIG. 28B is a top view of the example window treatment cutting guide shown in FIG. 28A.
Figure 28C:
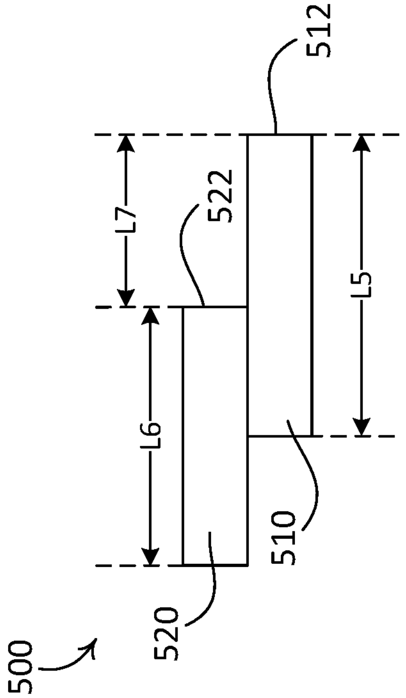
FIG. 28C is a side view of the example window treatment cutting guide shown in FIG. 28A.
Figure 28A:
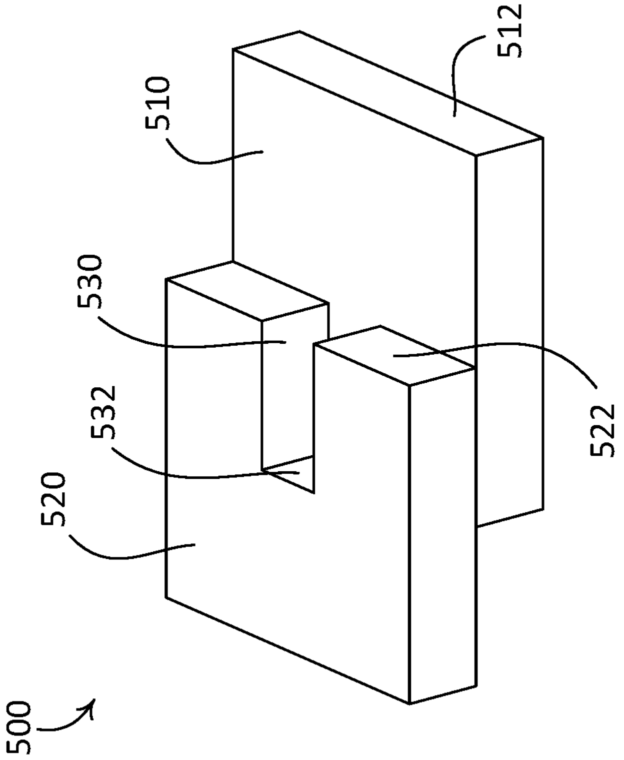
FIG. 28A is a perspective view of an example window treatment cutting guide.

FIGS. 28A-28C depict an example window treatment cutting guide 500. The window treatment guide 500 may be configured to enable accurate measurement for cutting a roller tube assembly (e.g., such as the roller tube assembly of the window treatment assembly 111 shown in FIG. 1) of a motorized window treatment (e.g., such as the motorized window treatment 100 shown in FIGS. 1-10). For example, the window treatment cutting guide 500 may be used to set a distance from one end of the roller tube assembly to a cutting blade.

The window treatment cutting guide 500 may comprise a lower portion 510 and an upper portion 520. The lower portion 510 may define a length L5. The upper portion 520 may define a length L6. The upper portion 520 may be offset from the lower portion 510 by a length L7. For example, a front surface 522 of the upper portion 520 may be spaced away from a front surface 512 of the lower portion 510 by the length L7. The length L7 may be configured such that the lower portion 510 can support (e.g., in the vertical direction) the roller tube assembly during cutting (e.g., a cutting procedure). For example, the roller tube assembly (e.g., one end of the roller tube assembly) may rest on the lower portion 510 as the roller tube assembly is cut. The upper portion 520 may define a notch 530. The notch 530 may define an inner surface 532. The notch 530 may extend a length L4 from the inner surface 532 to a front surface 522 of the upper portion 520. The length L4 may be configured to enable a gap between the opposed ends of the roller tube and a window casing, such that each gap can accommodate a mounting bracket. The length L4 may correspond to twice a width of each of the spacers 412, 422.

Figure 29:
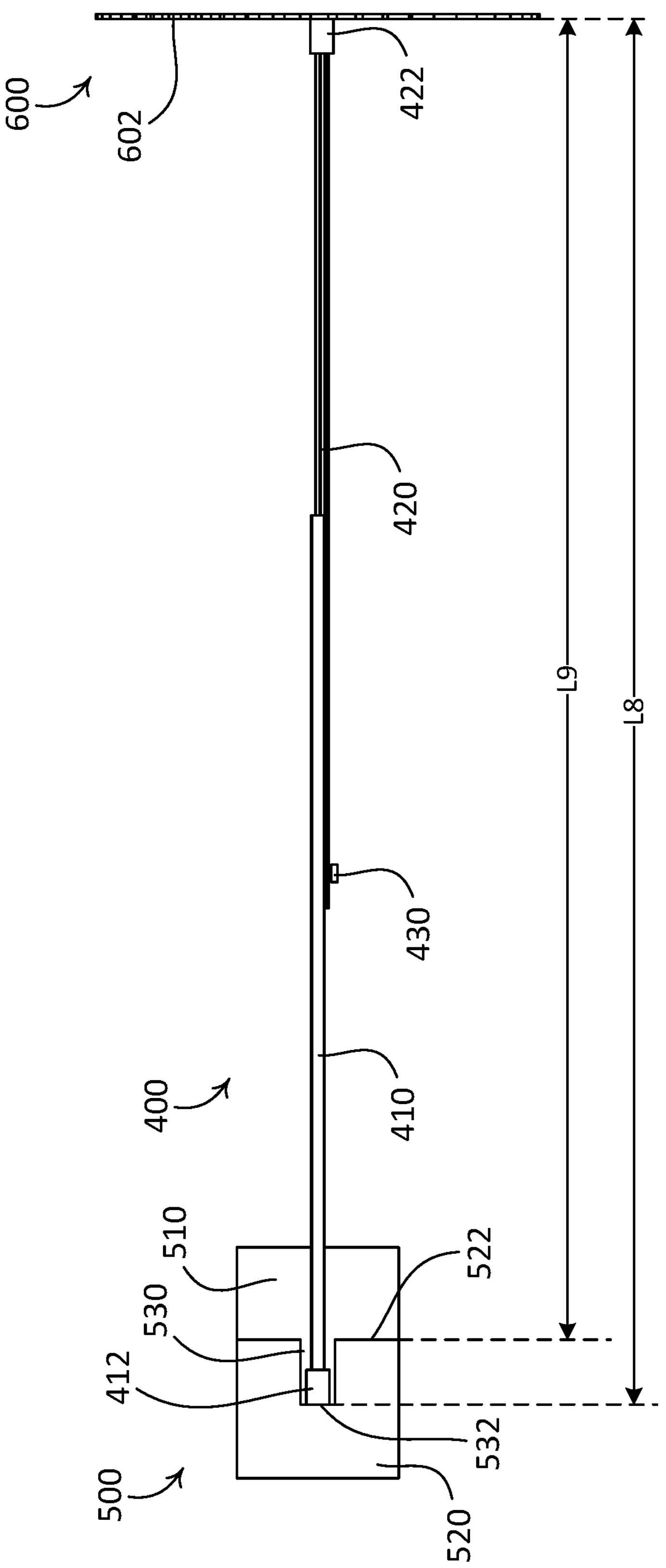
FIG. 29 is a top view of the example measuring tool setting the distance between the example window treatment cutting guide and a saw blade.

FIG. 29 depicts the measuring tool 400 between the window treatment cutting guide 500 and a saw blade 600. In this example, the measuring tool 400 is set at a distance L8 that corresponds to a measurement from the window (e.g., such as the window casing 450 shown in FIG. 27). One end (e.g., the spacer 412) of the measuring tool 400 is placed within the notch 530 of the window treatment cutting guide 500. The opposed end (e.g., the spacer 422) of the measuring tool 400 is placed in contact with the saw blade 600 (e.g., an inside face 602 that is proximate to the window treatment cutting guide 500). The window treatment cutting guide 500 may be adjusted such that the outer face 411 of the spacer 412 is in contact with the inner surface 532 of the window treatment cutting guide 500 and the outer face 421 of the spacer 422 is in contact with the inside face 602 of the saw blade 600. The window treatment cutting guide 500 may be secured in location with respect to the saw blade 600 such that a distance between the inside face 602 and the inner surface 532 is length L9. The window treatment cutting guide 500 may also be adjusted such that the lower portion 510 (e.g., an upper surface of the lower portion 510) is level with a table (e.g., horizontal surface) below the saw blade 600. For example, the table may be a part of a miter saw assembly.

Although the measuring tool 400 is shown in FIG. 29 with the spacer 412 within the notch 530 and the spacer 422 in contact with the saw blade 600, it should be appreciated that the measuring tool 400 may be reversed to set the distance between the window treatment cutting guide 500 and the saw blade 600 such that the spacer 422 is within the notch 530 and the spacer 412 is in contact with the saw blade 600.

Figure 30A:
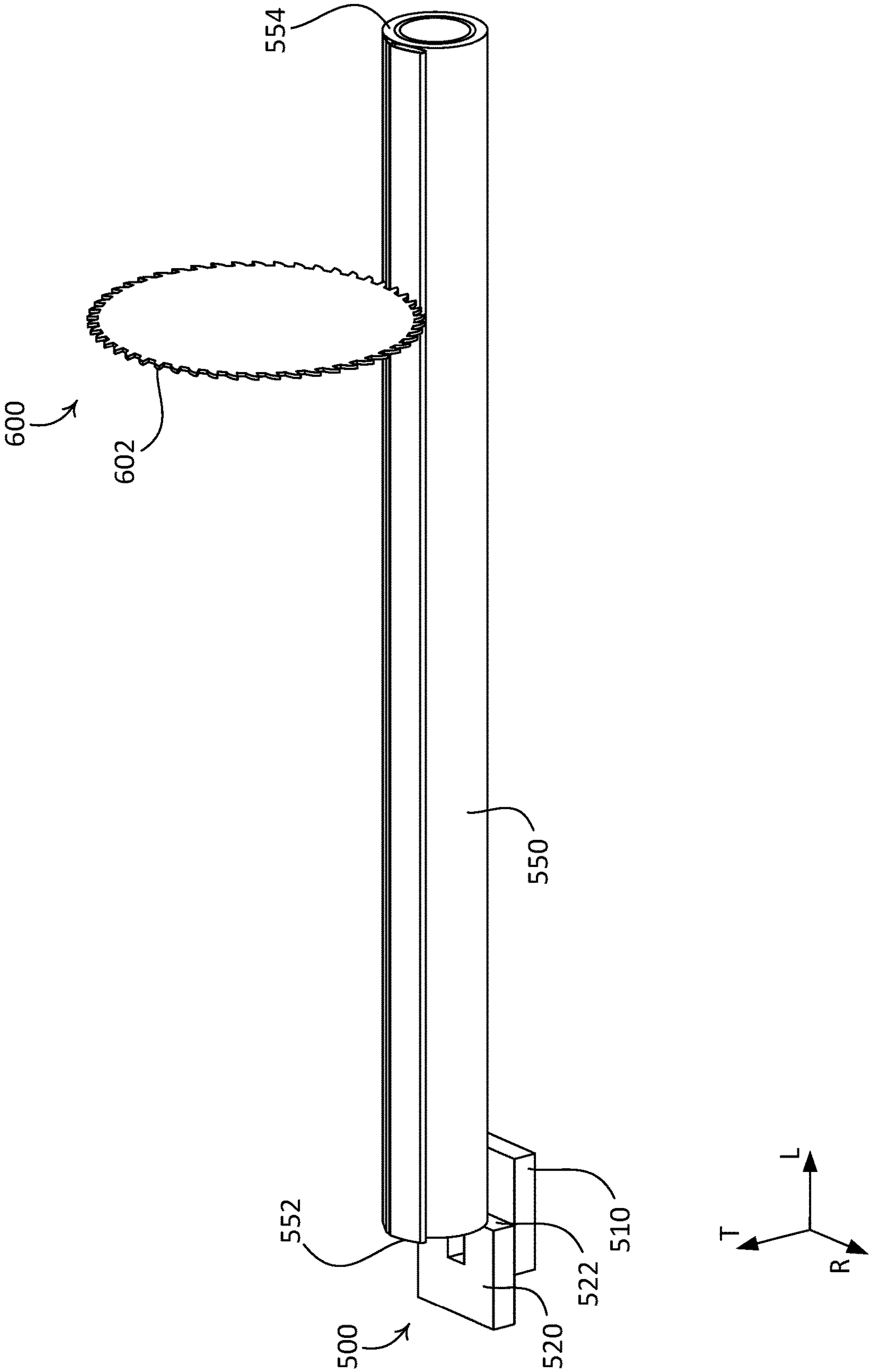
FIG. 30A is a perspective view of an example window treatment positioned on the example window treatment cutting guide.
Figure 30B:
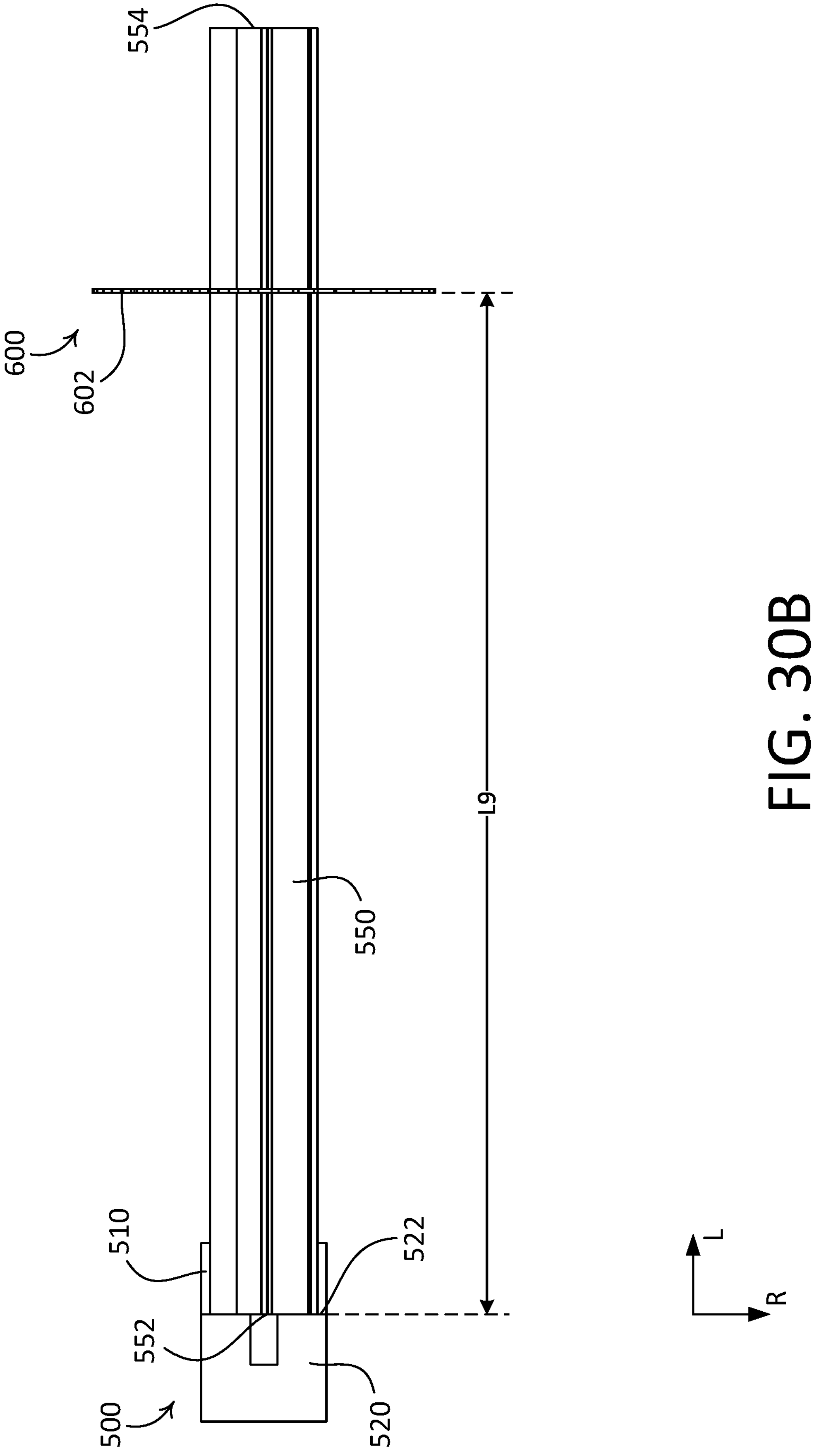
FIG. 30B is a top view of the example window treatment positioned on the example window treatment cutting guide.

FIGS. 30A and 30B is a perspective view of an example roller tube assembly 550 (e.g., such as the roller tube assembly of the window treatment assembly 111 shown in FIG. 1) of a motorized window treatment (e.g., such as the motorized window treatment 100 shown in FIGS. 1-10) positioned on the example window treatment cutting guide 500. The roller tube assembly 550 may comprise a fabric-wrapped roller tube. For example, roller tube assembly 550 may comprise a roller tube (e.g., such as the roller tube 110 shown in FIGS. 1 and 6) and fabric (e.g., such as the flexible material 120 shown in FIGS. 1 and 2) wrapped around the roller tube. The window treatment cutting guide 500 may enable the fabric and the roller tube of the roller tube assembly 550 to be cut at the same time. The interior of the roller tube may be empty, for example, the roller tube may not have a drive unit or an idler installed therein. The notch 530 may account for the bracket that is not connected to the roller tube at the time of cutting.

The roller tube assembly 550 may define a first end 552 and a second end 554. The roller tube assembly 550 (e.g., the first end 552) may be placed on the window treatment cutting guide 500 such that the first end 552 abuts the front surface 522. The window treatment cutting guide 500 (e.g., the lower portion 510) of the cutting guide 500 may be configured to support (e.g., vertically) the first end 552 of the roller tube assembly 550 in the transverse direction T while the upper portion 520 (e.g., the front surface 522) sets the distance (e.g., length L9) between the first end 552 of the roller tube assembly 550 and the saw blade 600. For example, the window treatment cutting guide 500 may be secured to a table, a sawhorse, a workbench, or some other horizontal surface. When the first end 552 abuts the front surface 522, the saw blade 600 may be operated to cut the roller rube assembly 550 to the length L9.

Figure 31:
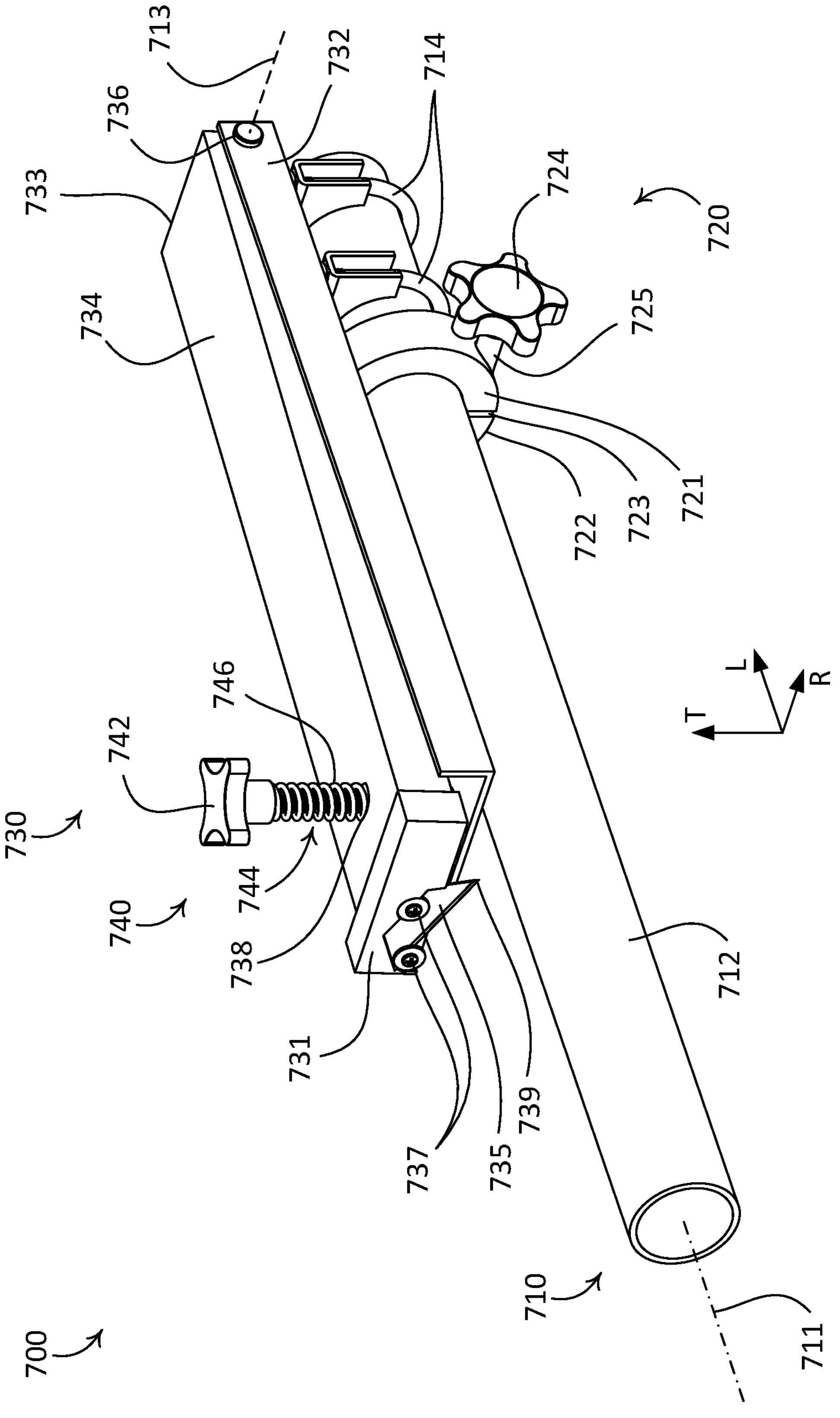
FIG. 31 is a perspective view of an example window treatment cutting tool.
Figures 32A, 32B:
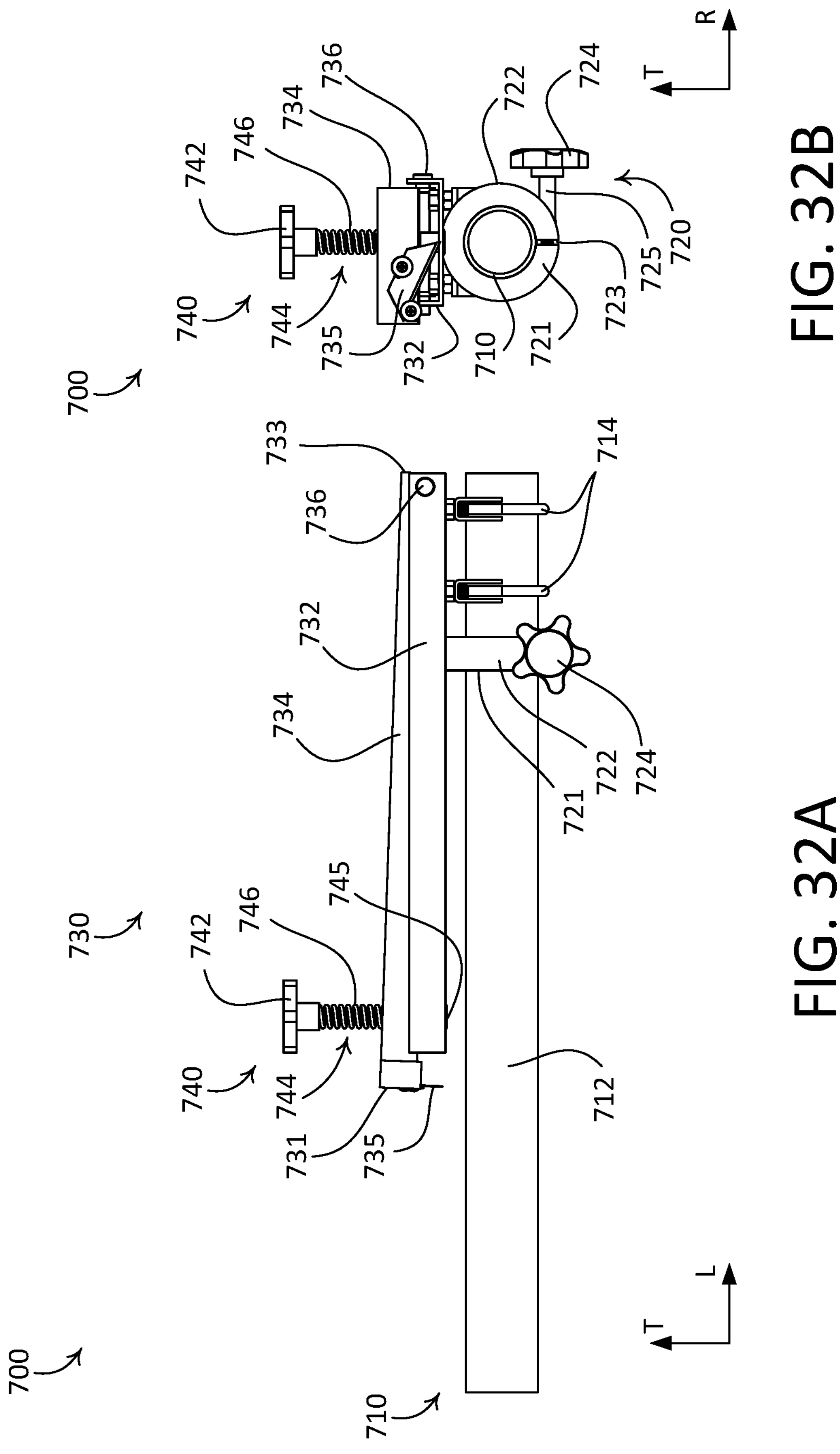
FIG. 32A is a front view of the example window treatment cutting tool shown in FIG. 31.
FIG. 32B is a side view of the example window treatment cutting tool shown in FIG. 31.

FIGS. 31, 32A, and 32B depict an example window treatment cutting tool 700. FIG. 31 is a perspective view of the window treatment cutting tool 700. FIG. 32A is a front view and FIG. 32B is a side view of the window treatment cutting tool 700. The window treatment cutting tool 700 may be configured to cut a motorized window treatment (e.g., a roller tube assembly 750) to a desired length. The window treatment cutting tool 700 may be configured to rotate (e.g., about a longitudinal axis defined in the longitudinal direction L) to cut the motorized window treatment. The window treatment cutting tool 700 may comprise a cylindrical support 710, a collar assembly 720, and a cutting arm assembly 730. The cylindrical support 710 may be a solid cylinder, a support tube, a support pipe, etc.

The collar assembly 720 may include a collar 722, a knob 724, and a bolt 725. The collar 722 may be slidingly received by the cylindrical support 710. The collar 722 may be configured to be secured at different locations (e.g., in the longitudinal direction L) along the cylindrical support 710. For example, the collar 722 may be located along the cylindrical support 710 based on a desired length for the motorized window treatment. The collar 722 may be circular and may be configured to surround the cylindrical support 710. The collar 722 may include a gap 723. The gap 723 may allow the collar 722 to clamp the cylindrical support 710. For example, as the knob 724 is turned in one (e.g., clockwise) direction, the bolt 725 decreases the gap 723 such that the collar clamps the cylindrical support 710 (e.g., an outer surface 712 of the cylindrical support 710). When the collar 722 clamps the cylindrical support 710, friction forces between the collar 722 and the cylindrical support 710 may prevent movement of the collar 722. When the knob 724 is rotated in the opposite (e.g., counter-clockwise) direction, the bolt 725 increases the gap 723 such that the collar assembly 720 can translate along the cylindrical support 710 in the longitudinal direction L.

The cutting arm assembly 730 may be attached (e.g., rotatably attached) to the cylindrical support 710, for example, via one or more clamps 714. The cutting arm assembly 730 may include a base portion 732, a pivot arm 734, a pivot bolt 736, a tensioner assembly 740, and a cutting blade 735. The base portion 732 may be attached to the clamps 714 and may remain in position relative to the cylindrical support 710 as the window treatment cutting tool 700 rotates. The pivot arm 734 may be configured to be biased toward the cylindrical support 710. The pivot arm 734 may be attached to the base portion 732, for example, via the pivot bolt 736. For example, a first end 733 of the pivot arm 734 may be attached to the base portion 732. The pivot blot 736 may define a pivot axis 713. The pivot arm 734 may be configured to pivot about the pivot bolt 736 (e.g., the pivot axis 713). For example, the pivot arm 734 may pivot about the pivot axis 713 to allow the roller tube assembly 750 to be installed on the cylindrical support 710 and/or move the cutting blade 735 closer to the longitudinal axis 711. The tensioner assembly 740 may be attached to the pivot arm 734 and/or the base portion 732. The tensioner assembly 740 may be configured to apply a force to the pivot arm 734 such that the pivot arm 734 is biased toward the cylindrical support 710. For example, the tensioner assembly 740 may be configured to adjust the cutting blade 735 in a direction perpendicular to the longitudinal direction L.

The tensioner assembly 740 may include a knob 742, a bolt 744, a nut 745, and a spring 746. The bolt 744 may extend through a hole 738 in the pivot arm 734 and a hole (not shown) in the base portion 732. The spring 746 may extend between the pivot arm 734 and the knob 742. The spring 746 may at least partially surround the bolt 744. As the knob 742 is rotated in a first (e.g., clockwise) direction, the spring 746 may compress and force the pivot arm 734 toward the cylindrical support 710. When the knob 742 is rotated in a second (e.g., counter-clockwise) direction, the spring 742 may decompress and allow the pivot arm 734 to move away from the cylindrical support 710. The nut 745 may be a rivet nut that is attached to the base portion 732. For example, the nut 745 may be attached to the base portion 732 such that the bolt 744 engages the threads of the nut 745 as the knob 742 is rotated.

The cutting blade 735 may be attached to the pivot arm 734, for example, using fasteners 737. For example, the cutting blade 735 may be attached to a second end 731 of the pivot arm 734. The second end 731 of the pivot arm 734 may be distal from the pivot bolt 736. The cutting blade 735 may be configured to contact an outer layer of flexible material of the roller tube assembly 750 when the pivot arm 734 is biased toward the cylindrical support 710. The cutting blade 735 may define a tip 739 that is configured to cut the roller tube assembly 750. Although the cutting blade 735 is shown as a utility knife blade, it should be appreciated that other blades may be used as the cutting blade 735, for example, such as another type of razor blade.

Figure 33A:
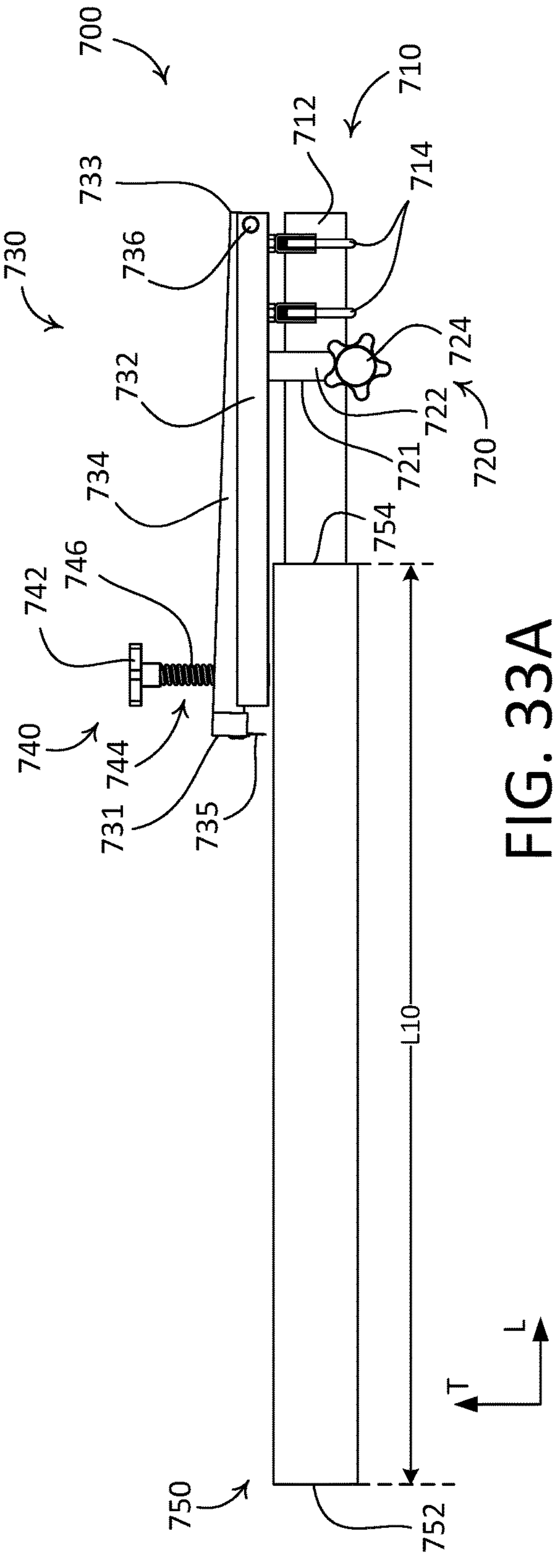
FIG. 33A is a side view of the example window treatment cutting tool shown in FIG. 31 with a roller tube assembly received thereon.
Figure 33B:
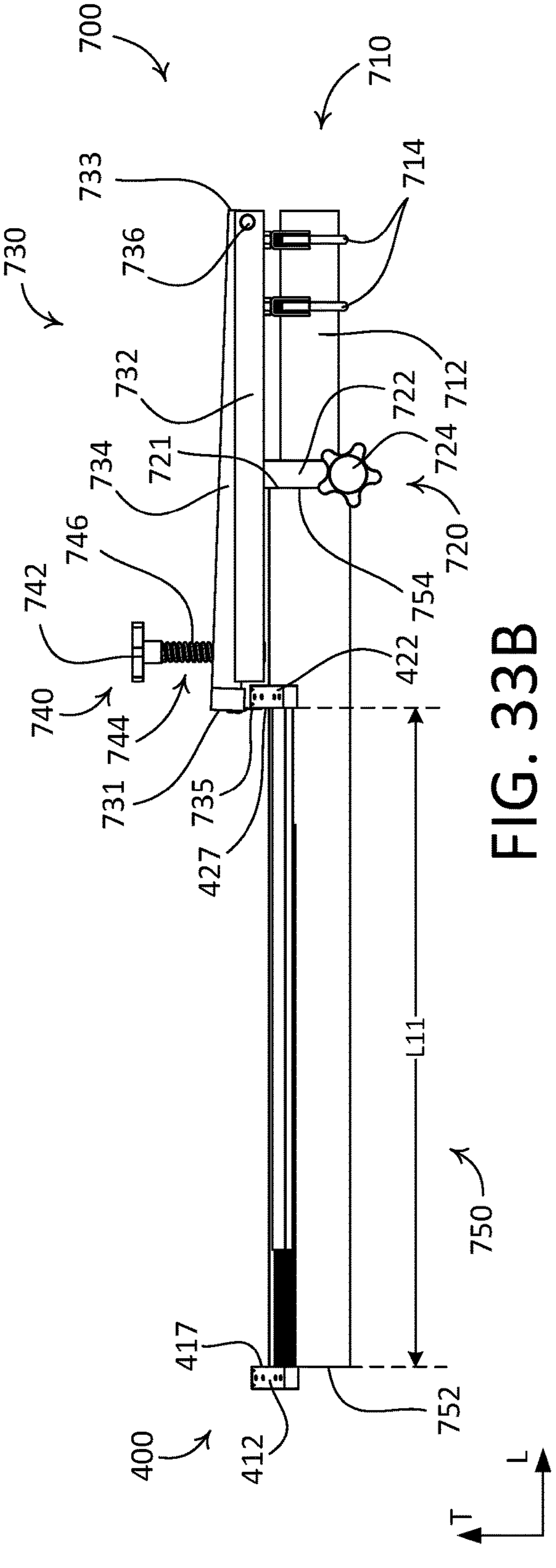
FIG. 33B is another side view of the example window treatment cutting tool shown in FIG. 31 with the roller tube assembly and the measuring tool shown in FIG. 25.
Figure 33C:
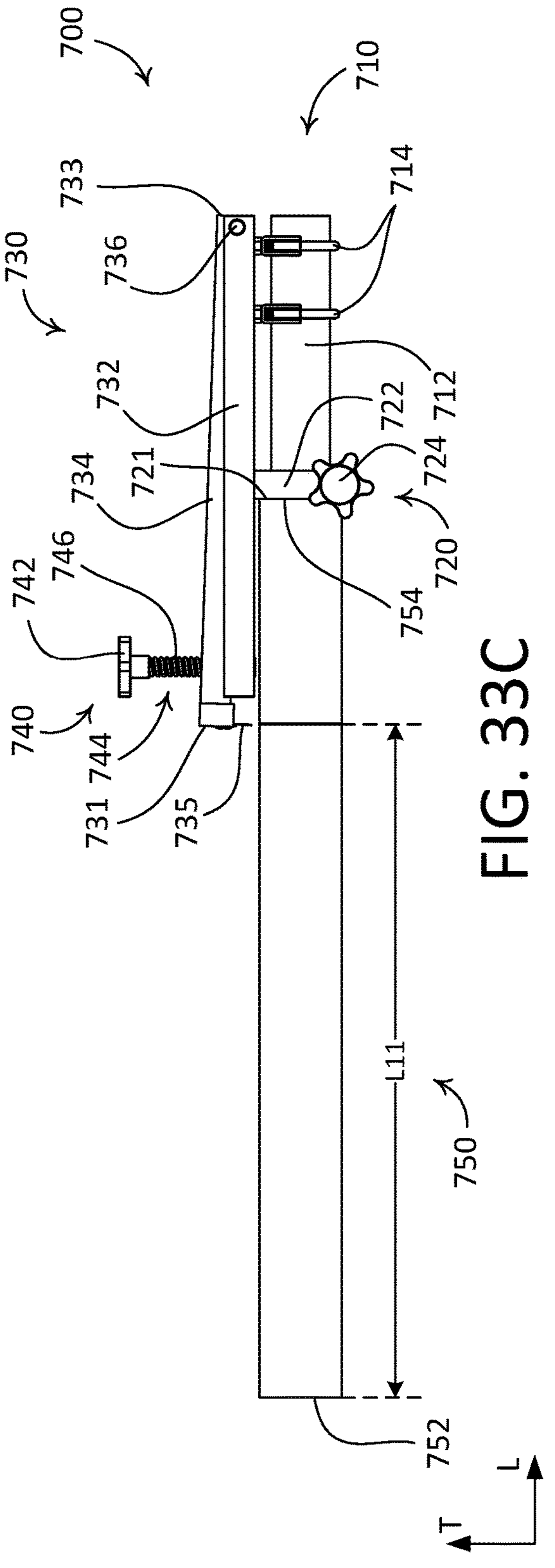
FIG. 33C is another side view of the example window treatment cutting tool shown in FIG. 31 cutting the roller tube assembly.
Figure 33D:
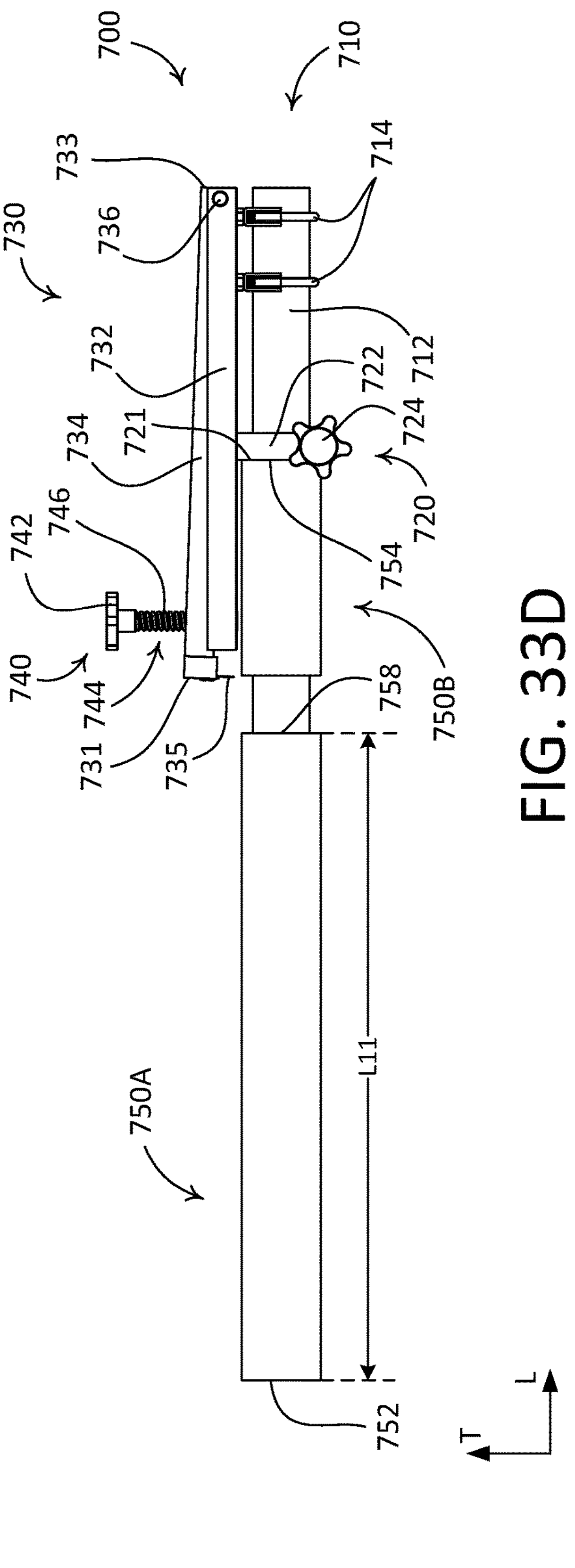
FIG. 33D is another side view of the example window treatment cutting tool shown in FIG. 31 with the roller tube assembly cut to a measured length.

FIGS. 33A-33D depict use of the window treatment cutting tool 700 to cut a roller tube assembly 750 to a measured length. FIG. 33A is a side view of the window treatment cutting tool 700 having the roller tube assembly 750 received thereon. FIG. 33B is another side view of the window treatment cutting tool 700 showing use of a measuring tool (e.g., such as the measuring tool 400 shown in FIGS. 25-27). FIG. 33C is another side view of the window treatment cutting tool 700 cutting the roller tube assembly 750. FIG. 33D is another side view of the window treatment cutting tool 700 with the roller tube assembly 700 cut to a measured length.

The roller tube assembly 750 may comprise a fabric-wrapped roller tube. For example, roller tube assembly 750 may comprise a roller tube (e.g., such as the roller tube 110 shown in FIGS. 1 and 6) and fabric (e.g., such as the flexible material 120 shown in FIGS. 1 and 2) wrapped around the roller tube. The window treatment cutting tool 700 may be configured to cut the fabric and the roller tube of the roller tube assembly 750 at the same time. The interior of the roller tube may be empty, for example, the roller tube may not have a drive unit or an idler installed therein. The roller tube assembly 750 may define a first end 752 and an opposed second end 754. The roller tube assembly 750 may have a length L10, between the first end 752 and the second end 754. The roller tube assembly 750 may be received by the cylindrical support 710 of the window treatment cutting tool 700, as shown in FIG. 33A. The roller tube assembly 750 may be translated along the cylindrical support 710 until the second end 754 abuts the collar 722 (e.g., a front surface 721 of the collar 722). The collar 722 may be configured to prevent movement of the roller tube assembly 750 in the longitudinal direction L (e.g., in the direction opposite the free end of the cylindrical support 710).

When the roller tube assembly 750 is received by the cylindrical support 710 and in contact with the collar 722, the measuring tool 400 may be positioned on the roller tube assembly 750, as shown in FIG. 33B. The measuring tool 400 may be positioned between the first end 752 of the roller tube assembly 750 and the cutting blade 735. The measuring tool 400 may be set to a measured length L11 associated with a desired mounting location (e.g., such as the window casing 450 shown in FIG. 27) for the roller tube assembly 750. For example, an inside surface 417 of the spacer 412 may abut the first end 752 and an inside surface 427 of the spacer 422 may abut the cutting blade 735. The collar assembly 720 may be adjusted (e.g., in the longitudinal direction L) and locked into position such that the inside surface 417 of the spacer 412 abuts the first end 752 of the roller tube assembly 750 and the inside surface 427 of the spacer 422 abuts the cutting blade 735. When the collar assembly 720 is locked into position, the measuring tool 400 may be removed and the tensioner assembly 740 may be operated such that the tip 739 of the blade 735 is moved closer to the roller tube assembly 750. For example, the knob 742 may be rotated until the tip 739 contacts the shade fabric (e.g., such as the flexible material 120 shown in FIGS. 1-3) that is wound around the roller tube.

When the tip 739 of the blade 735 is in contact with the shade fabric, the cutting arm assembly 730 may be rotated to cut one or more layers of the shade fabric. The collar assembly 720 may prevent the roller tube assembly 750 from moving in the longitudinal direction L as the cutting arm assembly 730 is rotated. For example, the second end 754 of the roller tube assembly 750 may remain in contact with the collar 722 (e.g., the front surface 721) as the cutting arm assembly 730 is rotated to cut the roller tube assembly 750. The knob 742 may be further tightened such that the tip 739 of the blade 735 contacts an inner layer of the shade fabric. The cutting arm assembly 730 may be again rotated to cut one or more inner layers of the shade fabric. The knob 742 may be tightened and the cutting arm assembly 730 rotated iteratively thereafter until the roller tube assembly 750 is separated (e.g., cut) into a first portion 750A (e.g., an install portion) and a second portion 750B (e.g., a leftover portion). The first portion 750A may define a length equal to the measured length L11 of the measuring tool 400. The second portion 750B may define a length equal to the length L10 of the roller tube assembly 750 minus the measured length L11. The first portion 750A may be removed from the window treatment cutting tool 700 (e.g., the cylindrical support 710) and installed in the desired mounting location.

Although, FIG. 33B depicts use of the measuring tool 400 to set the collar assembly 720, it should be appreciated that the window treatment cutting tool 700 can be used without the measuring tool 400. For example, the collar assembly 720 can be set using an alternate measurement method.

Figure 34:
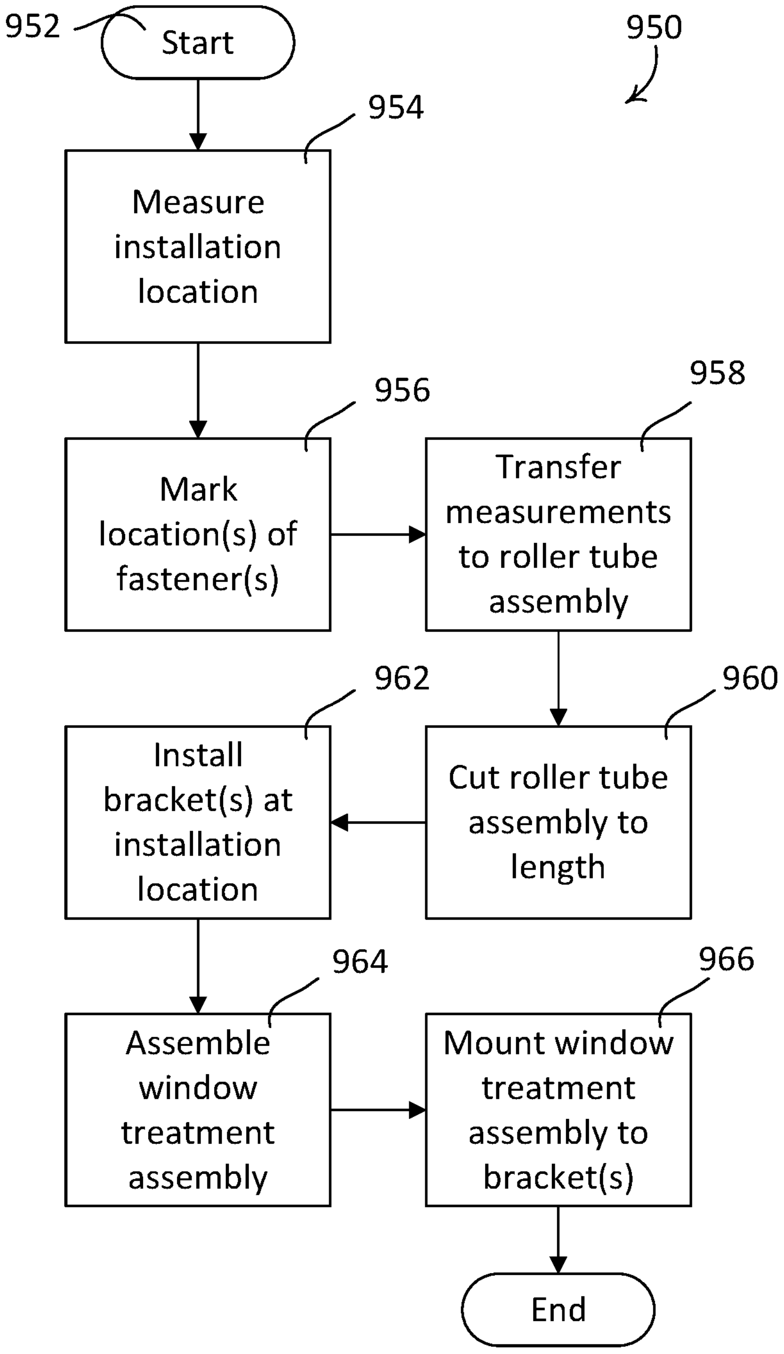
FIG. 34 is a flowchart of an example installation procedure for a motorized window treatment.

FIG. 34 is a flowchart of an example installation process 950 for a motorized window treatment (e.g., such as the motorized window treatment 100 shown in FIGS. 1-10). The motorized window treatment may be fabricated in one or more standard widths and may be adjusted based on actual installation location (e.g., mounting location) dimensions. The installation process 950 may be used to cut a standard width roller tube assembly (e.g., the roller tube assembly 550 and/or the roller tube assembly 750) to a width that corresponds with the actual installation location dimensions. The installation process 950 may enable cutting a standard width roller tube assembly at a job site (e.g., at the installation location). The installation process 950 may start, at 952, when an installer arrives at an installation location with the motorized window treatment.

At 954, the installer may measure the installation location. For example, the installer may make, at 954, one or more measurements at the installation location (e.g., proximate to a window). The installer may use a measuring tool (e.g., the measuring tool 400 shown in FIGS. 25, 26A, and 26B) to make the one or more measurements at the installation location. The one or more measurements may be associated with a window casing. For example, the measuring tool may be placed inside the window casing and adjusted such that portions of the measuring tool (e.g., spacers 412, 422) abut sidewalls of the window casing. The measuring tool may be adjusted by moving sliding portions such that outer faces of the spacers abut respective sidewalls of the window casing. The installer may lock the measuring tool at a length that corresponds to the distance (e.g., inside width) between the sidewalls of the window casing. For example, the sliding portions of the measuring tool may be secured with respect to one another at an overall length that corresponds to an inside width of the window casing (e.g., distance between the respective sidewalls of the window casing).

At 956, the measuring tool may be used to mark one or more locations of fastener holes. The fastener holes may mark the appropriate location for fasteners of brackets for mounting the motorized window treatment. One or more holes may be drilled at the one or more locations marked, at 956.

At 958, the one or more measurements at the installation location may be transferred to a roller tube assembly of the motorized window treatment (e.g., the roller tube assembly of the window treatment assembly 111 shown in FIG. 1, the roller tube assembly 550 shown in FIGS. 30A and 30B and/or the roller tube assembly 750 shown in FIGS. 33A-33D) the roller tube assembly of the motorized window treatment). For example, the measuring tool (e.g., locked at the length the corresponds to the distance between the sidewalls of the window casing) may be located proximate to a cutting blade such that the roller tube assembly can be marked for cutting. In examples, a window treatment cutting guide (e.g., the window treatment cutting guide 500 shown in FIGS. 28A-28C) may be used to set the appropriate distance of the cutting blade with respect to the roller tube assembly. For example, one end of the measuring tool may abut a first surface of the window treatment cutting guide and another end of the measuring tool may abut a surface of the cutting blade. The window treatment cutting guide and/or the cutting blade may be locked in position with respect to one another such that the distance between the window treatment cutting guide and the cutting blade is fixed. The measuring tool may be removed and the roller tube assembly may be placed such that one end of the roller tube assembly abuts a second surface of the window treatment cutting guide and the other end of the roller tube assembly extends beyond the cutting blade. When the one end of the roller tube assembly abuts the second surface of the window treatment cutting guide, the cutting blade may be set at a distance from the one end of the roller tube assembly that corresponds with the distance between the sidewalls of the window casing.

Additionally or alternatively, at 958, the roller tube assembly may be received by a tube of a window treatment cutting tool (e.g., the window treatment cutting tool 700 shown in FIGS. 33A-33D). While the roller tube assembly is received by the tube of the window treatment cutting tool, one end of the roller tube assembly may abut a collar of the window treatment cutting tool. The measuring tool (e.g., locked at the length the corresponds to the distance between the sidewalls of the window casing) may be placed between the other end of the roller tube assembly and a cutting blade of the window treatment cutting tool. The collar may be adjusted until the measuring tool abuts the cutting blade. When the one end of the roller tube assembly abuts the cutting blade, the cutting blade may be set at a distance from the one end of the roller tube assembly that corresponds with the distance between the sidewalls of the window casing.

At 960, the roller tube assembly may be cut to a width, for example, that corresponds with the distance between the sidewalls of the window casing. The roller tube assembly may be cut, at 960, using a cutting blade. For example, the cutting blade may cut a fabric of the roller tube assembly (e.g., such as the flexible material 120 shown in FIGS. 1 and 2) and/or a roller tube of the roller tube assembly (e.g., such as the roller tube 110 shown in FIGS. 1 and 6). The cutting blade may be a saw blade (e.g., as shown in FIGS. 29, 30A, and 30B), a razor blade or utility knife blade (e.g., as shown in FIGS. 31, 32A, 32B, and 33A-33D), and/or the like. In an example using the window treatment cutting tool 700 shown in FIGS. 33A-33D, the roller tube assembly may be rotated about the tube such that successive layers of the fabric and the roller tube are cut by the cutting blade. In another example using the window treatment cutting guide 500 shown in FIGS. 28A-28C, the cutting blade may be lowered while rotating to cut the fabric and the roller tube.

At 962, one or more mounting brackets (e.g., such as brackets 130A, 130B shown in FIGS. 1-10 and/or brackets 300A, 300B shown in FIGS. 16-23) may be installed at the installation location. For example, the one or more brackets may be aligned with one or more fastener marks such that fasteners may be installed through the bracket(s) at the one or more fastener marks.

At 964, a window treatment assembly that includes the roller tube assembly may be assembled. For example, to assemble the window treatment assembly at 964, a motor drive unit (e.g., the motor drive unit 190 of the motorized window treatment 100) may be installed in a first end of the roller tube of the roller tube assembly (e.g., the first end 112 of the roller tube 110) and an idler end portion (e.g., the idler end portion 114 of the motorized window treatment 100) may be installed in a second end of the roller tube of the roller tube assembly (e.g., the second end 113 of the roller tube 110).

At 966, the window treatment assembly may be mounted to the one or more brackets. For example, to mount the window treatment assembly to the one or more brackets at 966, the motor drive unit may be connected to a first one of the brackets and the idler end portion may be connected to a second one of the brackets. The installation process 950 may end when the window treatment assembly is mounted to the one or more brackets.

What is claimed is:

1. A motorized window treatment comprising:

a roller tube configured to rotate about a longitudinal axis that defines a longitudinal direction;

a flexible material that is attached to the roller tube, the flexible material operable between a raised position and a lowered position via rotation of the roller tube;

a motor drive unit located within the roller tube, the motor drive unit comprising a motor and a housing that is configured to house one or more batteries for powering the motor drive unit, the motor drive unit configured to control the motor to rotate the roller tube to adjust the flexible material between the raised position and the lowered position; and a first mounting bracket configured to rotatably support an end of the roller tube and mount the motorized window treatment to a structure surrounding a window, the first mounting bracket comprising:

a stationary portion configured to be attached to the structure surrounding the window, the stationary portion comprising a catch; and a pivoting portion that defines an opening therethrough that is configured to receive an end portion of the housing, the pivoting portion configured to operate the motorized window treatment between an operating position and an extended position, wherein the end portion of the housing is accessible through the opening in the pivoting portion when the motorized window treatment is in the extended position, and wherein the pivoting portion is aligned with the stationary portion when the motorized window treatment is in the operating position such that the end portion of the housing is covered by the stationary portion, the pivoting portion comprising a stopping mechanism configured to engage the catch to prevent the motorized window treatment from extending beyond the extended position.

2. The motorized window treatment of claim 1, wherein the stopping mechanism comprises a flexible strap defining a first strap end and a second strap end, the first strap end configured to be captively received within the pivoting portion of the first mounting bracket, the second strap end configured to be secured to the stationary portion of the first mounting bracket, wherein the flexible strap is configured to prevent the motorized window treatment from pivoting beyond the extended position.

3. The motorized window treatment of claim 2, wherein the catch extends from an upper wall of the stationary portion.

4. The motorized window treatment of claim 2, wherein the flexible strap comprises metal, plastic, or a composite material.

5. The motorized window treatment of claim 2, wherein the pivoting portion of the first mounting bracket defines a first channel that is configured to receive the first strap end, and wherein first strap end is configured to translate within the first channel as the motorized window treatment is operated between the operating position and the extended position.

6. The motorized window treatment of claim 5, wherein the stationary portion of the first mounting bracket comprises a first arm, a second arm that is substantially perpendicular to the first arm, and a plate that is attached to the first arm and the second arm.

7. The motorized window treatment of claim 6, wherein, when the motorized window treatment is in the extended position, the first strap end interlocks with a tab within the first channel of the pivoting portion of the first mounting bracket and the second strap end interlocks with a catch on the stationary portion of the first mounting bracket.

8. The motorized window treatment of claim 7, wherein the catch extends from the first arm of the stationary portion of the first mounting bracket.

9. The motorized window treatment of claim 7, wherein the pivoting portion of the first mounting bracket comprises a latch that is configured to secure the motorized window treatment in the operating position.

10. The motorized window treatment of claim 9, wherein when the motorized window treatment is in the operating position, the latch engages a tab extending from the first arm of the stationary portion of the first mounting bracket.

11. The motorized window treatment of claim 10, wherein the latch is configured to disengage from the tab when a force greater than a pre-defined threshold force is applied to the roller tube in a direction away from the window.

12. The motorized window treatment of claim 6, wherein the plate defines a slide extending from an inner surface of the stationary portion of the first mounting bracket.

13. The motorized window treatment of claim 12, wherein a curvature of the slide defines a pivot path of the pivoting portion of the first mounting bracket as the motorized window treatment is operated between the operating position and the extended position.

14. The motorized window treatment of claim 12, wherein the pivoting portion comprises a second channel that is configured to receive the slide.

15. The motorized window treatment of claim 13, wherein the pivoting portion defines a finger that extends proximate to the second channel, the finger configured to guide the slide into the second channel.

16. The motorized window treatment of claim 13, wherein the pivot path defines a fulcrum located below a bottom edge of the stationary portion.

17. The motorized window treatment of claim 1, wherein the stopping mechanism comprises a stopping arm extending from a lower wall of the pivoting portion.

18. The motorized window treatment of claim 17, wherein the catch extends from a lower wall of the stationary portion.

19. The motorized window treatment of claim 17, wherein the stopping arm defines an upper surface that is configured to abut the catch.

20. The motorized window treatment of claim 17, wherein the stopping arm is configured to engage the stationary portion to secure the motorized window treatment in the operating position.

21. The motorized window treatment of claim 17, wherein the pivoting portion defines one or more slide guides.

22. The motorized window treatment of claim 21, wherein the stationary portion defines channels that are configured to receive the slide guides as the motorized window treatment is operated between the operating position and the extended position.

23. The motorized window treatment of claim 22, wherein a curvature of the channels defines a pivot path of the pivoting portion of the first mounting bracket as the motorized window treatment is operated between the operating position and the extended position.

24. The motorized window treatment of claim 1, wherein the pivoting portion is configured to attach the end portion of the housing to the first mounting bracket.

25. The motorized window treatment of claim 24, wherein an inner surface of the pivoting portion that defines the opening comprises a plurality of teeth configured to engage complementary features on the end portion of the housing to attach the end portion of the housing to the first mounting bracket.

26. The motorized window treatment of claim 2, further comprising a second mounting bracket configured to rotatably support an opposed end of the roller tube, wherein the second mounting bracket is configured to be attached to the structure surrounding the window.

27. The motorized window treatment of claim 26, wherein the stationary portion is a first stationary portion, the pivoting portion is a first pivoting portion, the end portion of the housing is a first end portion, and the flexible strap is a first flexible strap, and wherein the second mounting bracket comprises:

a second stationary portion configured to be attached to the structure surrounding the window; and a second pivoting portion configured to receive a second end portion of the housing, the second pivoting portion configured to operate the motorized window treatment between the operating position and the extended position; and a second flexible strap defining a third strap end and a fourth strap end, the third strap end configured to be captively received within the second pivoting portion of the second mounting bracket, the fourth strap end configured to be secured to the second stationary portion of the second mounting bracket, wherein the second flexible strap is configured to prevent the motorized window treatment from pivoting beyond the extended position.

28. The motorized window treatment of claim 1, further comprising a battery holder that is configured to retain the one or more batteries, the battery holder configured to be received within a cavity of the housing.

29. The motorized window treatment of claim 28, wherein the battery holder comprises:

an internal spring configured to maintain contact between the one or more batteries and a positive contact;

a first external spring that is electrically connected to the positive contact and external to the battery compartment within the battery holder; and a second external spring that is electrically connected to the battery holder of the battery holder and external to the battery compartment within the battery holder, wherein when the battery holder is received within the housing, the first external spring is configured to abut a first electrical pad on a first surface of a printed circuit board of the motor drive unit and the second external spring is configured to abut a second electrical pad on a second surface of the printed circuit board.

30. The motorized window treatment of claim 29, wherein the motor drive unit further comprises a control circuit mounted to the printed circuit board, the control circuit configured to enter a configuration mode upon resetting after the plurality of batteries are disconnected from and reconnected to the positive spring contact.

* * * * *